(12) United States Patent
Tirk et al.

(10) Patent No.: US 9,325,780 B2
(45) Date of Patent: Apr. 26, 2016

(54) SYSTEM AND METHOD FOR AN APPLICATION DISTRIBUTION AND METRICS SYSTEM ENABLING THE INTEGRATION OF DISTRUBUTED APPLICATIONS INTO HOST APPLICATIONS AND THE MONETIZING OF DISTRIBUTED APPLICATIONS

(71) Applicants: Eric E. Tirk, Spencerport, NY (US); Dean P. Fragnito, Rochester, NY (US)

(72) Inventors: Eric E. Tirk, Spencerport, NY (US); Dean P. Fragnito, Rochester, NY (US)

( * ) Notice: Subject to any disclaimer, the term of this patent is extended or adjusted under 35 U.S.C. 154(b) by 0 days.

(21) Appl. No.: 14/074,417

(22) Filed: Nov. 7, 2013

(65) Prior Publication Data

US 2014/0067559 A1    Mar. 6, 2014

Related U.S. Application Data

(60) Division of application No. 12/927,351, filed on Nov. 12, 2010, now abandoned, which is a continuation-in-part of application No. PCT/US2009/002967, filed on May 13, 2009.

(60) Provisional application No. 61/127,441, filed on May 13, 2008.

(51) Int. Cl.
*G06Q 30/00* (2012.01)
*H04L 29/08* (2006.01)
*G06F 9/445* (2006.01)
*G06F 21/10* (2013.01)
*G06Q 30/02* (2012.01)

(52) U.S. Cl.
CPC ....... *H04L 67/10* (2013.01); *G06F 8/60* (2013.01); *G06F 21/10* (2013.01); *G06Q 30/0277* (2013.01)

(58) Field of Classification Search
CPC ..................... H03M 3/4878; H03M 3/4938
USPC ....................................... 705/14.1
See application file for complete search history.

(56) References Cited

U.S. PATENT DOCUMENTS 7,697,673 B2 *   4/2010   Chiu ............. H04M 3/4938
                                                 379/114.13

* cited by examiner

*Primary Examiner* — Daniel Lastra
(74) *Attorney, Agent, or Firm* — Bassett IP Strategies; David F. Bassett

(57) ABSTRACT

The present invention comprises an application distribution and metrics system as well as an application monetizing system (ADMS). The ADMS incorporates a cross-platform application distribution system and a usage-based and ad-based monetizing system which allows for fine-tuned usage-based pricing schemes to be created based on system-defined metrics and developer-defined metrics, seamless integration of ad-based monetizing, third party participation in monetizing efforts, and a flexible revenue allocation process.

19 Claims, 35 Drawing Sheets

DEFINITION-*

Name
ID
Description
Gallery Image URL
Public                    Yes ▼
Attributes                Add ▼ Name                                          Delete
  Caption
  Description Type          Text ▼
  Default Value Part Definitions          Add Submit

FIG. 5

| Gallery | My Subscriptions | My Parts | Get Markup | Workbench | Sign out |

SUBSCRIPTION: [pligg] - *  — ☐ ✕ name

ID

Color

Size

[Submit]

| Gallery | My Subscriptions | My Parts | Get Markup | ✂ Workbench |

To create a new Part...

| -- select a WidgetPop Type -- ▼ | -- then select a Part Type -- ▼ | | | Create Part |
|---|---|---|---|---|
| WidgetPop Type | Part Type | Part | | |
| Date Widget | Display Boxed Date | BoxedDate_1 | Edit | Delete |
| Date Widget | Display Boxed Date | BoxedDate_2 | Edit | Delete |
| Date Widget | Display Simple Date | Style 1 | Edit | Delete |
| Info Test Widget | test | Infotest | Edit | Delete |

FIG. 11

PART: [Dev OOD][website] - *

Name
ID
data
intro
pubId
source
OOD redirect ID

Submit

SUBSCRIPTION: [Calandar] - Calandar

Name: Calandar
ID: cal

[Submit]

FIG. 16

PART: [Calandar][mini-monthly-view] - Standard Mini Month View

Name: Standard Mini Month View
ID: cal
beginning day of week: Sunday
height: 30
width: 100

[Submit]

FIG. 17

SYSTEM AND METHOD FOR AN APPLICATION DISTRIBUTION AND METRICS SYSTEM ENABLING THE INTEGRATION OF DISTRUBUTED APPLICATIONS INTO HOST APPLICATIONS AND THE MONETIZING OF DISTRIBUTED APPLICATIONS

CROSS-REFERENCE TO RELATED PATENT APPLICATIONS

This patent application is a divisional application of applicant's U.S. patent application Ser. No. 12/927,351 (filed in United States on Nov. 12, 2010) which claimed priority based upon patent cooperation treaty application PCT/US2009/002967 (filed in United States on May 13, 2009) which in turn claimed priority based upon U.S. provisional patent application 61/127,441 (filed on May 13, 2008). The entire disclosure of both patent applications is hereby incorporated by reference into this specification.

BACKGROUND OF THE INVENTION

The present invention relates to the creation and distribution of software applications, the management of software application metrics, and the monetizing of software applications; more particularly to facilitate the distribution of software applications by acting as a intermediary which transforms software applications in such a way that allows for their integration with host software applications, while also enabling software application metrics to be gathered and operated upon allowing for software application monetizing schemes and models to be adopted among other uses of application metrics.

There exist various techniques to allow computers and software applications to interact. For example, remote procedure call (RPC) protocols allow a program on one computer to cause a program on another computer to be executed, and other architectures such as common object request broker architecture (CORBA) and distributed component object model (DCOM) offer the same functionality. Also a variety of middleware programs have been implemented to connect separate applications to allow communication, such as electronic data interchange (EDI) which provide a standard mechanism allowing a computer system of one user of the network to send data to a computer system of another user of the network.

The popularity of the world wide web (web) has brought forth additional technologies enabling computers to intercommunicate. The web allows individuals to make requests with a web browser for web pages and to interact with web pages served from remote servers (web servers). In addition to user initiated requested information, there is also the ability for the web to support the programmatic interaction of remote applications to exchange information via defined application program interfaces (APIs), referred to as web services.

Web services allow heterogeneous applications and computers to interact, and can be defined and implemented using a variety of underlying protocols and techniques. These standard protocols and techniques of web service implementations return data in extensible markup language (XML) format using hypertext transport protocol (HTTP) in response to a web service invocation request specified as a uniform resource identifier (URI), such as a uniform resource locator (URL) that includes a specified operation and one or more query parameters. Other protocols are used for various purposes, such as simple object access protocol (SOAP) for standard message exchange, web services description language (WSDL) for description of service invocations, and universal description, discovery and integration service (UDDI) for discovery of available services.

Web services offer the most value to applications that are not readily available over the Internet. These are sometime referred to as legacy application. These represent software applications that were created prior to the Internet and its widespread adoption. Currently many software applications utilize the Internet and are accessible over the Internet or at least have adopted Internet protocols such as HTTP. While web services offers these new web based applications a means to communicate and share data, web services also represent another layer that must be developed and another protocol that must be adhered to in order for the value of web services to be realized.

Realizing this, other less obtrusive methods have been developed to distribute applications to remote applications and to exchange data with remote applications. An example is a representational state transfer (REST) based architecture. REST is not a protocol or a specification, it is a best practice. When adhering to a RESTfull architecture the REST based application makes it easier for other applications to exchange data with it. However this still means that non REST based applications need to be reengineered and REST also requires that remote applications communicating with a RESTfull application implement a RESTfull API, again requiring additional effort to be put forth in order for the benefits of REST to be realized.

Further desiring an easier way to distribute application and exchange data other techniques have been adopted; a popular technique is to create a "widget". A widget makes use of client side capabilities of the browser. The two most popular forms of widgets are Javascript and flash. These techniques allow a web site or a host application to typically place a few lines of code into the web page allowing for web based application to be delivered within the page of another web based application. This technique is very easy for the host application however it yet again requires that the distributed application be altered or modified.

Widgets are most often subsets of an application. They do not represent the full stack of an application. For the benefits of the entire application to be enjoyed interaction must take place directly with the application. Widgets also have security restrictions placed on them due to web client constraints.

Widgets have a very crucial downside in that the content they generate is not visible to search engines. A search engine, such as Google and Yahoo, making a request for a web page with widget content for the purpose of indexing and storing the content of the web page in their databases, will not index the content of the widget. Sites deploying content as widgets will thus lose the value of having that content indexed and stored on search engines, thus reducing their chances of being discovered on a search engine.

None of the above mentioned techniques offer any real advantage to the developer of software applications with respect to application metrics gathering and application monetizing scheme implementation.

The current invention allows for the full stack of an application to be deployed into host application in such a way that no changes to the distributed application are required. Content displayed by the distributed application on the host application will be indexed by search engines. In order to deploy the distributed application very little effort is required by these host applications. The current invention enables application metrics to be easily gathered and various monetizing schemes and models to be applied to the distributed application.

SUMMARY OF THE INVENTION

The present invention comprises an application distribution and metrics system as well as an application monetizing system (ADMS). The ADMS incorporates a cross-platform application distribution system and a usage-based and ad-based monetizing system which allows for fine-tuned usage-based pricing schemes to be created based on system-defined metrics and developer-defined metrics, seamless integration of ad-based monetizing, third party participation in monetizing efforts, and a flexible revenue allocation process.

The ADMS facilitates interactions between computing systems by acting as an intermediary via which a distributed application, is made available to a host application end user.

The ADMS allows application developers to configure multiple application monetizing schemes for distributed applications as well as set parameters which control the distribution of revenues derived from those monetizing schemes to various application stakeholders.

The ADMS includes an application distribution system which enables a host application end user to interface with a distributed application.

The ADMS implements an efficient hierarchical data format for transmitting data and also provides mechanisms enabling the distribution of applications.

The ADMS provides several novel benefits to application developers. These benefits include the variety of monetizing schemes the ADMS provides to developers of the distributed software applications; the novel way the ADMS enables the collection of application metrics, the novel way the ADMS seamlessly integrates promotional content into an application, the novel way the ADMS enables the collection and distribution of the revenue generated by the distributed applications; and the novel way the ADMS enables the distribution and consumption of a distributed application across different computing platforms. The ADMS enables distribution and consumption of a distributed application across different computing platforms by enabling development-language and webserver-platform neutrality.

For example, an application developer may develop a distributed application for the hypertext preprocessor (PHP) architecture and host (nm) the distributed application on an Apache web server. ADMS will distribute the application to any other architecture such as ASP.NET architecture on a Microsoft internet information services (IIS) web server without requiring modification to the application by the developer. In another example the application developer may also develop the application using ASP.NET architecture on a Microsoft IIS web server. ADMS will distribute the application to any other architecture such as PHP architecture on an Apache web server without requiring modification to the application by the developer. The ADMS will work with any markup-based distributed applications The ADMS will enable integration of future web platforms and markup-based applications, such as HTML, as seamlessly and easily as current platforms and current HTML centric applications are incorporated. The ADMS may be adapted to accommodate future language/platform combinations.

Attempts at adding functionality to a website in a modular fashion rely on client-side scripting (e.g., Javascript), HTML FRAMES or separate web client windows. Search engines which spider and index the web for content, do not or cannot follow client-side scripted applications. The search engine also may index HTML FRAMES which may reside on a third party website thus not benefiting the publisher and may result in an obscure publisher web page not meant to be directly accessible being indexed. That means that any content on that website which is rendered using these two techniques would not be indexed properly by the search engine. As an example of these constraints, we consider the situation where a developer wishes to add an interactive calendar to a website while adhering to a constraint that the calendar function without the aid of client-side scripts such as Javascript. In other words, the calendar must use only standard HTTP GETS (links). The calendar is an application "module" because it resides within the larger application of the website. While the creation of that calendar module is certainly an achievable feat when run in its own web page (non-integrated module), a problem of integration arises when the calendar is to appear within an already existing page of the web site, for example on the "home" page of the web site, and that home page was already scripted to rely on certain HTTP query parameters particular to that page, then this newly inserted calendar must maintain the state of those query parameters, else the page will not behave and render as expected. So there exists a struggle between maximizing compatibility (to search engines and disparate clients) and using more powerful modular programming concepts. In programming, while modular programming techniques are desired and preferred because they enable large, complex applications to be built from a collection of easy-to-design and manage smaller modules; there is a difficulty inherent to using this technique. The difficulty of using this technique in standard web site design is daunting. As an example, if one had 5 different modules which he wanted to add to his home page and he wanted them to appear in-line without the aid of client-side scripting or FRAMES because he wanted the content of each of those modules to be spidered by the search engines; then each and every module would then have to be programmed to monitor and maintain the current state of any and all query parameters belonging to other modules. It becomes a very tedious job to maintain that state and to do so without creating unwieldy code. The modularity desired by programmers has long been available since the early days of the graphical user interface (GUI), but the web client, its strengths aside, does not recognize the modules. Today web developers are faced with a difficult task when integrating a new module into an existing application. They either have to merge both sets of code in an interwoven fashion or run them in a mode incompatible with search engines and certain clients e.g., client-side code or FRAMES.

The ADMS overcomes this contention between modularity and compatibility by allowing application developers to create distributed applications modularly and allowing web site publishers to integrate those distributed applications into their web sites modularly. Each distributed application is designed as a stand-alone web site, the pages of which are served up as modular parts on the publisher's web site. Each page of the publisher's site is able to serve multiple parts and each part runs seamlessly within its host page without disrupting the operation of the native page or any of its neighbor parts. The state of each distributed application is automatically maintained and isolated from other in-line applications on the publisher's web site. Developers of current application need not make any changes to their application in order for the application to be distributed by ADMS.

The ADMS provides a persistent (consistent and repeatable) series of uniform resource locators (URLs) with which distributed applications and their parts are allowed to be referenced within their host application pages enabling search engine spiders to traverse a distributed application at a host application. Because the part URLs are consistent and repeatable search engines will index the part URLs; despite the distributed applications not residing on the host application, The ADMS makes use of a transformation technique to provide the persistent series of URLs. For each distributed application part per host application there exits two persistent part URLs. A "in context" part URL and an "out of context" part URL. The "in context" part URL when requested will display the part as it appears in the host applications with all surrounding content, including the host application content and other part content (other part content represents content from other parts integrated with the host application). The "out of context" part URL will display only the part content. Both URLs contain the host application URL.

An example of a host application URL is http://publisher.com/hostapplication.php containing a distributed application.

An example of an "in context" part URL is http://publisher.com/hostapplication.php?wp=Xdw.

The "in context" URL is identical to the host application URL with the exceptions of query parameters that are passed to the ADMS which identify the distributed part application.

An example of an "out of context" part URL is http://publisher.com/adapter.php?wp=Xdw.

The "out of context" URL contains the publisher URL and points to the adapter on the publisher site with query parameters that identify the distributed application part.

The present invention allows different entities, namely the host application (publisher), the ADMS, and any or all co-existing distributed applications delivered through said host application, to exchange data with one another. The present invention makes use of a scoped-variable store on the ADMS. Named variables can be set and retrieved from this store by any of the above mentioned entities.

The ADMS service manages a named-value store under which application variables can be stored. These variables are stored with named-scopes which allows for an unlimited level of compartmentalization and security between variables.

The present invention makes use of an application adapter. The application adapter code which is capable of displaying multiple remote distributed applications within the same host application and additionally is capable of handling the complexities of maintaining the autonomy of those multiple distributed application cookies and query parameters.

The present invention makes use of an Efficient Hierarchical Data Format (EHDF). This EHDF is used to efficiently send and receive data. The EHDF protocol provides for the efficient, zero look-ahead, writing and reading of hierarchical data of any type, which greatly reduces the entire parsing step when exchanging structured data. And because binary data elements can be included in their native form, the need for costly encoding during writing and decoding during reading is reduced.

EHDF allows one to create a message or document with the same degree of structure one can impose when using extensible markup language (XML). However, EHDF uses less characters and contains the same amount of information as XML. EDHF requires no ending tags, uses only single-byte group start and end characters, can incorporate un-named data elements, can incorporate lists of data elements under a single grouping, can incorporate absolutely any binary data without encoding the binary data, and can be streamed because EHDF requires absolutely zero lookahead during reading.

Another gain of efficiency of EHDF over XML is demonstrated during a content search within a document. As an example, if one wanted to extract all the "lastname" elements from a large XML document corresponding to a field titled "lastname", the entire document would have to be parsed, with essentially every character being read to look for the "lastname". A value name will be read to find a match to "lastname". The value name will be read until a non-matching character of "lastname" is encountered. The search will then continue from the next character in the document. However, when performing a content search in an EHDF document, one will skip across each unwanted named-value that does not match "lastname" by looking at the length prefixes and skipping that many bytes ahead. In an EHDF document, when one stops reading a value name upon encountering the first non-matching character of "lastname", one uses the known length prefix of that non-matching name and jumps to the next part header and starts the process again. Since in EHDF most of the data in a document is composed of values and not element names, most of the bytes in the document will be skipped over. All non-named values and unwanted EHDF groups would also be skipped.

The ADMS provides for a security-compatible application interface enhancement. Third-party Javascript or other client-side scripts such as active x and flash are a recognized danger to publisher sites. When a publisher allows Javascript to run, when said Javascript originates from an entity other than the publisher, then that entity has virtually unlimited capability for data theft and manipulation (e.g. stealing cookies, stealing passwords, stealing user accounts, and the like). In a multi-tiered environment as that which the invention puts forth, there are potentially an unlimited number of external entities (distributed applications) desiring to run client-side scripts. Although the present invention allows distributed applications to run their own client-side scripts, the present invention also respects a publisher's desire to have more control over this potential danger. For this reason, the application allows publishers to specify on an application-by-application basis, whether or not to allow that distributed application to run client-side scripts. Should the publisher disallow an distributed application to run its own client-side scripts, the ADMS server will strictly filter and block any attempts by the distributed application to pass Javascript through it to the publisher. However, the distributed application still has available to it a list of pre-configured application enhancement client-side scripts which are supplied by the ADMS server and verified to be safe and secure scripts. The list of pre-configured application enhancement client-side scripts which are supplied by the ADMS and are available to the distributed application will expand as additional scripts are vetted and added to the list. These application interface enhancement client-side scripts provide all distributed applications access to such enhancements such as the ability to display application parts within virtual floating windows, controlling effects such as mouseovers, onclicks and any other effects commonly requiring client side scripting. These application interface enhancements are ready-to-use, verified safe for the publisher, and stable for the distributed application, thereby eliminating much manual coding effort on the part of the application developers, many of whom would have been duplicating each other's efforts if they had to create these enhancements on their own.

Another problem which the current invention overcomes is the case where a web client interprets a webpage which has Javascript, styles, or a combination. When attempting to insert via the innerHTML property on an element, what is originally a full web page, including HTML markup, Javascript, and styles; the web client will not interpret and run the Javascript, nor interpret and apply the styles. This is because a web client will interpret a webpage in the general fashion of reading a block of text and analyzing the block of text to determine whether the block is of type HTML or non-HTML (e.g. Javascript, cascading style sheet (css) style, or the like). If the block type is HTML, then the web client renders it, else the non-HTML block is processed (e.g., the Javascript is run, the css style is loaded). The web client then repeats this process by looking at the next block of text, until all text on the webpage is read.

The ADMS overcomes this problem by segmenting the blocks as a web client would do, but then the ADMS assigns a URL to individual Javascript and css style blocks which the web client can use to retrieve the content of the block from the ADMS. This allows the ADMS to take a typical web page (a part), or multiple pages, whether those pages contains straight HTML markup or a more complex combination of HTML markup, Javascript code, and css styles; and render those pages properly, all within a Publisher's page.

Ajax stands for Asynchronous Javascript and XML. Use of Ajax within a web application enhances the end-user experience with that application. It allows sections of content of the web application to be updated without refreshing the entire web page. This in turn improves the user experience in terms of additional user-feedback and responsiveness. Implementing Ajax within a web application requires additional programming for the developer. A large portion of current web sites do not utilize Ajax. To Ajax-enable these sites would require a significant investment in time and resources.

A downside of Ajax-based web applications is that the content served by these web applications may not be accessible by search engines. This significantly reduces the ability of end-users to discover web application content through said search engines.

The present invention overcomes these limitations by transforming distributed applications which have not incorporated Ajax into Ajax-enabled applications. The present invention also provides for distributed applications which are currently Ajax-enabled to maintain their Ajax functionality yet be transformed so that Ajax-to-server communication now travels through the adapter on the host application.

The present invention also provides for non-Ajax-enabled applications which have been transformed into Ajax-enabled applications to be visible to search engines at the host application.

BRIEF DESCRIPTION OF FIGURES

FIG. 3 depicts a representative example of an interface through an account is created.

FIG. 4 depicts a representative example of an interface of an account log in.

FIG. 5 depicts a representative example of an interface through which a developer can edit application attributes.

FIG. 7 depicts a representative example of an interface through which a publisher can edit a subscription.

FIG. 8 depicts a representative example of an interface through which a developer can create and edit an application definition, including application attributes and part attributes.

FIG. 11 depicts a representative example of an interface through which a publisher can create, edit and delete parts.

FIG. 12 depicts a representative example of an interface through which a publisher can edit a part.

FIG. 15 depicts a representative example of a calendar application definition.

FIG. 16 depicts a representative example of a calendar application subscription.

FIG. 17 depicts a representative example of calendar application part "Standard mini-month —view"

DESCRIPTION OF THE INVENTION

Figure 1:
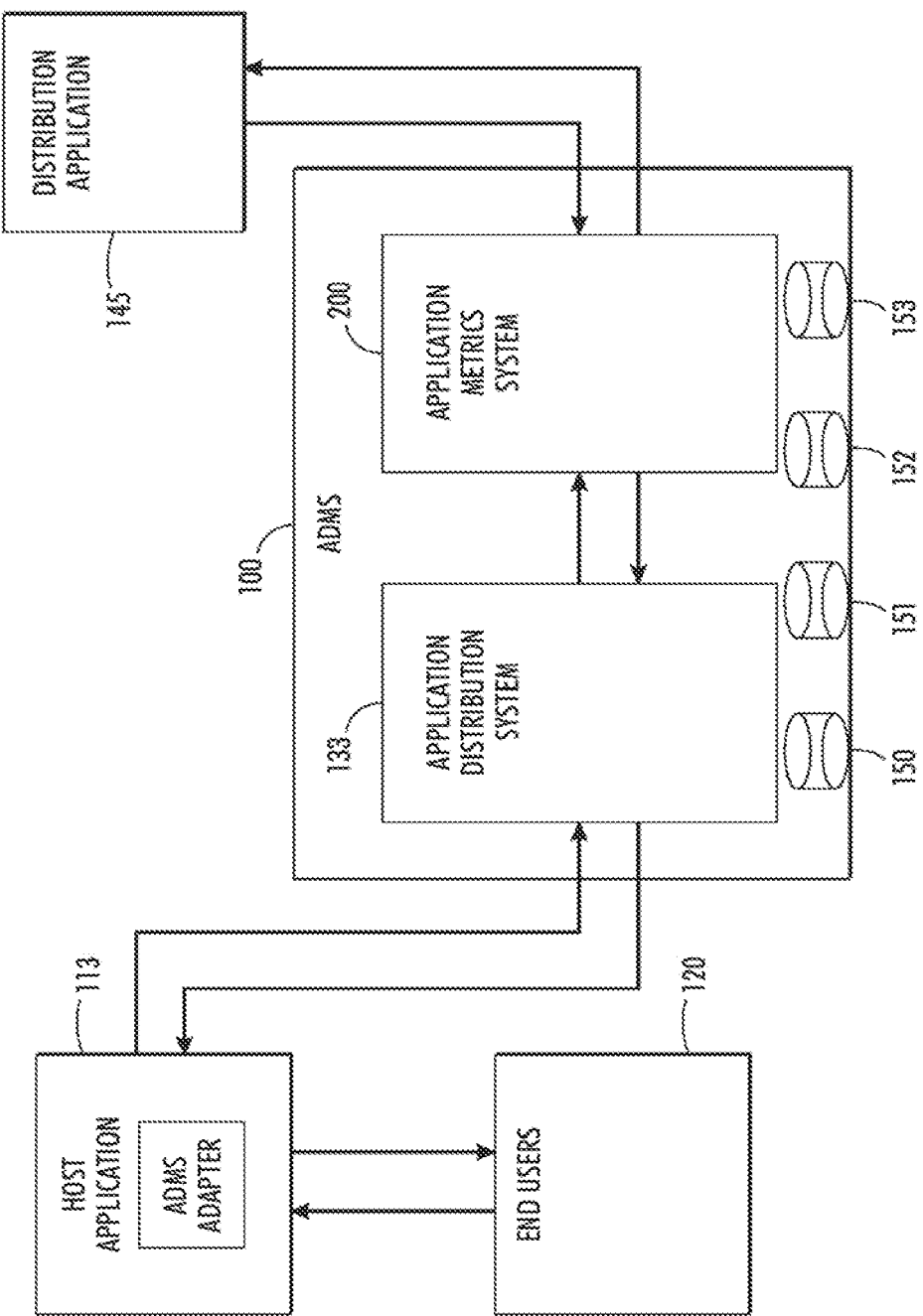
FIG. 1 is a block diagram representing one preferred embodiment of an application distribution and monetizing system.

Various embodiments of the present invention provide a system and a method to use said system wherein the present invention offers an application distribution and metrics system (ADMS). The various embodiments used to describe the principles of the present invention are by way of illustration only and should not be construed in any way to limit the scope of the invention. Those skilled in the art will understand that the principles of the present invention may be implemented in any suitably arranged device.

Throughout this document, the following terms will have the following meanings

Ad Spaces represent visible sections or spaces of a distributed application where promotional content is displayed.

Ajax is a group of interrelated web development techniques used to create interactive web applications or rich Internet applications. With Ajax, web applications can retrieve data from the server asynchronously in the background without interfering with the display and behavior of the existing page.

An algorithm is a type of effective method in which a definite list of well-defined instructions for completing a task, when given an initial state, will proceed through a well-defined series of successive states, eventually terminating in an end-state. The transition from one state to the next is not necessarily deterministic; some algorithms, known as probabilistic algorithms, incorporate randomness.

An anchor is a piece of text or some other object (e.g., an image) which marks the beginning, the end, or both of a hypertext link. The <A> element is used to mark that piece of text (or inline image), and to give its hypertextual relationship to other documents. The text between the opening and closing tags, e.g., <A attributes> . . . text . . . </A>, can be the start or destination (or both) of a link.

An application attribute is a named property of a distributed application. The application attribute may be provided a default value by an application developer. The value of which is changeable by a publisher when the publisher subscribes to the distributed application. This allows the publisher to create confined customization of the distributed application by exposing changeable named value pairs within the application configuration interface. Each application attribute has a name.

An application consumer is an entity who has paid for certain rights to use or distribute a distributed application. He is the entity funding the monetizing scenario when a usage based monetizing model is implemented.

An application developer is an entity who developed a distributed application.

An application distribution and monetizing provider (ADMP) is an entity providing a mechanism for defining, deploying, and monetizing at least one distributed application. It is possible for the ADMP to be multiple entities. As an example, one entity may provide the application distribution infrastructure (application subscription host) for defining and deploying the distributed application while another entity is providing the monetizing infrastructure (monetizing system provider). For simplicity in the monetizing schemes described in this document only one entity will be represented as an ADMP. It should be obvious to those skilled in the art that for each scheme presented other scheme exists where the ADMP is multiple providers. As an example, in the case where the ADMP is two providers, the ADMP is both the application subscription host provider and the metrics system provider.

Application distribution and monetizing system (ADMS) is a system which combines an application monetizing system and an application distribution system.

An application distribution system is the entity which coordinates and tracks among other things the communications between a host application and a distributed application, and forwards all application requests from the host application to the distributed application and returns the responses from the distributed application back to the host application.

An application end user is an entity which finally interfaces with a distributed application and its associated content.

Application metrics system is a system for gathering and storing application data An application monetizing system is an entity which coordinates and tracks among other things monetizing and promotions for a distributed application. Said system also provides, among other things, an application developer with the ability to configure and effect a monetizing scheme for a distributed application.

An application host is the entity which distributed applications are run.

Application programming interfaces, hereafter referred to as API's, are any defined inter-program or software application abstractions that a program or software application provides of itself to the outside.

Application sponsors are entities that pay to have their promotional material displayed within a distributed application.

Application stakeholders are entities who share in the distribution of revenues derived from at least one application monetizing scheme.

Assigned ID's are used to identify users and parts associated with the ADMS. For example, publisherId is the id assigned to the publisher when they create an account. The publisherId is used to identify the publisher in a communications with the ADMS. As an additional example, applicationPartId is an id assigned to a part definition when the part is created.

Attention is the time an end user spends interfacing with a distributed application.

A broker is an entity who helps facilitate the sale or usage of distributed applications.

Client side scripts refer to the class of computer programs on the web that are executed on the end user-side of the ADMS, by the user's web browser, instead of server-side (on the web server).

Configuration interfaces are graphical user interfaces that allow users to create edit or delete settings for a particular aspect of an application.

A content provider is an entity which contributes intellectual content or data which gets delivered through the distributed application.

Data store refers to any system, software, application, program that can be used to save digital information.

The displayPart method is a method defined within an adapter and called by the server-side code within a host application page. The method accepts a single parameter, URI, which is of type string conforming to a comma delimited list of PART_URIs. The method fetches an array of parts content, each array segmented into blocks, each block comprising HTML markup, CSS style or Javascript.

A distributed application is software which runs on an application host but which is distributed to an end user through a host application. Representative examples of a distributed application include a discussion board system, an on line calendaring system, an ecommerce application, a blog, and a web site.

Endianness is the byte (and sometimes bit) ordering used to represent some kind of data. Typical cases are the order in which integer values are stored as bytes in computer memory (relative to a given memory addressing scheme) and the transmission order over a network or other medium. When specifically talking about bytes, endianness is also referred to simply as byte order. Generally speaking, endianness is a particular attribute of a representation format—e.g., which byte of a UCS-2 character would be stored at the lower address. Byte order is an important consideration in network programming, since two computers with different byte orders may be communicating. Failure to account for varying endianness when writing code for mixed platforms can lead to bugs that can be difficult to detect.

Formal grammar is a set of formation rules that describe which strings formed from the alphabet of a formal language are syntactically valid within the language.

Gallery image URL is the source of an image that will represent a distributed application to publishers as they are searching for a distributed application, A host application is an information source. It may be a website comprising a web page or multiple web pages, a pod cast, or any other information source. It is an application with which an end user directly interacts. A distributed application is integrated within the host application via a host application adapter. An host application is an application to which a distributed application is attached.

HTML is an acronym for HyperText Markup Language, is the predominant markup language for web pages. It provides a means to describe the structure of text-based information in a document—by denoting certain text as links, headings, paragraphs, lists, and the like—and to supplement that text with interactive forms, embedded images, and other objects. HTML is written in the form of "tags" that are surrounded by angle brackets. HTML can also describe, to some degree, the appearance and semantics of a document, and can include embedded scripting language code (such as Javascript) that can affect the behavior of web browsers and other HTML processors.

A Hyperlink, also referred to as a link, is a directly followable reference within a hypertext document Hypertext is text, displayed on a computer, with references (hyperlinks) to other text that the reader can immediately follow, usually by a mouse click or keypress sequence. Apart from running text, hypertext may contain tables, images and other presentational devices. Any of these can be hyperlinks; other means of interaction may also be present, for example a bubble with text may appear when the mouse hovers somewhere, a video clip may be started and stopped, or a form may be filled out and submitted. The most extensive example of hypertext today is the world wide web.

Implementations are the realization of an application, or execution of a plan, idea, model, design, specification, standard, algorithm, or policy.

Infrastructure provider is an entity who provides services to at least one application developer of a distributed application. These services may include but are not limited to such activities as hosting, collocation, bandwidth, frameworks, backup, and other managed services.

The innerHTML property sets or retrieves the HTML between the start and end tags of the object.

Integration techniques are the bringing together of the component subsystems into one system and ensuring that the subsystems function together as a system Internet, also referred to as the web, is a global network of a heterogeneous mix of computer technologies and operating systems. Higher level objects are linked to lower level objects in the hierarchy through a variety of network server computers. These network servers are the key to network distribution, such as the distribution of web pages and related documentation. In this connection, the term "documents" is used to describe data packets or items transmitted over the web or other networks and is intended to include web pages with displayable text, graphics and other images, as well as computer programs. This displayable information may be still, in motion or animated, e.g., animated GIF images.

Markup is a set of annotations to text that describe how it is to be structured, laid out, or formatted. A well-known example of a markup language in use today in computing is HyperText Markup Language (HTML), one of the protocols of the world wide web A metric is recorded data used for reporting. Developer-defined metrics are custom-defined by an application developer. In one preferred embodiment, complex logic may be utilized within an application which triggers the recording of at least one developer-defined metric. The underlying system records these metrics along with their associated attributes. As those skilled in the art are aware, metrics may be simple or complex.

Mouseovers, also known as hover boxes, refer to Graphical User Interface events that are raised when the user moves or "hovers" the cursor over a particular area of the graphical user interface.

Onclicks refer to a graphical user interface event that is raised when the user clicks the cursor on a particular area of the graphical user interface.

A page represents the user interface of a host application. Host applications may have several unique pages to which one or more distributed application may be attached to.

Parse or parsing is the process of analyzing a sequence of tokens to determine their grammatical structure with respect to a given formal grammar.

A part is a target within a distributed application. Distributed applications are comprised of parts each part has a unique URL associated with it. Parts are defined by part definitions.

A part attribute is a named value which is passed to a part. The final form in which it is passed to the part is a URL query parameter. The part attribute may originate from any of several places: it may be stored in ADMS system when developer defines the part, included on the PART_URI in the displayPart call, or as a query parameter on the publisher URL.

Part autonomy refers to the capability for a publisher's web page to host multiple distributed application parts without the danger of those parts interfering with each other or with the publisher's main application.

A part definition describes a part with certain identifiers. A key identifier is a URL of the distributed application. The part definition can point to any type of URL. URLs that a part definition may point to include, but are not limited to, a web page, image resource or other resource. A part definition contains part attributes.

A publisher host is an entity which physically serves an application host to an end user.

A publisher is a representative entity of published material to which a distributed application may be attached. The publisher is an entity deploying a distributed application on a remote computer.

Record and store refers to the act of saving information. The act of saving information will include inserting data into a relational database, saving data to a file, storing data in an xml document; storing data is other meta languages, and other known methods for storing data.

Representational state transfer (REST) is a best practice. Representational State Transfer (REST) is a style of software architecture for distributed hypermedia systems such as the World Wide Web. REST is not a protocol or a specification.

Retailers are entities that may or may not be the same entity as a publisher web site. As a representative example, retailers may use an application such as a shopping cart to sell digital or physical product to the web site visitors.

Scoping is a method of grouping things together used in the present invention as it relates to variables, wherein a variable can be assigned to a specific scope and thereafter becomes protected and autonomous from like-named variables existing in different scopes.

A search engine is a tool designed to search for information on the world wide web. The search results are usually presented in a list and are commonly called hits. The information may consist of web pages, images, information and other types of files. Some search engines also mine data available in newsbooks, databases, or open directories. Unlike web directories, which are maintained by human editors, search engines operate algorithmically or are a mixture of algorithmic and human input.

A spider, synonymous with a web crawler, is a computer program that browses the world wide web in a methodical, automated manner. Some other terms for web crawlers are ants, automatic indexers, bots, and worms or web spider, web robot web scutte. This process is called web crawling or spidering. Many sites, in particular search engines, use spidering as a means of providing up-to-date data. Web crawlers are mainly used to create a copy of all the visited pages for later processing by a search engine that will index the downloaded pages to provide fast searches.

State is a unique configuration of information in a program or machine.

System-defined metrics are metrics that the underlying system records by default. System-defined metrics may include but are not limited to web-client information, date/time, publishing server information, application server information, application information, method called, etc. The system-defined metrics also records advertising-related metrics such as but not limited to ad impressions, ad click-throughs and attention.

Token is a word or other atomic parse element.

Transcoding is the direct digital-to-digital conversion of one encoding to another.

URL stands for uniform resource locator which specifies where an identified resource is available and the mechanism for retrieving it. In popular language, a URL is also referred to as a web address.

Web applications, also referred to as webapps, are applications that are accessed via a web browser or web client over a network such as the Internet or an intranet. They are also computer software applications that are coded in a browser-supported language (such as HTML, Javascript, Java, and the like) and reliant on a common web browser or web client to render the applications executable.

Web client is a HTML or other markup processor. It is a software application which enables a user to display and interact with text, images, videos, music, games and other information typically located on a web page at a website on the world wide web or a local area network. Text and images on a web page can contain hyperlinks to other web pages at the same or different website. Web clients allow a user to quickly and easily access information provided on many web pages at many web sites by traversing these links. Although web clients are typically used to access the world wide web, they can also be used to access information provided by web servers in private networks or content in file systems.

FIG. 1 is a block diagram of one preferred embodiment of an ADMS 100 and the interrelationships between an application host and a distributed application. At least one end user 120 desires to receive content from a host application 113. In one preferred embodiment of the present invention, the host application is a web site. In another preferred embodiment of the present invention, the host application is a pod cast delivery application. An application adapter 116 exists within the host application. The application adapter 116 allows the host application 113 to access the application distribution and monetizing system 100. The application adapter 116 communicates with the application distribution system 133. The application distribution system 133 is shown in greater detail in FIG. 2.

Referring again to FIG. 1, the application distribution system 133 receives a request for at least one distributed application 145 via the application adapter 116. In one preferred embodiment the distributed application is a photo editing application. In another preferred embodiment, the distributed application is a discussion group. In yet another preferred embodiment, the distributed application is a calendar. The application distribution system 133 is software based. The application distribution system 133 enables end users 120 of the host application 113 to interface with at least one distributed application 145 while accessing a host application 113. The application distribution system 133 provides the appearance that the distributed application 145 resides within or is integral to the host application 113.

After the distributed application 145 is identified by the application distribution system 133, the application distribution system provides data regarding the distributed application 145, the host application 113, and the end user 120 to an application metrics system 200. The application metrics system 200 and the flow of information from the distributed application to the revenue allocation system after the end user has made a request to access the distributed application is shown in more detail in FIG. 9.

Referring again to FIG. 1, the application metrics system 200 provides data regarding the distributed application 145 to the application distribution system 133. The present invention uses the application distribution system 133 to allow the end user 120 to access the distributed application 145 and the contents of said distributed application 145. As will be shown in FIG. 30, the present invention uses the application metrics system 200 to allow all relevant application stakeholders 360 to capitalize from monetizing schemes enabled by the metrics system 200. Referring again to FIG. 1, the application distribution system inserts the distributed application 145 to the host application 113 via the application adapter 116. As will be obvious to those skilled in the art, the data transfers between these involved entities occur on a realtime basis, and depending upon the application end user's data transmission speed these data transfers will appear to be instantaneous to the end user for all intents and purposes.

Referring again to FIG. 1 and the preferred embodiment depicted therein, the application distribution system 133 is a cross-platform application distribution system. In one preferred embodiment, the application metrics system 200 enables a usage-based monetizing scheme. In another preferred embodiment, the application metrics system enables an ad-based monetizing scheme. In yet another preferred embodiment, the application metrics system 200 enables a usage-based monetizing scheme and an ad-based monetizing scheme. This combination of the usage-based monetizing scheme and the ad-based monetizing scheme allows for seamless integration of multiple monetizing schemes to be implemented by the developer of the distributed application. As will be shown in FIG. 26 and FIG. 28 developers of distributed application can create fine-tuned pricing schemes based on system-defined metrics and developer-defined metrics. As will be shown in FIG. 30 application stakeholders participate in all monetizing efforts and a flexible revenue allocation process enables the distribution of revenues to application stakeholders.

Figure 23:
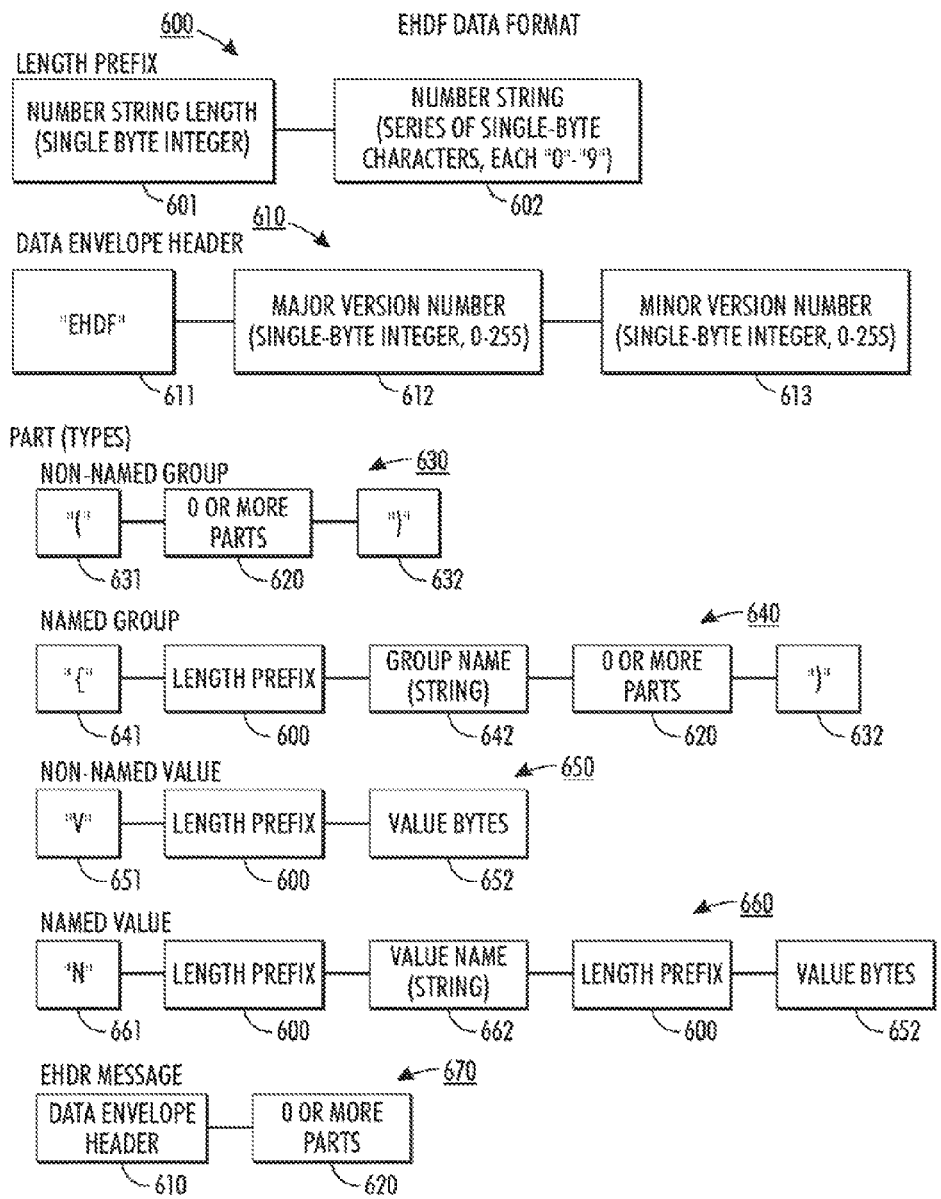
FIG. 23 is a representation of the structure of an Efficient Hierarchical Data Format.

In order to more efficiently send and receive data between components of the ADMS, an Efficient Hierarchical Data Format (EHDF) is used, as will be depicted in FIG. 23.

Application Distribution System

Figure 2:
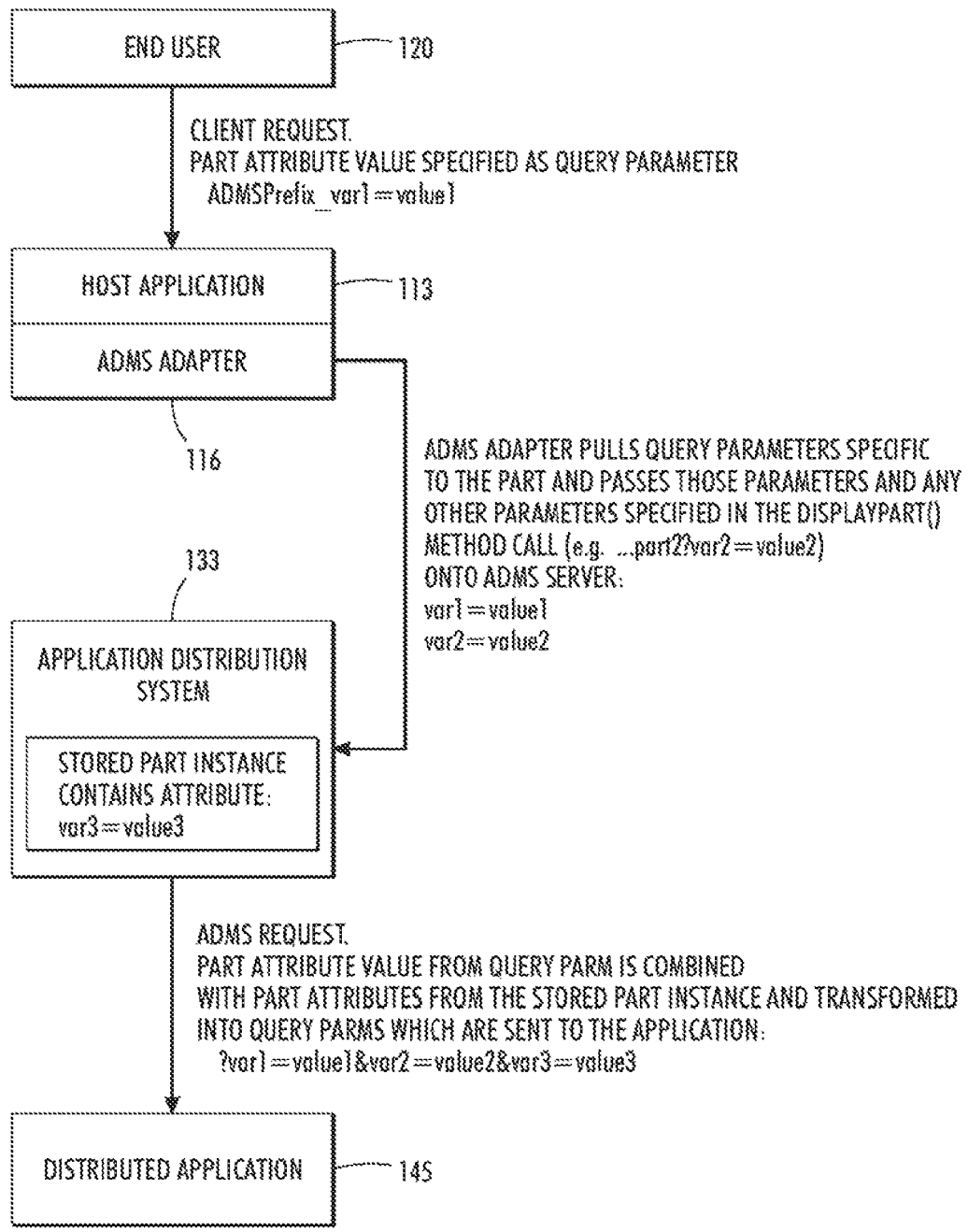
FIG. 2 is a block diagram representing one preferred embodiment of an application distribution system.

One of the subsystems of the ADMS is the application distribution system (ADS). FIG. 2 represents one preferred embodiment of the ADS. The ADS functions as the main hub through which one or more distributed applications 145 are served to host application end users 120 through at least one host application 113.

The Application Developer

Figures 3, 4:

The application developer (not depicted) is an entity that desires to distribute an application. To distribute an application with the current invention the application developer must create an account. An account is created with an account creation interface depicted in FIG. 3. The user names and password an application developer enters in the account creation interface are used for logging in to the ADMS. An application developer login interface is depicted in FIG. 4. Referring again to FIG. 1, application developer accounts are stored in the account data store 150.

The Application Developer's Application

Referring again to FIG. 2, the distributed application 145 is developed by the application developer using any readily available web development methodology or combination of methodologies. The distributed application 145 is defined by properties specific to said distributed application and is made accessible over a network via readily available means. The application distribution system provides an application configuration interface (not depicted in FIG. 2), a representative of which is shown in FIG. 5. Referring again to FIG. 2, the application developer defines the distributed application 145 within the application distribution system 133 via the application configuration interface. In one preferred embodiment of the present invention the application configuration interface allows the application developer to define the distributed application 145 using the following properties: Name, Id, Description, Gallery Image URL, Public (a Boolean variable, the value of which if yes then the distributed application 145 is available for use by the general public), a set of application attributes and at least one part definition. Part definitions are maintained in the data store 151 depicted in FIG. 1.

Referring again to FIG. 5 and the preferred embodiment of the application configuration interface of the present invention depicted, each application attribute may also have one or more of the following: a caption, a description, a type (a representative but non-exclusive list of types include Date—Day of Month, Date—Month, Date—Month-list, Date—Year, Email Address, Number—Decimal, Number—Integer, and Text), default value and help text (not depicted). Application attributes defined on the distributed application are considered "global" to the distributed application and these named values are sent to the distributed application in the form of HTTP query parameters with each request by the Host Application. In another preferred embodiment, not depicted, these named values can be sent by any protocol understandable to the distributed application. Representative acceptable protocols include transmission via HTTP post parameters, HTTP headers, and via protocols other than HTTP.

Figure 6:
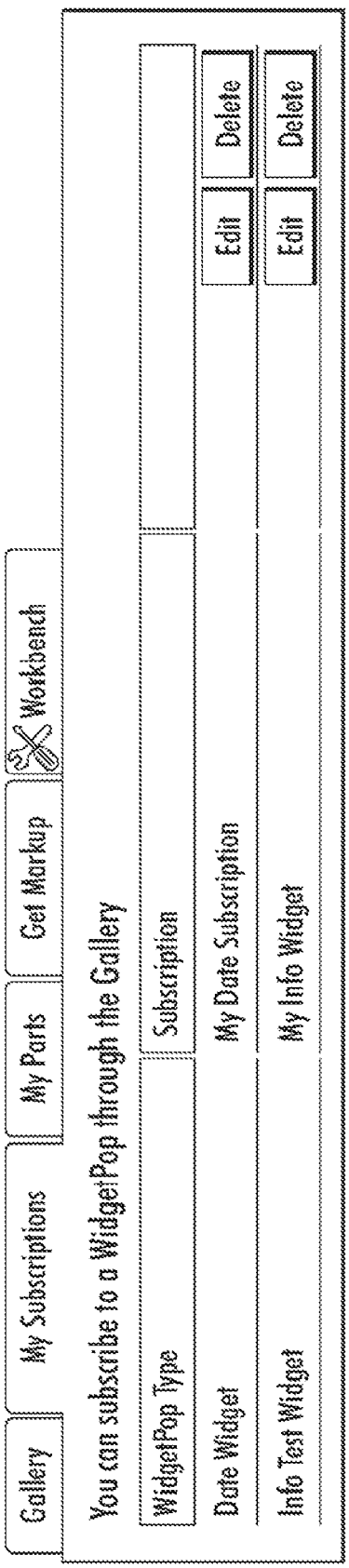
FIG. 6 depicts a representative example of an interface through which a publisher can manage his subscriptions.
Figure 8:
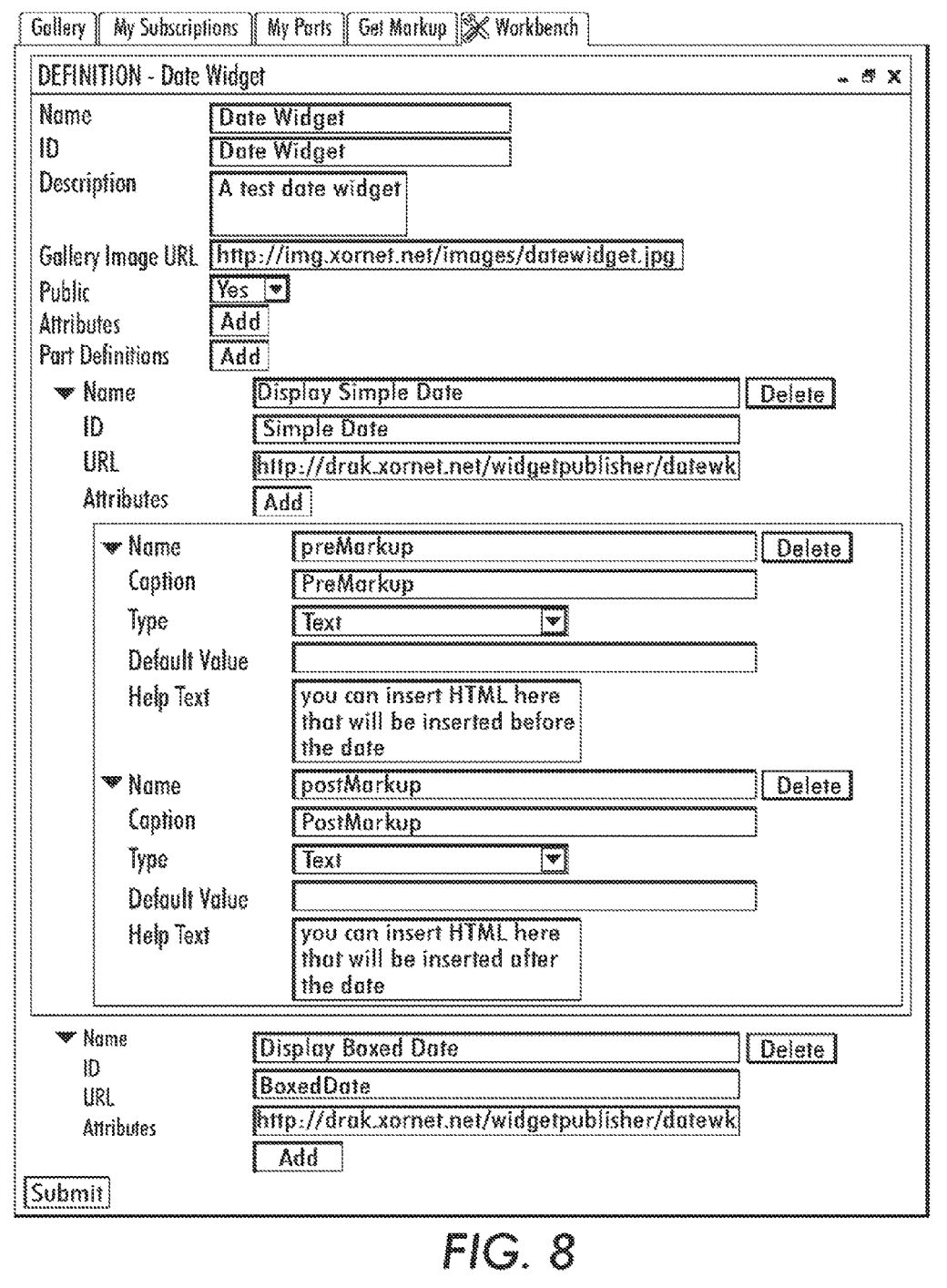

FIG. 6 depicts a representative application subscription interface, which a publisher may use to select a distributed application to edit. FIG. 7 depicts a representative application subscription edit interface which publishers can use to change an application attribute for a selected distributed application. The flexibility provided to the publisher by the application distribution system in allowing the publisher to change the value of application attributes allows for confined customization of the distributed application. Referring again to FIG. 2, the application developer must define at least one part for the distributed application 145. A part definition is a URL pointing to a target resource within the distributed application 145. The target resource can be a web page, an image, a portable document format (pdf) file, any series of bytes which the application serves over HTTP, and the like. Referring again to FIG. 5, a representative graphical user interface (GUI) which a developer may use to define a part definition by editing the part definition fields is presented. FIG. 8 presents a representative GUI which a developer is using to define a part named "Date Widget". In one preferred embodiment of the present invention, each part definition is defined by a name, an ID, a URL and an optional list of attributes. Both the application attributes named-value pairs and the part attributes named-value pairs allow a level of abstraction to be layered on top of the distributed application 145 presented in FIG. 1. The abstraction layer allows the developer to make available application configuration settings via part attributes and the ADMS 100 stores the part definitions in the application definition data store 151, as detailed in FIG. 1 and forwards the parameters to the application at runtime.

Again referring to FIG. 2, in one preferred embodiment of the present invention, the values of application attributes and all part attributes for the requested part are delivered to the distributed application in the same request. The request sent to the distributed application for any particular part includes both the part attribute values for that part and the distributed application attribute values for the application which that part exists under, and are all are delivered to the distributed application as query parameters.

Figure 9:
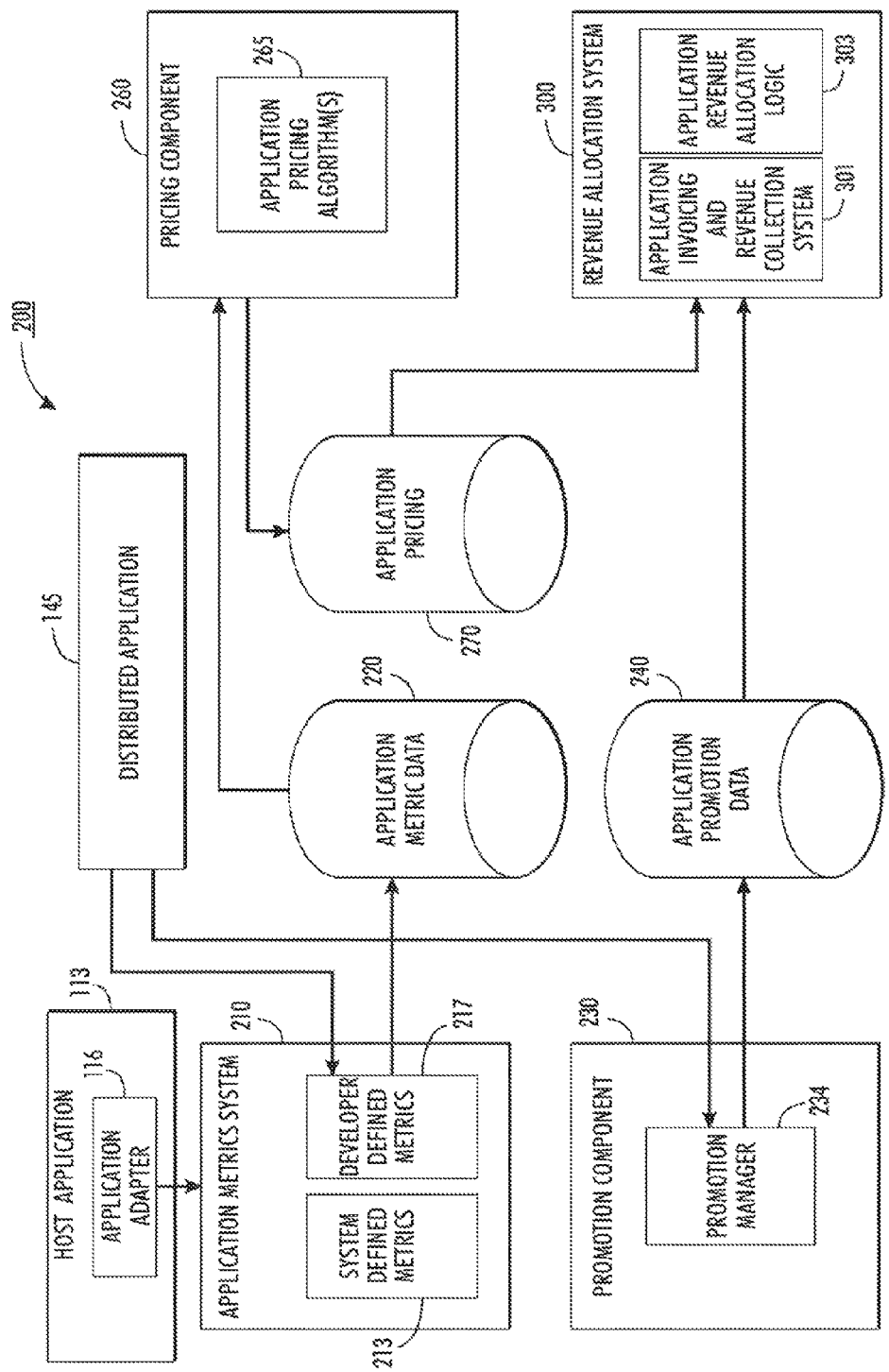
FIG. 9 is a block diagram representing one preferred embodiment of a component of the application distribution and metrics system.

Referring to FIG. 9 and the application metrics system 200 depicted therein, as the application metrics system 200 processes each request from the host application 113 for a distributed application part, the application metrics system 200 also records metrics associated with each part request in an application metrics data store 220. The metrics recorded will include all system-defined metrics such as date and time of request, publisherId, applicationPartId, and the like. In addition to the system-defined metrics, the application metrics system 200 will also record and associate to the part request metrics which were defined by the developer (i.e. developer-defined metrics).

The Publisher

In order to deploy a distributed application the publisher must create an account. Referring again to FIG. 3, the account creation interface which is used by the publisher to create an account is presented. The user names and password a publisher enters in the account creation interface are used for logging in via the account login screen which is depicted in FIG. 4. Referring again to FIG. 1, publisher accounts are stored in the account data store 150.

The Publisher's Subscriptions

Figure 10:
FIG. 10 depicts a representative example of a publisher subscription interface.

FIG. 10 shows a representative example of a publisher interface to view available distributed application to which the publisher can subscribe. The publisher uses the publisher subscription interface to subscribe to at least one distributed application. The publisher subscription interface provides the publisher an interface through which he may search, sort and filter through all public distributed Applications and through any private distributed Applications for which he may have access rights.

Referring again to FIG. 10, the publisher may scroll through the listing of distributed applications available to him. Upon finding a desired distributed application, the publisher clicks on the "Subscribe" button. After the publisher has clicked on the subscribe button the edit subscription screen appears. Referring again to FIG. 7 and the application subscription edit interface depicted therein, the publisher may use the edit button within the application subscription edit interface to give his new distributed application subscription a name and an ID. If the distributed application was defined with at least one application attribute, those application attributes are displayed on this interface. The publisher may use this interface to change the value of each application attribute. Referring again to FIG. 1 the publisher subscriptions are stored in a data store 152.

Referring again to FIG. 6 and the representative example of an application subscription interface depicted therein, the publisher may manage his subscriptions. Managing the subscriptions may include listing them, editing them, and deleting them. The publisher can see a listing of his subscriptions by clicking on the "My Subscriptions" tab. The publisher may edit a subscription by clicking on the "Edit" button associated with a distributed application. The publisher may stop using a distributed application by clicking on the "Delete" button associated with the distributed application.

The Publisher's Parts

The ADMS may be used by a publisher to use a distributed application in multiple host applications and may share part instances of a distributed application with other publishers. This is enabled by providing a disconnect between the distributed application parts and the distributed application subscriptions.

A publisher must initially create a subscription to a distributed application to use the distributed application. A representative publisher part interface is depicted in FIG. 11. The publisher uses the publisher part interface to create at least one instance of an application part corresponding to at least one part definition of said distributed application. To create a part instance the publisher selects the application type and a part type (an application may be comprised of one or more parts, each one being a part type) of the selected application type. After the selection of the application type and part type the publisher then is presented with a part instance edit screen. A representative part instance edit screen is depicted in FIG. 12. In the part instance edit screen the publisher may enter values for the part name and ID and also any part attribute values that were defined in the part definition for this part type. (The part definition was defined via the part definition interface shown in FIG. 5.) The publisher may edit any of the aforementioned values at any time by selecting the appropriate edit button depicted in FIG. 11. Referring again to FIG. 1, part instances are stored in the parts instance store 153.

After the publisher has subscribed to an application and creates a part instance the publisher is ready to deploy the distributed application part on a host application. In order for the distributed application to be deployed the adapter code must reside on the host application or the host application must have access to the adapter code over a network. There are various methods for deploying the adapter code detailed below.

Figure 13:
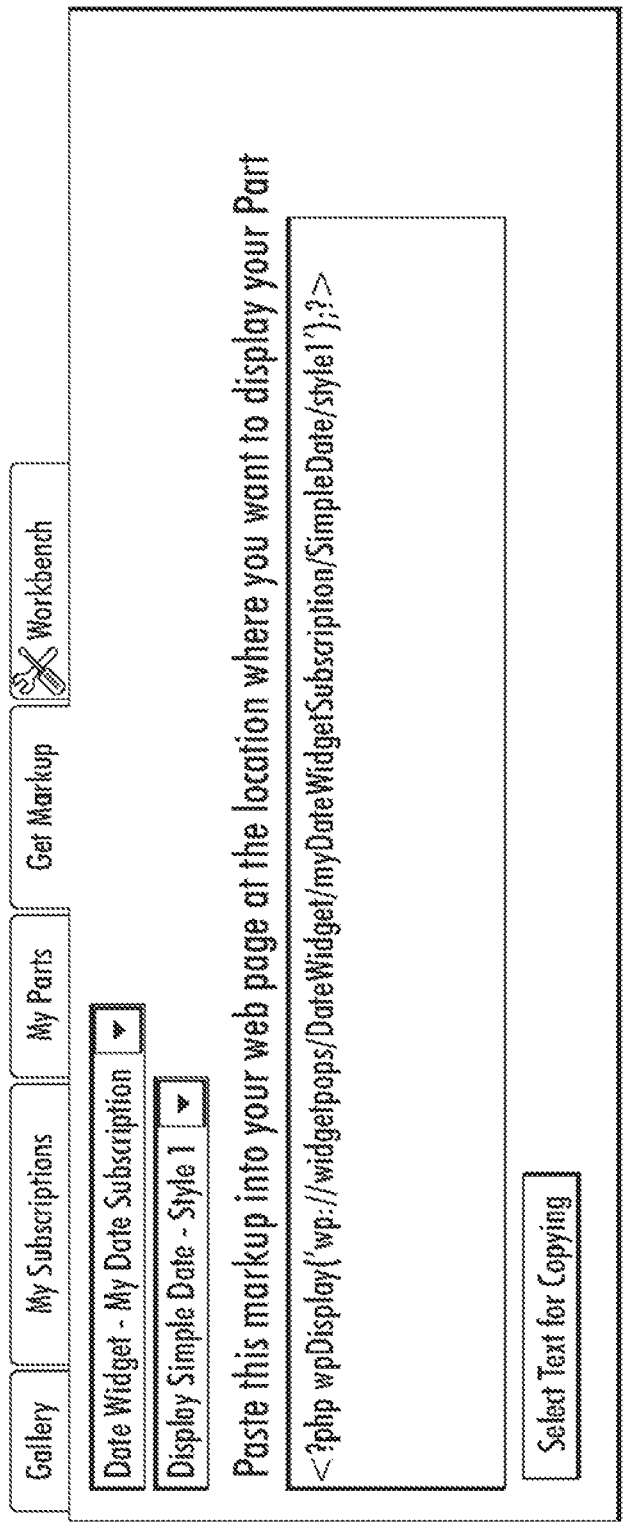
FIG. 13 depicts a representative example of an interface through which a publisher can prepare to use a distributed application.
Figure 14:
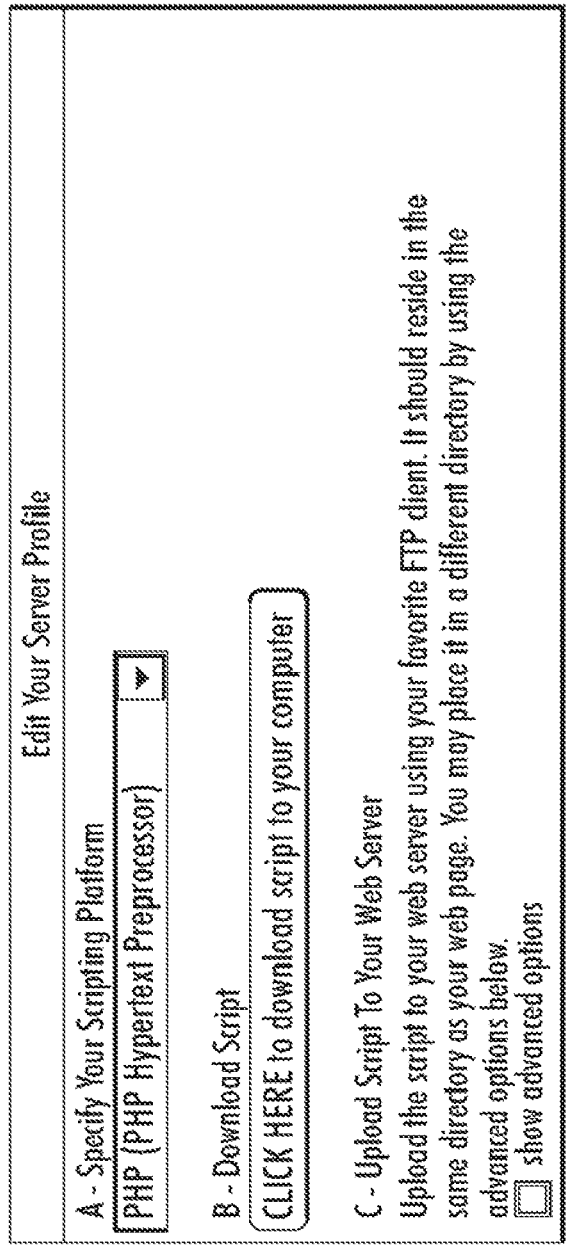
FIG. 14 depicts a representative example of an interface through which a publisher edits a server profile.

Once a publisher creates a part using the part interface, he may then generate the part markup which will enable him to insert the part into a host application. The application distribution system provides the publisher with an interface, a representative of which is depicted in FIG. 13, in which the publisher selects a subscription and a part. After this "pairing" of subscription with part, the system then presents the publisher with a single line of markup which he can copy and paste into the position on the host application where he desires the part to appear. The generic format of the part markup is a function call "displayPart(PART_URI)". The PART_URI parameter is in the format protocol://DISTRIBUTION_SYS_HOST/APPLICATION_TYPE/SUBSCRIPTION_ID/PART_TYPE_ID/PART_ID?QUERYPARMS.
The correct part markup will be generated based on a server profile the publisher selected in a server profile interface. A representative server profile interface is depicted in FIG. 14. The server profile indicates which programming language the host application is programmed with. The generated part markup will conform to the specifications of the host application programming language.

A representative example of the PART_URI format is
The PART_URI parameter is in the format:
PROTOCOL://HOST/APP_TYPE/SUB_ID/PART_TYPE_ID/PART_ID?QUERYPARMS
where:
PROTOCOL is either "wp" or "wps" (forced secure),
HOST is the Hostname of the Distribution System server,
APP_TYPE is the Type ID assigned to the Application by the Application Developer,
SUB_ID is the Subscription ID assigned to this Subscription by the Publisher,
PART_TYPE_ID is the ID assigned to this Application Part by the Application Developer,
PART_ID is the ID assigned to this Application Part Instance by the Publisher, and
QUERYPARMS are any name-value pairs which the Publisher wishes to send to the Part.

A representative PHP example is

```
<?php
wpDisplay('wp://application/DateApp/myDateAppSubscription/
SimpleDate/style1');?>
```

When the ADMS is passed a SUB ID value that does not correspond to a publisher's subscription for the application with an id value equal to the APP TYPE value passed, a subscription will be created for the application identified by the APP TYPE in the publisher's account with an id equal to the value of the SUB ID passed in the markup. When the ADMS is passes a PART ID that does not correspond to a publisher's part with id value equaling the PART TYPE value passed in the markup for the application with id equaling the APP TYPE value passed in the markup a part will be created with id equaling the PART TYPE value passed in the markup for the part of the application with part id equaling the PART TYPE value passed in the markup of the Application with id equaling the APP TYPE value passed in the markup.

This enables publisher to deploy distributed application without going through the subscription and part creation process. The publisher can alter the configuration and runtime settings for the distributed application readily and easily via a subscription interface, a representative example having been presented in FIG. 13. Application attributes may be altered using an application subscription edit interface, a representative example having been presented in FIG. 7. Part attribute values may be altered using a part instance edit screen, a representative example having been presented in FIG. 12. After the publisher has created attribute values, he may globally alter the values using these graphical user interfaces. The publisher has another option available to override the application attribute values and part attribute values by attaching them to the end of the PART_URI as query parameters. The order of precedence is as follows: application attribute values are overridden by values of any matching part attributes which are in turn overridden by the values of any matching query parameters on the PART_URI passed into the displayPart method call. In one preferred embodiment of the present invention, the publisher may set and change runtime settings using the GUIs depicted in FIGS. 7 and 12, and have the modifications to the settings apply to all the calls to display the given part across at least one site or by overriding the runtime settings for at least one particular part display call within a host application which pass in specific override values for application attributes or part attributes.

Figure 15:
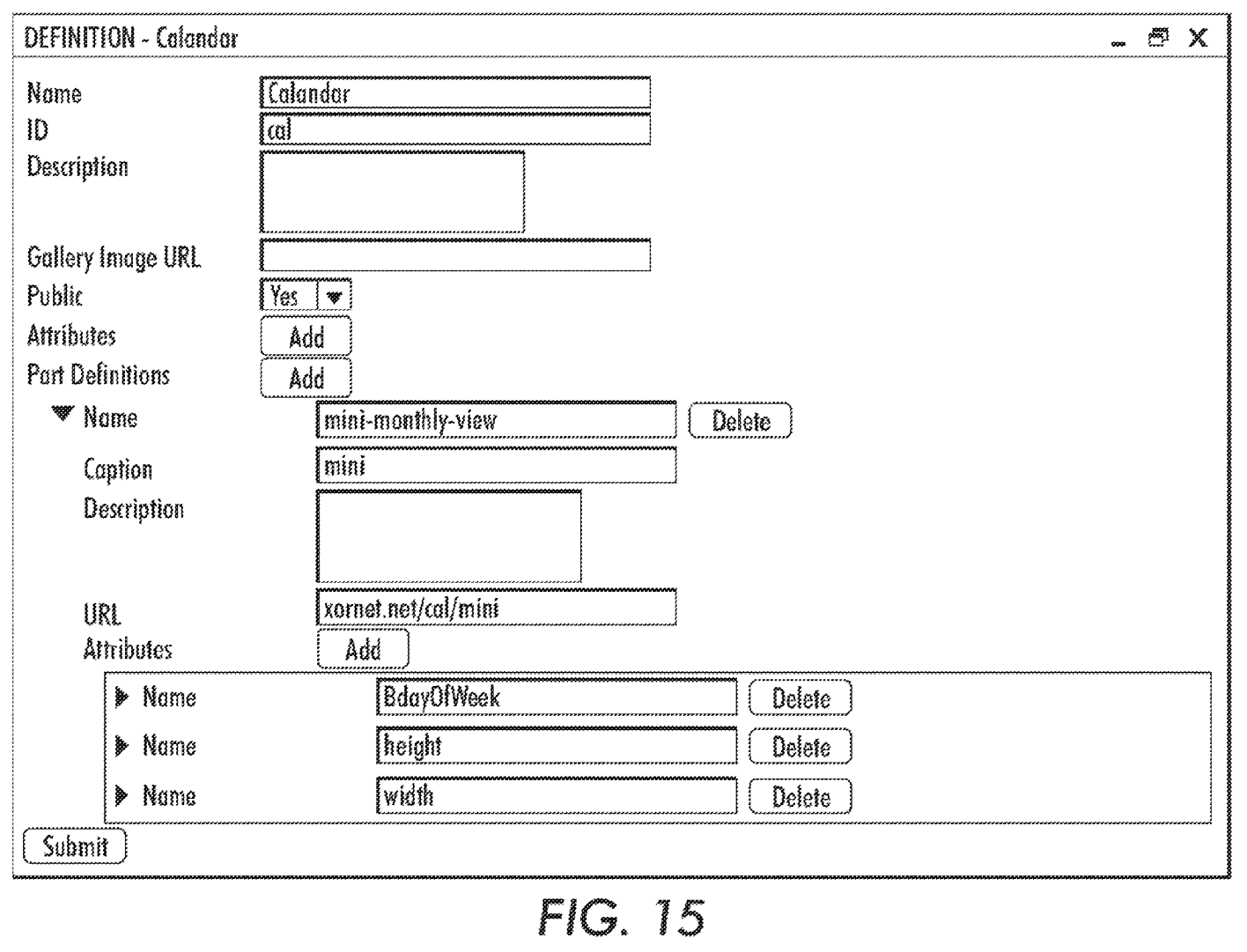

The separation of application subscriptions and application parts allows the publisher to use the application part across multiple distributed application subscriptions if desired, thus allowing the distributed application part to be integrated with multiple host applications or providing multiple copies of the distributed application part in a single host application. This also allows for other publishers to associate a predefined distributed application part instance with their own distributed application subscription. As an example, FIG. 15 depicts one preferred embodiment of the present invention in which a distributed application is a calendar system wherein the distributed application end user is provided the ability to post calendar entries and related information. In this example case where a single subscription to said calendar system, a subscription interface which allows for the storage of entries for that subscription is shown in FIG. 16. In order for the publisher to allow for multiple calendars it is necessary for the publisher to have multiple subscriptions for said calendar system. In this example each calendar subscription will store and maintain the entries for each calendar subscription separately. In this example of one preferred embodiment of the present invention, a part definition associated with the distributed calendar may be named "mini-monthly-view". The "mini-monthly-view" has the following customizable attributes: the beginning day of week (Sunday or Monday), a height and a width as depicted in FIG. 15. In this example, let us assume the publisher would like to maintain a uniform look to the host site. The publisher can use the part interface to create a mini month view part instance, as shown in FIG. 17.

Referring again to FIG. 17, as an example, the publisher can create a part (of type "mini-monthly-view") called "Standard-Mini-View" which sets the beginning day of week to Sunday and the height to 30 and the width to 100. With that part now created, any number of publishers can individually subscribe to the calendar application and pair it to the already created "Standard-Mini-View" part and effectually have a working "mini-monthly-view" which is formatted the same as for all other end users of said distributed calendar application subscription, but which displays the private calendar data of each individual subscription.

Application Distribution Via Website Adapter

Figure 18:
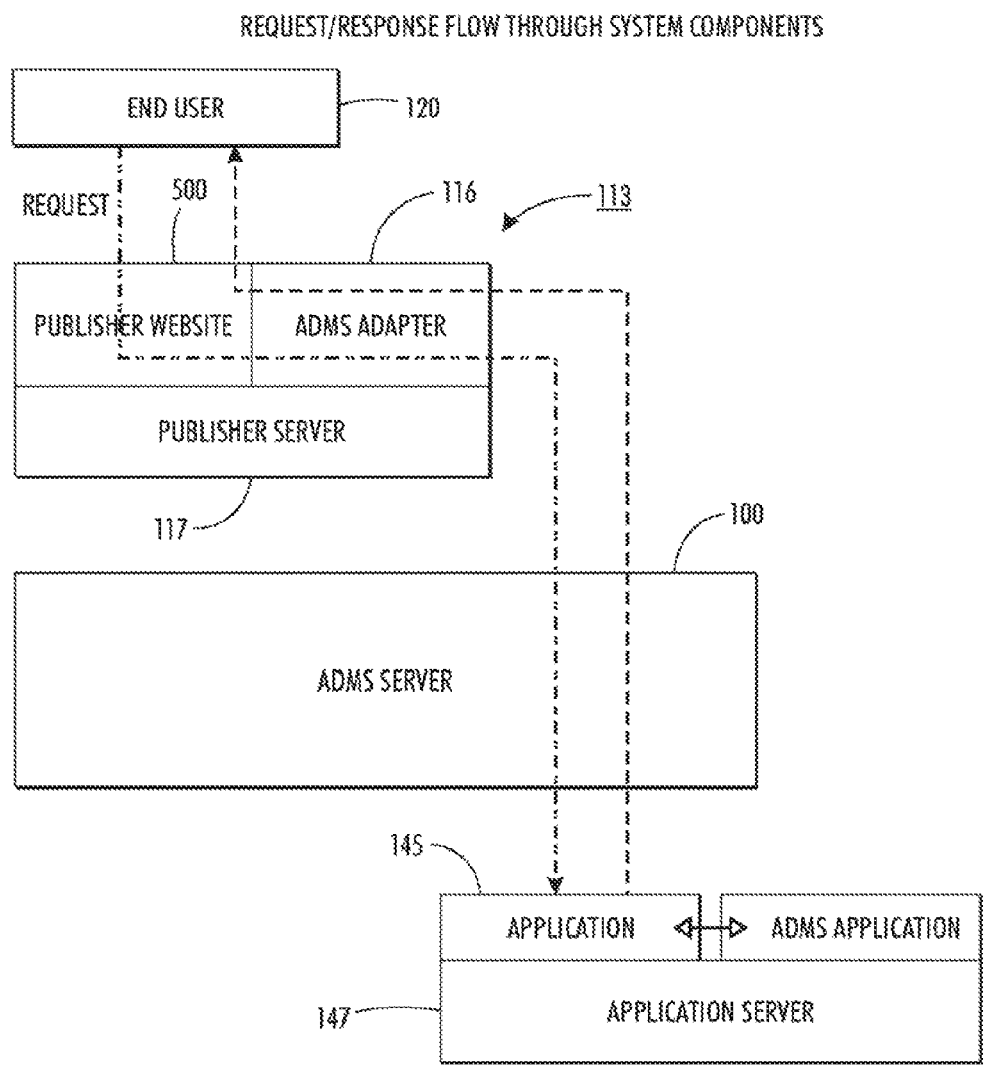
FIG. 18 depicts a representation of the communication flow from at least one end user through to at least one distributed application and back from the at least one distributed application to the at least one end user.

FIG. 18 is a representation of the communication flow from at least one end user 120 through to at least one distributed application 145 and back from the at least one distributed application 145 to the at least one end user 120. For clarity, the description of this communication flow will focus on a single end user 120 using a single distributed application 145. The end user communicates with a host application 113. In one preferred embodiment this communication occurs on a publisher website 500 residing on a publishers server 117 as depicted in FIG. 18. In another preferred embodiment this communication occurs on a mobile device. In yet another preferred embodiment this communication occurs on a digital cable set top box. In yet another preferred embodiment this communication occurs on an end user's computer. The host application 113 communicates with the ADMS 100 which in turn communicates with the distributed application 145. The distributed application 145 communicates back with the ADMS 100 which in turn communicates with the host application 113 at which time the end user 120 uses the distributed application 145. An ADMS adapter 116 residing on the host application server 113 is used by the present invention to successfully deliver the distributed application 145 from the distributed application server 147 to the host application 113 without actually running or installing the distributed application 145 on the host application 113. In effect, the ADMS adapter 116 "adapts" the host application 113 for use with the ADMS 100. The ADMS adapter 116 essentially forwards an end user's requests to the ADMS 100 which forwards the request to the distributed application 145. In one preferred embodiment, the ADMS adapter 116 forwards an end-user's requests using the network protocol implemented by the host application 113 to the ADMS 100 via the EHDF data format over the network protocol implemented by the host application 113. The distributed application 145 responds back to the ADMS 100 which forwards the response back to the host application 113 which sends the response to the end user 120. This forwarding is all done through the host application 113 and gives the appearance that the distributed application 145 is actually running on the host application 113 to which the end user 120 is visiting, when actually the distributed application 145 is running on a separate distributed application server 147.

Not a Proxy

Referring again to FIG. 18, one should understand that while the ADMS adapter 116 contains features of a proxy, the ADMS adapter 116 provides features and mechanisms far beyond the scope of a proxy, particularly but not limited to aggregation of multiple parts per publisher host application 113 and the techniques surrounding the transmission, display, setup and management of the multiple parts. The specific techniques are detailed below within the sections "Automatic pre-fetching of parts", "Transformation Techniques", "Security-compatible Application Interface Enhancement", "Cookie Scope" and "Automatic user-experience enhancement via Javascript XML HTTP techniques".

Automatic Pre-Fetching of Parts

Automatic pre-fetching of parts is a type of batch retrieval used against at least one part request on initial page loads. As a representative example which those skilled in the art will be aware should not be construed to limit the scope of the present invention, consider a case where an end user visits a page on a host application. For this example, the page contains 5 different distributed application parts. On the first (of 5) encounters of a displayPart( )method on the page, the ADMS receiving the request will first check to see if the call is the first displayPart( ) call of the current request from the page and if so, then will check to see if it has received at least one displayPart( ) call from the page but on a previous request. If the AMDS has previously received a displayPart( ) call, then the AMDS executes all the displayPart( ) calls known to have previously been called from the page. All responses (from the corresponding distributed application servers) from the displayPart( ) calls are returned jointly to the application adapter in the same request using the EHDF data format, thereby eliminating costly multiple round trips from the host application to the ADMS. All secondary (other than first call) displayPart( ) calls on that page first check a cache on the application adapter for the request to see if the AMDS's response has already been returned in the pre-fetch. If the response has been returned, then the pre-fetch value is spliced (or stitched) into the resultant host application page at the position where the displayPart( ) call appeared. When the request for the part is the initial request and the part is not in the cache (i.e., the part had not been pre-fetched), then a call is sent to the ADMS. Subsequent requests by the same or other end user will make full use of the pre-fetch feature and only require a single connect-request-response cycle to the ADMS before content is ready to be stitched into the markup for that page.

New displayPart( ) calls are automatically requested individually the first time an end user visits the host application's page containing those calls, thereby adding them to the pre-fetch group for the page. All successive visits to the page, regardless of the end user visiting the page, will make full use of the pre-fetching mechanism for a new displayPart( ) call. Pre-fetching reduces the number of connections to the ADMS which the host application uses in rendering each page. This pre-fetching occurs automatically which eliminates any manual configuration on the part of the publisher. The overall effect of this mechanism decreases perceived and real response time for the end user (performance) and reduces network usage and congestion (cost).

Not Limited to a Single ADMP Server Connection

ADMS is a service, as such multiple entities may provide the ADMS service. The application adapter allows distributed applications from multiple ADMS Services to be integrated with a host application.

Referring again to FIG. 18, the ADMS adapter 116 employs a multiple ADMS service registry capable of registering multiple ADMS services which detail the application adapter's communication connections. This allows the ADMS adapter 116 to connect to at least one publisher account across at least one application host through at least one ADMS service. The ADMS service to which a displayed part connects is denoted by the HOST detailed in the URI for the Part (see diagram 74-partURI.tiff) which is a parameter passed to the displayPart( ) call. The complexities of the authentication and account information associated with a registry entry are confined to this service list and simply referenced on the part URI in the displayPart( ) call.

Not Limited to Web Sites

As will be readily apparent to those skilled in the art, the present invention's application is not limited to the Internet and web sites. Any data transmission scenario which delivers markup to an end client will lend itself well to the mechanisms described for this invention.

Adapter Implementation Techniques

As will be readily apparent to those skilled in the art, there exist various techniques for implementing the functionality of the application adapter. Three of these methods will be described herewith. As those skilled in the art are aware, other methods might use a cross-section of ideas and features found in these methods or other readily available methods to accomplish the functionality of the application adapter. The name of the application adapter script file (in implementation techniques requiring a named file) may be generated randomly by the ADMS to provide for non-interference with existing files and for cloaking from ad-blocking software or the name can be explicitly specified by the publisher. The method names in the application adapter script file may be generated randomly as well to ensure non-interference with existing method names in existing publisher's host application.

Figure 19:
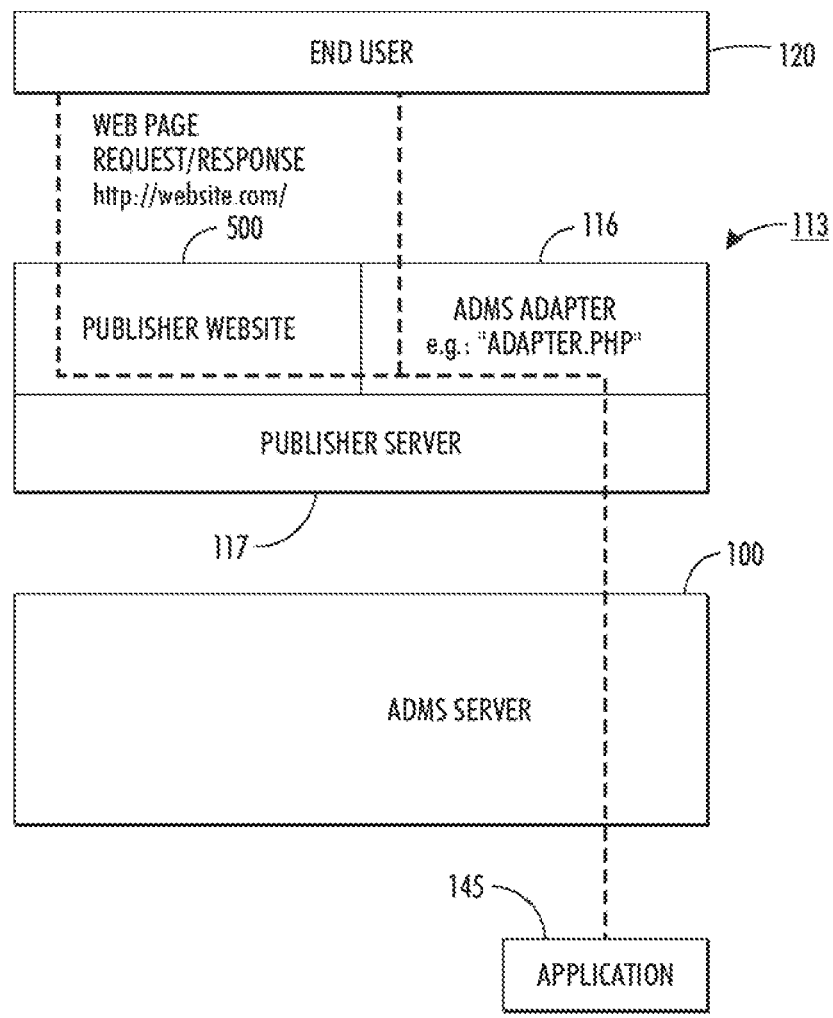
FIG. 19 depicts one adapter implementation technique.

FIG. 19 depicts one preferred embodiment of an adapter implementation technique. The technique to implement an application adapter uses a script file.

The script file 116 which resides on the Publisher Server 117 in the same file directory from which the host application 500 is served from. The script file would be written in a web scripting language supported by the publisher host's web server (e.g. PHP, JSP, ASP, etc.). The main sections of code within the script file are described herewith. A list of web application services available to the site is presented. An example of the attributes of a service include:

serviceId
serviceHost
servicePort
servicePortSecure
servicePath
accountID
authorizationCode.

Preparing Cookie response headers to send back to client are prepared.

This must be done as the first operation of the script so that when the script is "included" in a host application 500, the cookies are set in the response headers before the host application server 117 starts returning page content. Once the host application server 117 starts returning page content, the response headers can no longer be modified for that response.

Forwarding a request from the end user 120 to the host application server 117 through the ADMS server 100 to the distributed application 145, then back to the ADMS 100, then back to the Host Application Server 117, and then returning the result of that request back to the end user 120.

Figure 20A:
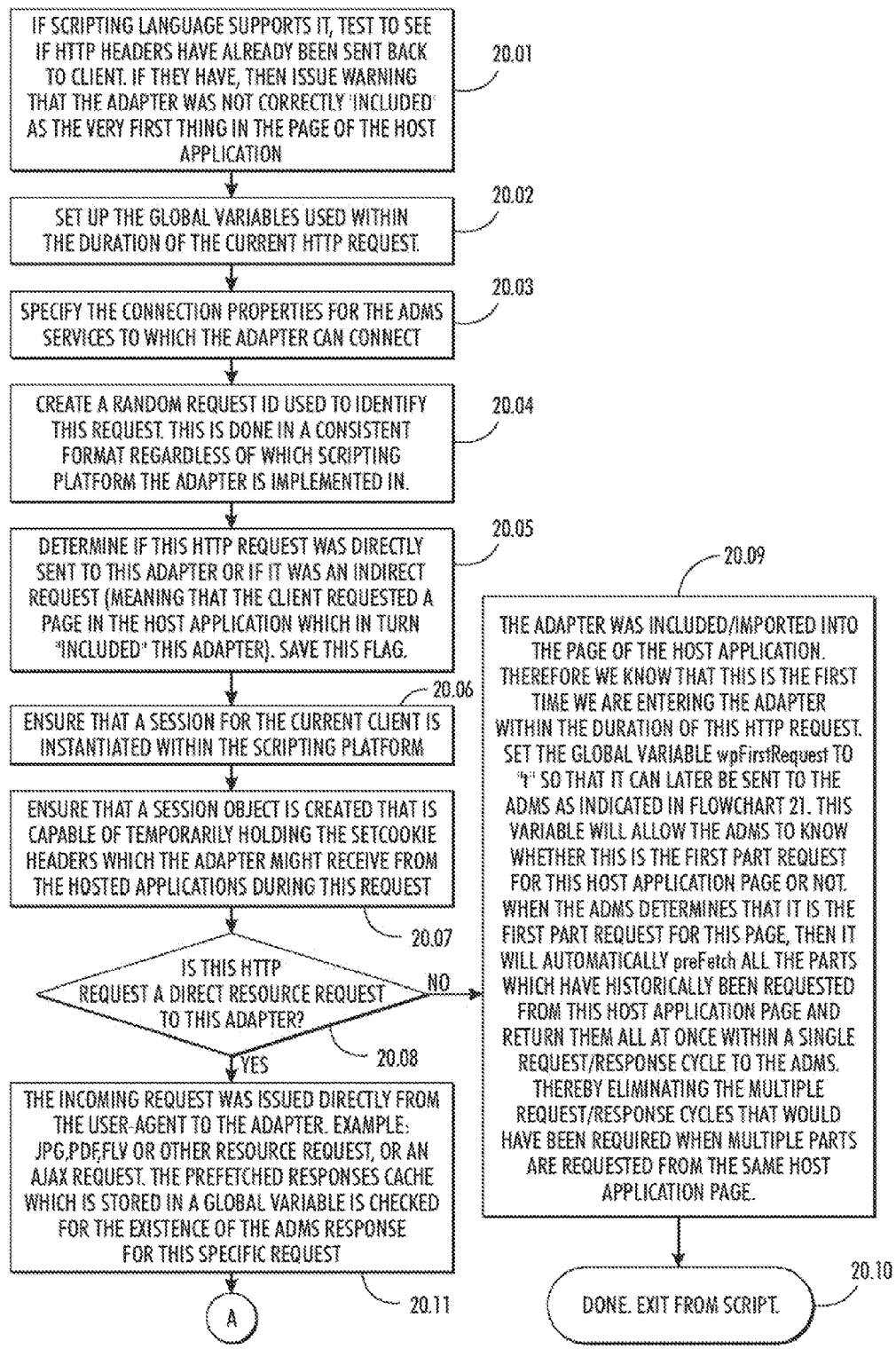
FIGS. 20A, 20B, 21A, 21B, and 22 depict flowcharts for a method used by an adapter.
Figure 20B:
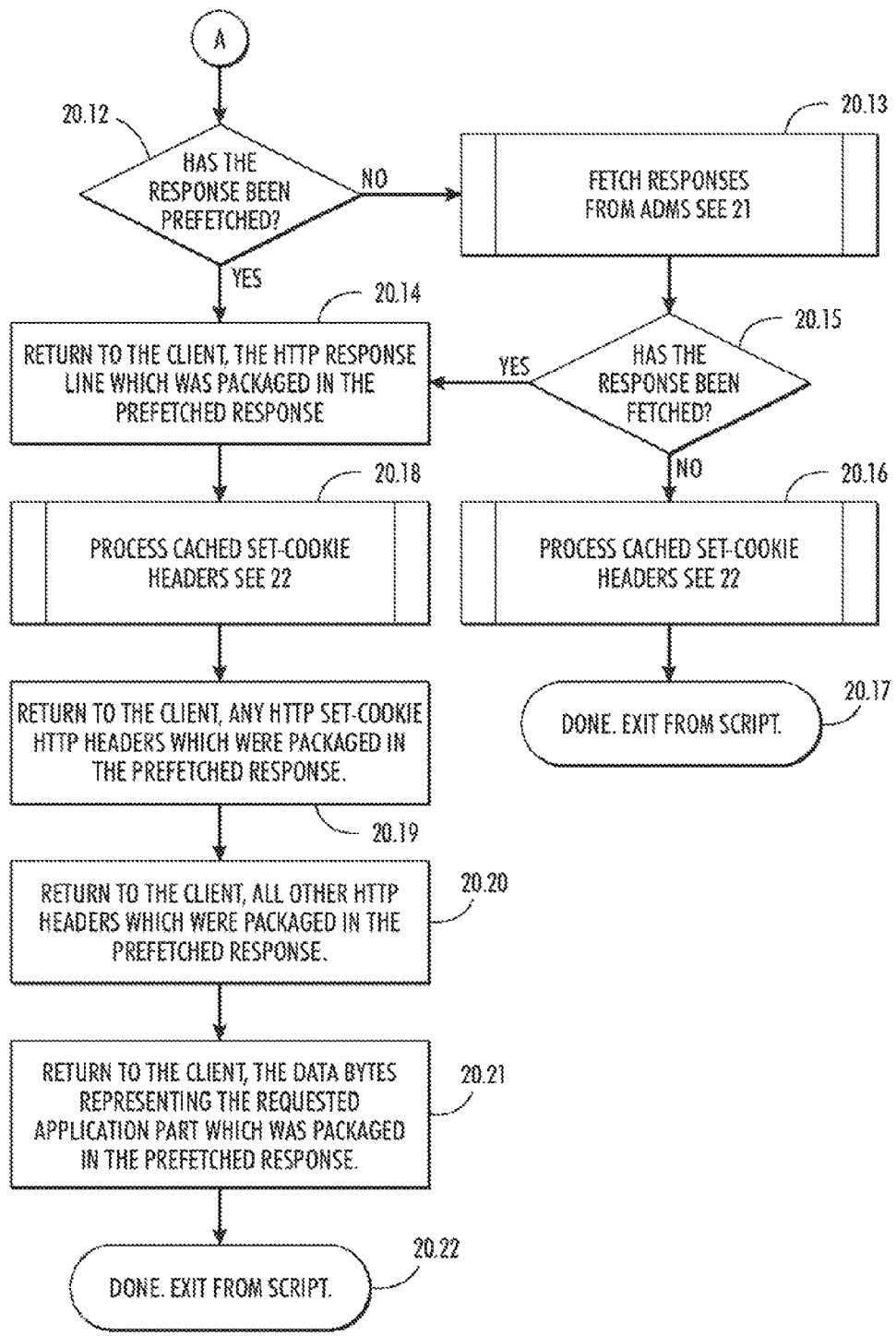
Figure 21A:
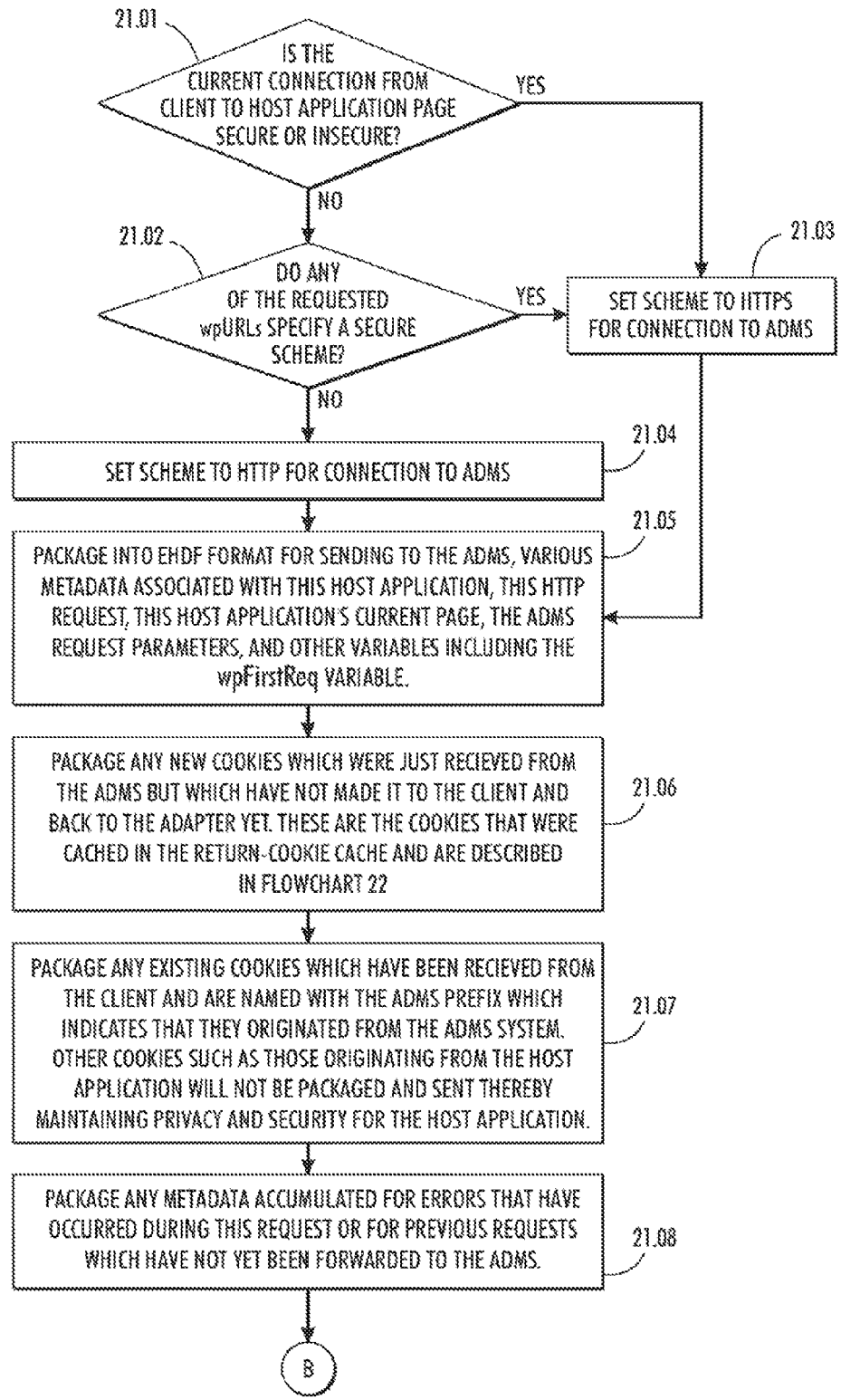
Figure 21B:
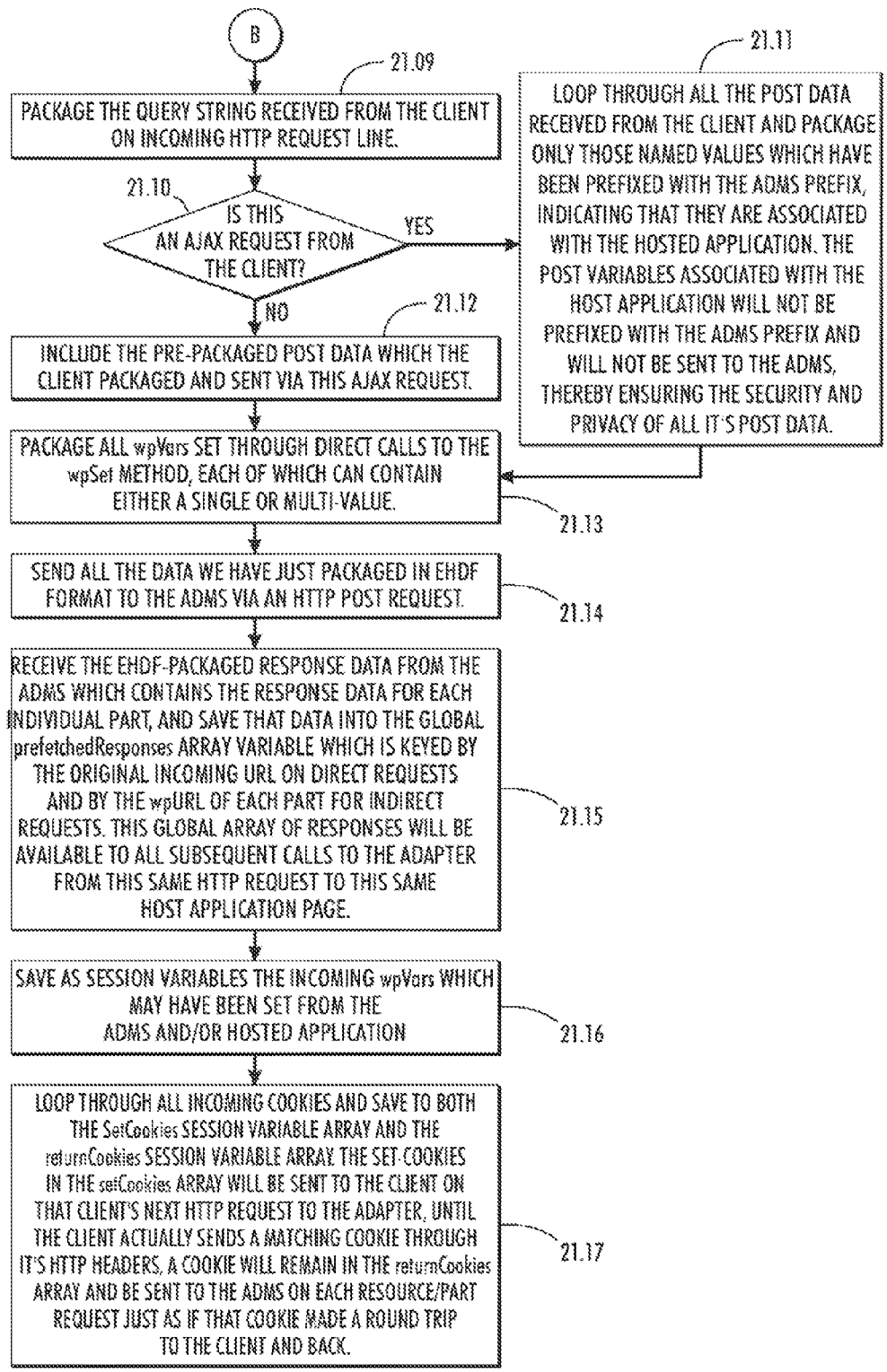
Figure 22:
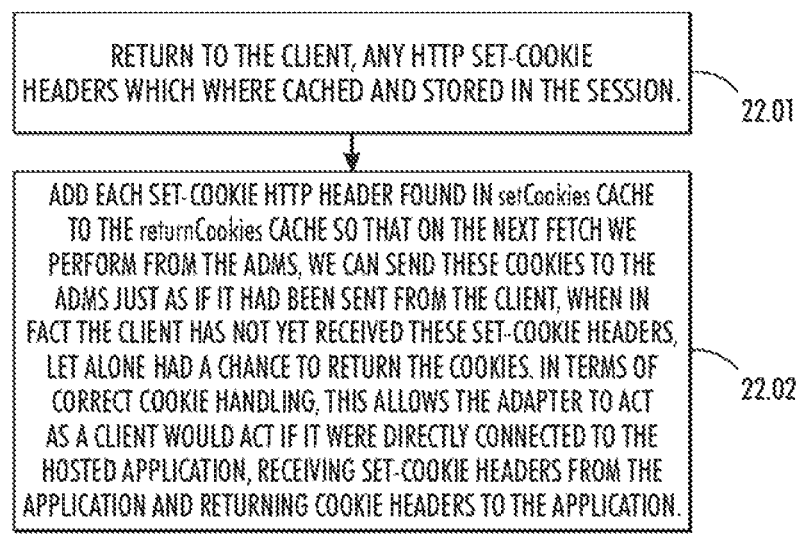

This is the main body of code that gets called both when a host application 500 contains a server-side method call to the distributed application 145 via an indirect request, and when the end user 120 sends a request directly through the application adapter file 116 via a direct request in order to retrieve images, documents, or other resources or to communicate with the application server via Ajax. FIGS. 20 through 22 illustrate one preferred embodiment of the processing carried out within the script file adapter implementation technique depicted in FIG. 19. During both a direct request to the adapter and upon inclusion of the adapter in a host application page, the following takes place as depicted in FIG. 20:

Referring to FIG. 20, in step 20.01 if the scripting language supports it, test to see if HTTP headers have already been sent back to the client (end user). If they have, then issue a warning that the adapter was not correctly "included" as the very first thing in the page of the host application.

In step 20.02, the global variables used within the duration of the current HTTP request are set up.

In step 20.03, the connection properties for the ADMS services to which the adapter can connect are specified.

In step 20.04, a random request ID is created which is used to uniquely identify this request to the ADMS. This is done in a consistent format regardless of which scripting platform the adapter is implemented in by randomly appending a character from the string '0123456789ABCDEFGHIJKLM-NOPQRSTUVWXYZabcdefghijklmnopqrstuvwxyz' until 40 characters have been accumulated.

In step 20.05, it is determined if the current HTTP request was directly sent to the adapter or if it was an indirect request, meaning that the client (end user) requested a page in the host application which in turn "included" this adapter. The result is saved as a flag.

In step 20.06, it is ensured that a session for the current client (client) is instantiated within the scripting platform. This session is then used to store session objects (or variables) which allow maintenance of a unique object state to the visiting client (end user).

In step 20.07, it is ensured that a session object is created that is capable of temporarily holding the setcookie headers which the adapter might receive from the host application during this request.

In step 20.08, if the HTTP request is a direct resource request to the adapter, then the incoming request was issued directly from the user-agent to the adapter. An example would be a jpg, pdf, flv or other resource request, or an Ajax request.

The prefetched responses cache which is stored in a global variable is checked for the existence of the ADMS response for this specific request in step 20.11.

In step 20.08, if the HTTP request is not a direct resource request then this means that the adapter was included or imported into the page of the host application. Therefore this is the first time the adapter is entered within the duration of this HTTP request. The global variable wpFirstRequest is set to 't' so that it can later be sent to the ADMS as indicated in FIG. 21. This variable will allow the ADMS to know whether this is the first part request for this host application page or not. The ADMS maintains the association between host application pages and the parts that reside on them. As those skilled in the art are aware, there are many storage methods suitable for which to associate the recently requested parts to a particular page on the host application. When the ADMS determines that it is the first part request for this page, then it will automatically prefetch all the parts which have historically been requested from this host application page and return them all at once within a single request/response cycle to the ADMS; thereby eliminating the multiple request-response cycles that would have been required when multiple parts are requested from the same host application page. In step 20.09, in this indirect request scenario in which the adapter is included (imported), the adapter is now finished running its code until one of its methods is called from the host application's page.

In step 20.12, the adapter looks to its internal cache to see if the response for this resource has already been fetched during a previous call. If it has not, then an attempt is made to fetch the response from the ADMS in step 20.13, and if the adapter still does not receive a response for this resource in step 20.15 then any cached set-cookie headers are processed in step 20.16 and the script exits in step 20.17. If the adapter did find a previously received response for this resource in its cache, or if the adapter received a response for this resource from the ADMS due to absence of the resource from the cache, then any cached set-cookie headers are processed in step 20.18; the set-cookie headers found packaged within the fetched response are returned to the client (end user) in step 20.19; the non-cookie found packaged in the fetched response are returned to the client (end user) in step 20.20; the data bytes representing the requested application part which was packaged in the fetched response are returned to the client (end user) in step 20.21; and the script exits in step 20.22.

FIG. 21 depicts one preferred embodiment of the process used within the adapter to fetch responses from the ADMS:

In step 21.01 the current connection from the client (end user) to host application is tested for its secure status (http/https). In step 21.02 the requested wpURIs are tested to determine if they specify a secure scheme. If the result of either test is affirmative, then in step 21.03 the scheme for connection to the ADMS is set to HTTPS. If the result of neither test is affirmative, then the scheme is set to HTTP in step 21.04. In step 21.05, package into EHDF format (see FIG. 23) for sending to the ADMS, various metadata, as anyone skilled in the art would be aware of, associated with this host application, this HTTP request, this host applications current page, the ADMS request parameters, and other variables including the wpFirstReq variable.

In step 21.06, package into EHDF format any new cookies which were just received from the ADMS but which have not made it to the client (end user) and back to the adapter yet. These are the cookies that were cached in the return-cookie cache and are described in more detail in FIG. 22.

Referring again to FIG. 21, in step 21.07 package into EHDF format any existing cookies which have been received from the client (end user) and are named with the ADMS prefix which indicates that they originated from the ADMS system. Other cookies, such as those originating from the host application, will not be packaged and sent thereby maintaining privacy and security for the host application.

In step 21.08 package any metadata accumulated for errors that have occurred during this request or for previous requests which have not yet been forwarded to the ADMS.

In step 21.09 package the query string received from the client (end user) on incoming HTTP request line.

In step 21.10, the query string is analyzed, and if this is an Ajax request from the client (end user), then in step 21.12 include the post data which was pre-packaged into EHDF at the client (end user) and sent via this Ajax request. Otherwise, in step 21.11 loop through all the post data received from the client (end user) and package only those named values which have been prefixed with the ADMS prefix, indicating that they are associated with the host application. The post variables associated with the host application will not be prefixed with the ADMS prefix and will not be sent to the ADMS, thereby ensuring the security and privacy of all the host application's post data.

In step 21.13 package all wpVars set through direct calls to the wpSet method, each of which can contain either a single or multi-value.

In step 21.14 send all data we have just packaged into EHDF format to the ADMS via an HTTP post request.

In step 21.15 receive the EHDF-packaged response data from the ADMS which contains the response data for each individual part, and save that data into a global prefetched responses array variable which is keyed by the original incoming URL on direct requests and by the wpURI of each part for indirect requests. This global array of responses will be available to all subsequent calls to the adapter from this same HTTP request to this same host application page.

In step 21.16 save as session variables, the incoming wpVars which may have been set from the ADMS, the host application, or both.

In step 21.17 loop through all incoming cookies and save to both a setCookies session variable array and a returnCookies session variable array. The set-cookies in the setCookies array will be sent to the client (end user) on that client's (end user's) next HTTP request to the adapter. Until the client (end user) actually sends a matching cookie through its HTTP headers, a cookie will remain in the returnCookies array and be sent to the ADMS on each resource/part request just as if that cookie made a round trip to the client (end user) and back.

FIG. 22 depicts one preferred embodiment of the process by which cached set-cookie headers are processed.

In step 22.01 return to the client (end user), any HTTP set-cookie headers which where cached and stored in the session.

In step 22.02 add each set-cookie HTTP header found in the setCookies cache to the returnCookies cache so that on the next fetch we perform from the ADMS, we can send these cookies to the ADMS just as if it had been sent from the client (end user), when in fact the client (end user) has not yet received these set-cookie headers, let alone had a chance to return the cookies. In terms of correct cookie handling, this allows the Adapter to act as a client (end user) would act if it were directly connected to the host application, receiving set-cookie headers from the application and returning cookie headers to the application.

Efficient Hierarchical Data Format

In order to more efficiently send and receive data between components of the ADMS, an Efficient Hierarchical Data Format (EHDF) is used as depicted in FIG. 23. A core element of the EHDF protocol is the length prefix 600. All names and values used within the ADMS are prefixed with a length prefix 600 which denotes exactly how many bytes of data will follow. The length prefix 600 is composed of two parts. The first part 601 is a single byte read directly as an integer value 0-255 and shall be called the number string prefix. The second part 602 is known as the number string and is a series whose length is exactly number string prefix bytes long. Each byte in the number string represents a character in the range '0' to '9' (decimal ascii values 48 through 57). The series of bytes in the number string is then converted to a native number type most suitable for use in the current programming language using the available string-to-number function available to that language and the combination of the number string prefix and the number string thereafter becomes known as the length prefix 600. The length prefix 600 is preferably represented as a character string but may be represented by a more compact, multi-byte binary number type. The choice was made to represent the length prefix as a character string in order to eliminate the disparities one encounters when manipulating at the bit level, such as endianness of architecture, register sizes, and high-level web scripting language bitwise operators. The EHDF is the best mode for using the ADMS. Although other, more compact representations of the "number string" can be devised, these more compact representations necessitate less efficient transcoding of the number string and a more compact representation would require more script-level code to transcode the number string, whereas transcoding of a number string to an language-specific integer is usually a lower-level built-in function in most languages and executes at a higher speed. Examples of the variety of number data types which are avoided by using a string representation of the number include: byte (255 max), short (65535 max), int (2^32), long, and the like.

EHDF can be used as a data layer for network messaging, a document format to create structured data, and to send structured data.

The overall structure of an EHDF message is as follows. Each numbered item follows sequentially after the preceding numbered item with no spaces or other marks between them. The EHDF message comprises an initial data envelope header 610 composed of
the bytes 'EHDF' 611,
the EHDF major version number 612 presented as a single byte integer value, and
the EHDF minor version number 613 as a single byte integer value;
a free format schema identifier 650 as a length prefix (LP) 600 and value 652; followed by
the remaining document which is composed of a series of 0 or more parts 620 each prefixed with a single byte part header (631, 641, 651, 661) each of which has certain rules on what can follow.

The rules for what can follow include the following part headers:

'(' 631 begins an non-named group 630. Any number of other part headers can follow this part header. A non-named group 630 is closed when a ')' 632 is encountered;

'{' 641 begins a named group 640 and is immediately followed by a length prefixed name 642 after which any number of other part headers can follow. A named-group 640 is closed when a ')' 632 is encountered;

A ')' 632 ends the most recent group whether named or non-named.

A 'V' 651 denotes an non-named value 650 and is immediately followed by a length prefix 600 and a length prefixed value 652;

An 'N' 661 denotes a named value 660 and is immediately followed by a length prefix 600 and a length prefixed name 662 which is then immediately followed by another length prefix 600 and a length prefixed value 652.

Using the five above-mentioned part headers, a message as rich in structure as any XML document can be created. Following is an example XML document of a person object

```
<person lastname="smith" firstname="john">
<picture
dt="bin.base64">MDlxODM0NWFzZjA5OHVxMjM0dWFlcGZlanE=
</picture>
<address>
<street>123 main st.</street>
<city>rochester</city>
<state>ny</state>
<zip>12345</zip>
</address>
<age years="10" months="2"/>
<visitTimes>
<visitTime>1:00pm</visitTime>
<visitTime>2:00pm</visitTime>
<visitTime>3:00pm</visitTime>
<visitTime>4:00pm</visitTime>
</visitTimes>
</person>
``` and an example of the comparable structure developed when created using in a style of schema "XML-Compatible"—how one might use EHDF in a convention that preserves the distinction between XML elements and XML attributes. For readability, length prefixing is not shown and whitespace and line breaks are added in.

```
EHDF 1 0 XML-Compatible
{person N lastname smith N firstname john
{picture N dt bin.base64 V 09q8345asf098uq234uaepfejq)
{address
{street V 123 main st.)
{city V rochester)
{state V ny)
{zip V 12345)
)
{age N years 10 N months 2)
{visitTimes
{visitTime V 1:00pm)
{visitTime V 2:00pm)
{visitTime V 3:00pm)
{visitTime V 4:00pm)
)
)
```

The above markup is an example document in EHDF in a style of schema "XML-Compatible".

Following is an example document in EHDF in a style of no schema, with no regard for reverse mapping to xml. This is the most efficient way to use EHDF and how one would normally use EHDF. For readability, length prefixing is not shown and white space and line breaks are added in.

```
EHDF 1 0
{person N lastname smith N firstname john
N picture 09q8345asf098uq234uaepfejq
{address
N street 123 main st.
N city Rochester
```

-continued

```
    N state ny
    N zip 12345
    )
    {age N years 10 N months 2)
    {visitTimes V 1:00pm V 2:00pm V 3:00pm V 4:00pm)
    )
```

Referring to FIG. 2, the present invention implements an EHDF for transmitting data between the application adapter and ADMS and also provides for a mechanism for distributing applications.

Descriptions of the various components of the ADMS will be described in terms of "subsystems". Each subsystem may be composed of one or more of the following: integration techniques, configuration interfaces, application programming interfaces, hereafter referred to as API's, and implementations. The subsystems described here in represent one preferred embodiment of the present invention. For improved clarity of the description, in the current embodiment of the invention the components and subsystems of the present invention will described as running within the ADMS. As will be made apparent to those skilled in the art, the components of the present invention may run separately on different computer hosts and systems.

Figure 24:
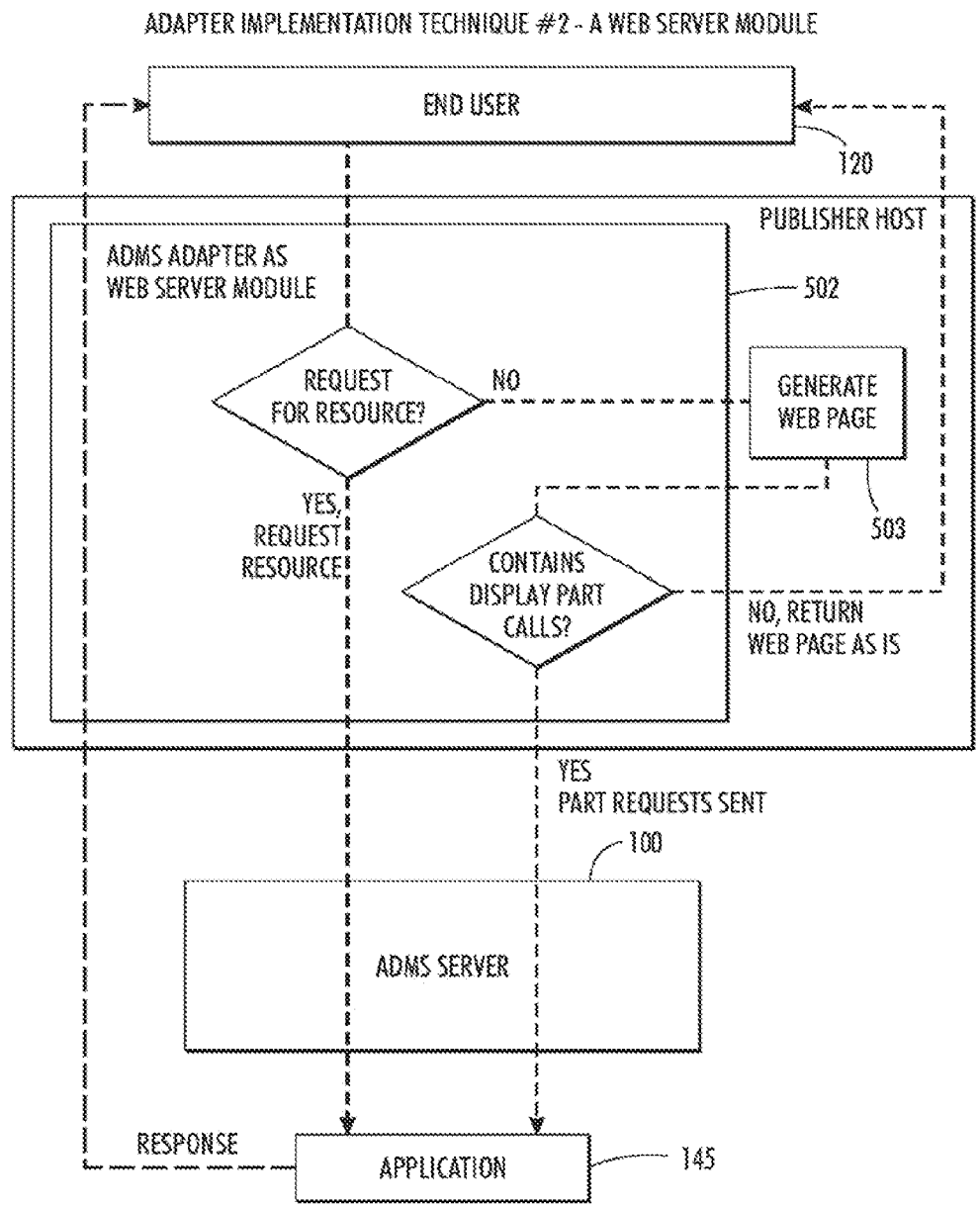
FIG. 24 depicts another adapter implementation technique.

FIG. 24 depicts another adapter implementation technique. This application adapter implementation technique is to make use of a web server module.

Most web servers allow one to write what is typically called a "module". A module becomes an integral part of the web server and adds functionality directly to that web server. That functionality becomes available to all sites running in that web server and usable across all scripting languages supported by that web server.

The web server module is implemented as follows.
  A list of services is set up (with parameters mentioned above in script file method) in a fashion most appropriate for the specific web server type (e.g. Apache, IIS) which may include using the server's text-based configuration file or files.
  All incoming requests are filtered for specific signatures which indicate their relation to the distributed application and if matching, they will be forwarded through the ADMS server 100 and to the distributed application 145 via the distributed application server (not depicted) and the response will be returned to the client (end user) 120. This is how direct resource (e.g., images and documents) requests and Ajax calls are forwarded to the distributed application server. All non-related requests are passed on to the publisher host 501 to handle via a publisher host 501 default protocol.
  All outgoing responses from the publisher host 501 to the client (end user) 120 are "filtered" by a web server module 502. The content of the responses is searched for any markup which is relevant to the host application and the distributed application 145. If any markup sections are found, the distributed application method call referenced in each section is forwarded to the distributed application server through the ADMS server 100 and the space where the original markup was found in the content is thus replaced by the content which the distributed application server returns from the related method call.

Figure 25:
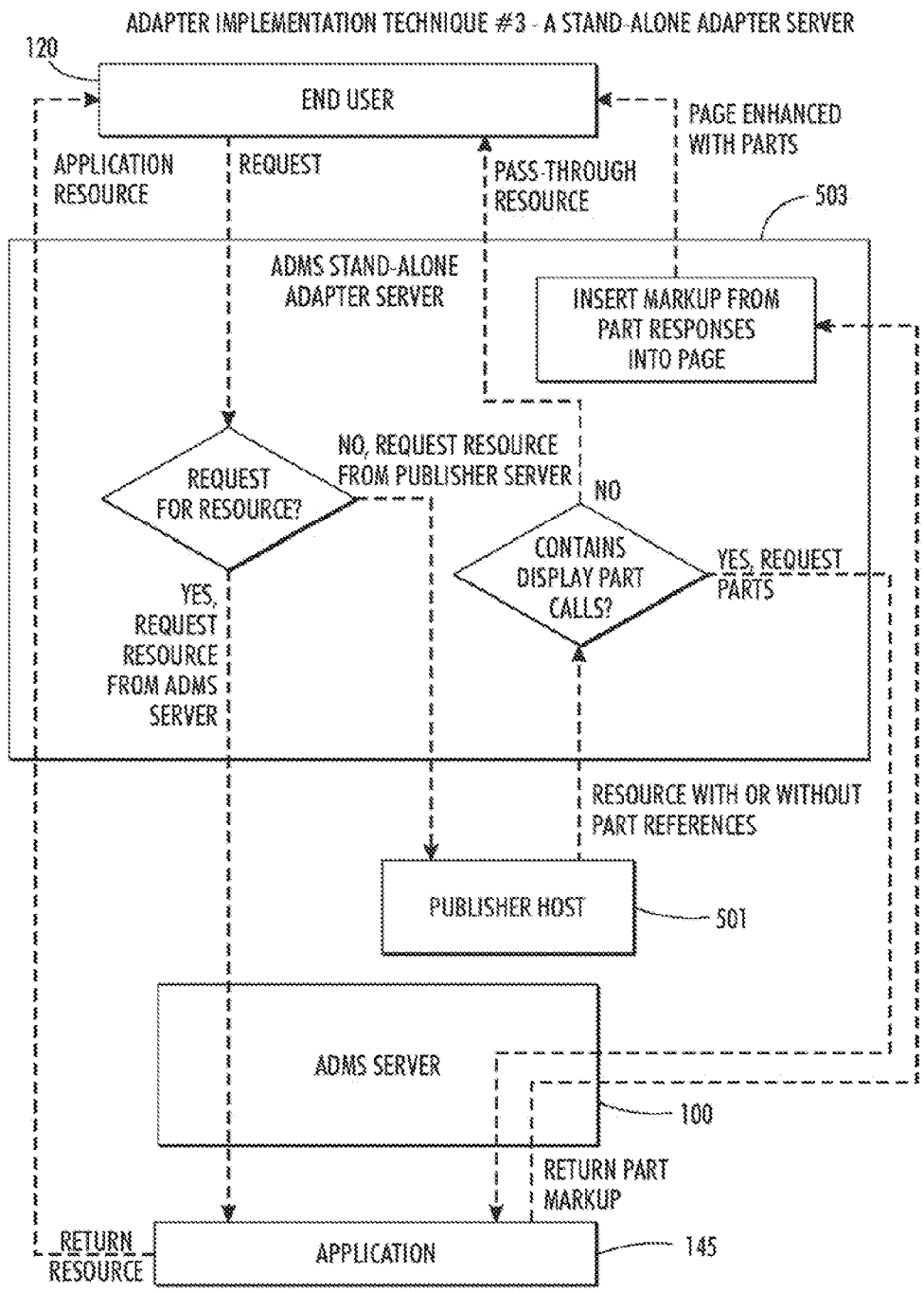
FIG. 25 depicts yet another adapter implementation technique.

FIG. 25 depicts yet another adapter implementation technique. This application adapter implementation technique is to make use of a stand-alone application adapter server.

Another method for implementing the functionality of the application adapter is via a stand-alone application adapter server 503. This application adapter server 503 could be written in any computer language appropriate for compilation to the desired OS. It could run on the same computer that is serving the publisher host application (not depicted) or it could run on a separate machine (i.e. server or appliance).

The application adapter server 503 is implemented in the following way:
  The IP address previously mapped to the publisher web site's domain is instead mapped to the application adapter server 503. The publisher server 501 is then mapped to an internal IP address not visible on the internet.
  All incoming requests to the publisher host 501 are received by the application adapter server 503.
  Incoming requests with specific signatures that indicate their relation to the distributed application 145 are forwarded to the ADMS server 100 and the response from the ADMS server 100 is returned to the client (end user) 120.
  Incoming requests that do not have anything to do with the distributed application 145 are passed on to the publisher server 501. The outgoing response from the publisher server 501 to the client (end user) 120 is "filtered". The content of the response is searched for any markup which is relevant to the distributed application 145. If any markup sections are found, the distributed application method call referenced in each section is forwarded to the ADMS server 100 and the space where the original markup was found in the content is thus replaced by the content which the distributed application server (not depicted) returns through the ADMS Server 100 triggered from the related distributed application method call.
  Alternatively, the ADMS 501 itself may be integrated directly into the application adapter server 503.

The present invention allows developers to create distributed applications modularly and it allows host application publishers to integrate those distributed applications into their host application modularly. Each page of the publisher's host application is able to serve multiple application parts and each part runs seamlessly within its host page without disrupting the operation of the native page or any of its neighbor parts. Each distributed application needn't concern itself with the state of other, as-yet-unknown application peers in as-yet-unknown publisher host applications. Distributed application state is automatically maintained and isolated from other in-line applications on the publisher's server.

In order to maintain distributed application part autonomy and isolate distributed application part state and yet provide a persistent (consistent and repeatable) series of URLs with which those distributed application parts can be referenced within their host application and indexed within search engines, the present invention makes use of various transformation techniques. The default transformation technique is "automatic" and works by parsing the markup from the application and transforming chosen select portions thereof. Those portions which are automatically transformed are: all anchors (inline links to other web pages), all resources (e.g., links to pdf files), all image tags, and all html forms. The anchors, resources and images are transformed so that their respective URLs are made local to the current publisher site. More specifically, those resources are diverted through the application adapter, as opposed to a direct fetch from end-user to application. The html forms are transformed into Ajax-style (XMLHTTP) forms usable by the distributed application. The html forms can also work through the adapter without being Ajax-enabled or when client-side scripting is disabled. This is done without losing the part autonomy and security features of the invention, though the user experience for the cClient (end user) is lowered since page updates must occur just as with any non-Ajax application.

The html hypertext links are also automatically Ajax-enabled as the forms are, and upon clicking on a link transformed to be Ajax-enabled, the cClient (end user) sees the content from that link appear within the current target element or a newly specified target element which the developer can specify as an attribute within the anchor tag.

The ADMS system also maintains pre-existing Ajax functionality if found within the host application.

Both the Ajax-enabled forms and Ajax-enabled links enable the updating of the host application part within the host application without requiring a refresh of the entire host application page within the client (end user), thereby greatly enhancing the user experience.

The ADMS enables automatic Ajax-enabled links, forms and resources in one preferred embodiment as follows:
- The HTML markup coming from the host application, hereinafter known as the host application markup, is parsed of it's contained HTML elements.
- The elements of interest to the parsing algorithm are checked in the order they are found as we parse the host application markup.
- If the current element is capable of containing URIs to resources that need to be tunneled through the adapter, it is handled now as a resource URI and the pertinent URI attribute value extracted. Examples of element and attribute combinations of this include but are not limited to: applet and codebase, img and src, and table and background.
    - The URI is translated to its absolute value, including the scheme, host, port and path. For instance, a relative URI of "/page1.html" is converted to "http://application.com:80/page1.html"
    - The absolute URI is looked up within the storage of the ADMS as would be understood by someone knowledgeable in the art.
    - If the URI is not found in storage, then it is created and a unique identification known hereinafter as the part Id is assigned as someone in the field would understand.
    - This URI is now considered a part within the context of this invention.
    - The part Id of this part which references this URI is appended as a query parameter within a new URI which points to the adapter on the host application page but which includes the part Id of the desired part as a query parameter and the result is the transformed resource URI. A representative example partId is "http://applicationHost/adapter.php?wp=partIdValue".
    - Any query parameters found on the URI are converted by prefixing each with the ADMS prefix and the SubscriptionId so that these query parameters will not interfere with the query parameters of other parts and of those on the Host Application page. For example: "a=avalue&b=bvalue" becomes translated to "wp_subIdl_a=avalue&wp_subIdl_b=bvalue". These newly prefixed query parameters are then appended to the end of the tranformed URI. A representative example SubscriptionId is "http://applicationHost/adapter.php?wp=partIdValue& wp_subIdl_a=avalue&wp_subIdl_b=bvalue" The prefixing in the transformed URI maintains the part's autonomy amongst the various other query parameters belonging to either the host application page or the other parts on that host application page.
    - The resultant transformed resource URI is put in place of the original URI and then appended to the buffered markup we are readying for return to the client (end user).
- If the current element is a form element, then its pertinent attributes are examined. If the examination shows that the form contains an "action" attribute,
    - then if that attribute's value starts with "Javascript" then it is left as is so that the host application can override any auto-parsing if desired; else if that attribute's value does not start with "Javascript" then the destination URI is converted to a part. Then, without writing the "action" attribute out to the destination markup buffer, instead write out to the destination buffer the "onsubmit" attribute with a value equal to the Javascript code necessary, as would be apparent to the those skilled in the art, to call the ADMS by way of the adapter URL. The Javascript code will pass the partId and dynamically gather and send the form fields triggered by client (end user) submission of the form. The Javascript will pre-package the form data into EHDF format and then forward to the ADMS by way of the adapter.

A novel feature of the invention is the ability to forward a form to the host application with all of the form's original attributes and the implications for the submission process which those attributes imply, without having to save those attributes to a storage medium of any sort. This feature is hereinafter known as ForwardedFormAttributes. Form attributes the values of which are necessary to remember when the form is submitted by the client (end user), forwarded through the adapter and then finally submitted to the host application by ADMS include but are not limited to "method" and "enctype". The invention encodes these attributes and their respective values into a single value hereinafter known as the EncodedFormAttributes as anyone skilled in the art could use any encoding technique desirable, and in a preferred embodiment, that value is written into the Javascript that gets inserted within the onsubmit attribute for the form. For example: onsubmit="xhPost(formObj, url, targetDivId, scrollToId, 'urlencodedOriginalFormAttributes');". The ADMS then receives these encoded values, decodes them and uses them during the submission of the form to the host application just as an end user would had it had the original form with the original attributes still intact and had it been connected to the host application directly. By forwarding to the ADMS the original attribute values of the form element in this way, we avoid having to store these values in a storage medium and the lookup of same which would be necessary on submission of the form. A novel feature of the present invention is the ability of the ADMS to maintain the Javascript functionality present in the original form which would have been enacted upon submission of the original form just as if the end user had been connected directly to the host application. This feature is hereinafter known as FormSubmissionCodeWrapping. In one preferred embodiment, this is enabled by wrapping, as one skilled in the art would understand, the original Javascript code which is found in the "onsubmit" attribute of the form, with ADMS Javascript. This ADMS Javascript first turns the original onsubmit Javascript into a function. Upon form submission by the end user, that ADMS Javascript is triggered which in turn calls the original Javascript (now wrapped in a function). If that function returns true then the ADMS Javascript then proceeds to forward that form's contents through the Adapter and onto the ADMS. If that function returns false, then the ADMS Javascript exits without forwarding the forms contents to the ADMS. An example of this would be Javascript in the original onsubmit attribute which validated a form value, such as making sure one of the form fields was filled in with a proper formatted telephone number. The ADMS Javascript in this case would call that validation code and if the phone number field was validated as a proper phone number, then the ADMS Javascript would submit the form throught the Adapter and onto the ADMS. If that field did not validate as a proper phone number, then the form submission would be cancelled and the script would exit.

If the element is of type "input" and contains an "type" attribute of value "submit", a novel feature of the invention is the ability to remember which button/input element was clicked, via in one preferred embodiment, creating an onclick attribute value as one skilled in the art would know, to Javascript code which sets a form value of name "submittedButtonValue" to the value of the "input" field that was clicked, thus allowing the ADMS Javascript code to know that it must forward this field and its value onto the ADMS through the adapter when the form is submitted. This feature is hereinafter known as SubmitButtonMaintenanceThroughoutTransformation For example, during transformation of a form into an Ajax-enabled form, the input field "testButton" contains a type attribute of "submit" thereby making it a button to any end user. When the end user clicks on this button, the onclick Javascript code is triggered which sets the form field "submittedButtonValue" to the value of the clicked button as would be readily apparent to one skilled in the art. Then as the onsubmit Javascript code is run and the form fields are looped through and their values collected for submission to the host application through the adapter, this field's value is compared to the form's "submittedButtonValue" variable. If the two match, then we know that this was the button which triggered the form submission and we therefore forward it and its value on along with the rest of the form fields. Without this novel feature, we would not be able to tell which input button triggered the submission in the ajax-enabled style. If we were to forward all the input field buttons and their values, then the host application upon receipt of all of them would have lost its ability to distinguish which button was pressed.

Another novel feature of the ADMS allows a developer to add an attribute to elements which contain an attribute of type URI (e.g. img, src, and the like), an attribute which signals the ADMS to force tunneling through the adapter or to force tunneling and cloaking. As those skilled in the art are aware, tunneling is when one network protocol (the delivery protocol) encapsulates a different payload protocol and cloaking is a black hat search engine optimization (SEO) technique in which the content presented to the search engine spider is different to that presented to the user's browser. By default, absolute URIs such as http://application.com/image1.jpg are not tunneled, but the developer of the application can optionally add the attribute data-tunnel with a value of "true" in order to force the ADMS to transform the URI to effect the tunneling of the resource through the Adapter, as mentioned above. The developer also has the option of specifying the additional attribute data-cloak with the value of "true" which will force the URI to be transformed and randomly cloaked on each request, as described elsewhere in this document, in order to, among other reasons, prevent ad-blocking software from blocking the resource. As applied to the img example, the URI would be randomized on each end user request for the same resource, such as http://hostApplication.com/adapter.php?wp=imgXYZ on the first request and http://hostApplication.com/adapter.php?wp=img123 on the second request and so on.

These "automatic" methods can be selectively overridden in their operations by adding html attributes to the automatically targeted html tags mentioned above. These extra attributes presently conform to the parameters which the following "manual" methods allow for. The "manual" technique for triggering these markup transformations can be enacted via selective "surrounding" of application markup. The developer selectively "surrounds" certain parts of his markup within transformation method calls as shown below. The present invention provides but is not limited to five different transformation methods. As will be readily apparent to those skilled in the art, the present invention is not limited to these methods, nor are these methods limited to the specific embodiments listed below. These five representative transformation methods are described more fully.

Transformation method 1: inlineLink(resourcePath, targetElementId) This method is used to transform the URL "resourcePath" into a link (URL) capable of bringing the user to that given resourcePath (Part) of the distributed application by delivering that part markup through the application adapter and into the currently visited host application. If specified, "targetElementId" will cause the markup for the resourcePath to be delivered into the specific innerHTML of the HTML element with whose Id matches targetElementId.

Tranformation method 2: proxiedResource(resourcePath)
This method will cause the URL "resourcePath" to be translated into a link (URL) capable of delivering that resource (e.g. image, pdf, etc.) through the application adapter and to the end user via the host application.

Transformation method 3: cloakedResource(resourcePath)
This method will cause the URL "resourcePath" to be translated into a link (URL) whose form appears as a newly randomized URL each time it is called. As with the proxiedResource method, this method also delivers said resource (e.g. image, pdf, etc.) through the application adapter and to the end user via the host application. One application of this randomization would be to defeat ad-blocking software. Most ad blocking softwares perform filtering against specific URLs. Therefore, by always returning a new URL through this cloaking function, an image (or other resource e.g. flash) can usually bypass ad-blocking filters.

Tranformation Method 4: formAttributes(attributesStr)
This method will convert either a full or partial comma-separated set of HTML form element attributes into a format which will cause a transformation of the form submission mechanism into an Ajax-style (XMLHTTP) usable by the distributed application. The result from an end user perspective is a form which upon submission does NOT cause a refresh of the entire host application but just the HTML section (div) where the distributed application part which generated this form resides. The form data itself will, through the ADMS, still be delivered to the distributed application URL (usually located at the remote distributed application server) specified in the "action" attribute via a standard form submission. The following attributes from the attributesStr parameter are converted in the following way:

targetId: an invention-specific attribute which specifies the HTML element ID into which the form result will be displayed.

action: the standard "action" attribute used in HTML form elements. Must be included among attributes passed to this method. Respected for final submission to the distributed Application.

method: the standard "method" attribute used in HTML form elements. Must be included among attributes passed to this method. Respected for final submission to the distributed Application.

enctype: the standard "method" attribute used in HTML form elements. Defaults to "url-encoded".

target: trapped and not passed to end user.

on*: all attributes starting with "on" are trapped and not passed to end user.

all other attributes are passed through to end user as is.

Transformation Method 5: adSpace(adSpaceName)

This method serves to demark an available area within the markup generated by the distributed application part into which an external item can be placed. In one preferred embodiment of the present invention, the external item is an advertisement. The named ad space must also be defined within the distributed application part definition section of the application developer's interface.

During the transformation of the markup in the above mentioned methods, a technique is employed to preserve part autonomy wherein any query parameters on the original URLs are prefixed. Query parameter prefixing is a technique whereby the ADMS transforms the URLs by prefixing the names of each query parameter with a URL-safe identifier which ties the query parameter back to the subscription associated with the call. Tying the query parameter to the subscription (as opposed to the part) allows all parts associated with that subscription to share information with each other. An alternate form of prefixing allows query parameters to be made local to a single part only or to the entire subscription, by direction of the application developer on a query parameter per query parameter basis.

The present invention grants the publisher the ability to selectively, on a subscription by subscription basis, disallow the subscription from running the subscription's own Javascript within the host application. In one preferred embodiment this is enabled through a HTML-based subscription administration interface with a checkbox form field allowing the publisher to allow or disallow the use of application derived Javascript. An interface of this sort is well known to those skilled in the art.

The transformations spoken of above and in reference to URLs, are enabled by the replacement of the markup which contained the original URL from the host application (e.g. http://application.com/page1.html) with a new URL local to the host application (e.g. http://hostApplication.com/adapter.php?wpPartId=123). It should be readily apparent to those skilled in the art how to replace one string with another within a source string. Following is an example of an in-content transformation:

---

Original Markup (direct to Application):
<a href=http://application.com/page1.html">
Transformed Markup (tunnel through Adapter):
<a href="http://hostApplication.com/adapter.php?wpPartId=123">

---

Cookie Scope

A technique of the present invention which extends the effect of part autonomy is the way in which it establishes a virtual scope for cookies. The ADMS renames all new outgoing cookies with a unique prefix combined with a cloak of both the subscription ID and the cookie. This serves to make the cookie name unique amongst the site's other cookies and establishes a virtual scope for cookies, local to each subscription/cookie combination. It prevents one distributed application from disturbing the cookies of another distributed application and from disturbing the cookies of a host application. It also preserves and protects web site cookies from remote services and software applications, client-side or otherwise. Software application developers are free to set cookies without fear of interfering or being interfered by other software applications and site cookies. Publisher sites are ensured that their site-specific cookies will not be delivered to the remote distributed application server directly through the application adapter. The value of the cookie is also cloaked before being sent to the client (end user) to provide an extra measure of security and privacy. Both the cloaked cookie name and cloaked cookie value also have built-in resistance to tampering and hacking using a checksum technique.

Scoped Data Exchange

The present invention makes use of a scoped-variable store on the ADMS. Named variables can be set and retrieved from this store by any of the above mentioned entities. In the current embodiment of the present invention the ADMS intercepts all variables sent through the host application network protocol. This enables the host application (publisher), the ADMS, and any or all co-existing distributed applications delivered through said host application to exchange data with one another. The ADMS also intercepts all data embedded with a distinct identifying prefix. As an example where the distinct identifying prefix is "wpset_", the ADMS will intercept all data embedded with the "wpset_" prefix. Scoping is accomplished via the naming convention "wpset_VARNAME[SCOPE]" and for which specific portions are auto resolved. Representative examples of how the scoped-variable store functions follow:

wpset_VARNAME[_USER]=VALUE

In the above example, the variable named "VARNAME" is stored to a scope limited to all distributed applications for which the current ADMS user is logged in. This means that all applications served within this same user session can access this variable.

"_USER" is auto-resolved the current distributed application user ID.

wpset_VARNAME[_SESSION]=VALUE

In the above example, the variable named "VARNAME" is stored to a scope limited to all applications within this same user session. This means that all applications served within this same user session can access this variable.

"_SESSION" is auto-resolved to the current application host session ID.

wpset_VARNAME[_PUBLISHER]=VALUE

In the above example, the variable named "VARNAME" is stored to a scope limited to all applications served by this same publisher. This means that all applications served by this publisher can access this variable.

"_PUBLISHER" is auto-resolved to the current application host (publisher) ID.

wpset_VARNAME[_REQUEST]=VALUE

In the above example, the variable named "VARNAME" is stored to a scope limited to all applications served within the current HTTP request under the same publisher. This means that all applications served within the current HTTP request can access this variable.

"_REQUEST" is auto-resolved to the current HTTP request ID.

wpset_VARNAME[_APPLICATION:DateApplication]= VALUE

In the above example, the variable named "VARNAME" is stored to a scope limited to all instances of the WidgetPop application "DateApplication". This means that all instances of the "DateApplication" application, regardless of the publisher which they are running on, can access this variable.

wpset_VARNAME [_APPLICATION:DateApplication. myDateApplication]=VALUE

In the above example, the variable named "VARNAME" is stored to a scope limited to just the specific instance "myDateApplication" which is of type "DateApplication". This means that only this instance of the DateApplication named myDateApplication (actually a distributed application subscription) can access this variable.

wpset_VARNAME[nameOfSpecialSharedScope]= VALUE

In the above example, the variable named "VARNAME" is stored to a custom shared scopenamed "nameOfSpecialSharedScope". This type of scope is not limited to an entity such as application, or publisher, and is open for use by anyone in knowledge of its name "nameOfSpecialSharedScope". This means that any number of applications or publishers can share this data.

wpset_VARNAME[_GLOBAL]=VALUE

In the above example, the variable named "VARNAME" is stored to the_GLOBAL scope which is accessible by any number of applications or publishers. There is no special, custom scope name in this example so all that is required to be known by sharing parties is the variable name itself.

wpset VARNAME:ACCESSTOKEN[ANYSCOPE]

In the example above, the variable named "VARNAME" is secured with an access token named "ACCESSTOKEN". This has a limiting effect where the variable name is kept simple but can only be accessed by those in possession of the access token. The access token can be anything one likes but it is suggested that one use a long randomly generated character array in order to maximize security of the data value. The scope ANYSCOPE represents the fact that any of the above described scopes can be used.

Another feature of the scope-named variables is the ability to combine multiple scopes via commas with a combined limiting effect.

The ADMS service creates a named value store for each scope. Each defined scope has its own store under which the variables associated with the respective scope are recorded.

The present invention makes use of an application adapter. The application adapter code which is capable of displaying multiple remote distributed applications within the same host application and is capable of handling the complexities of maintaining the autonomy of those multiple distributed application cookies and query parameters. This is not to be confused with a "simple" proxy which may only transform query parameters of a single remote "page". A proxy can only handle query parameters and cookies for a single remote application.

Automatic, End-to-End Communications Security

The connections involving a client (end user) connecting to a publisher server connecting to an ADMS server connecting to an distributed application server can together be thought of as a virtual connection. The present invention will automatically use a secure protocol along the entire virtual connection, from publisher server to ADMS server to distributed application server if a secure connection is detected from client (end user) to publisher server. The invention will alternately use secure protocols along the publisher server to ADMS server to distributed application server path if so specified by the application developer, even though the connection from client (end user) to publisher server may be insecure. This ensures a secure connection to the distributed application server in situations such as corporate networks where the immediate network is trusted and does not require added security, but the external connection to the distributed application server is over a public network and does require added security. The present invention also allows the distributed application to force the entire virtual connection into secure mode even though the publisher page may currently be in non-secure mode. This would be effected by passing a 'forceSecure' flag to any of the transformation methods called from within the distributed Application. The end result would cause the end user's web client to refresh the currently viewed insecure page to instead load the same page but over a secure connection and at the same time display the newly selected distributed application part (which required the secure connection) from within that page. After the distributed application signals the ADMS server that it no longer requires a secure connection through the absence of a 'forceSecure' flag, the end user's web client would then reload the currently viewed page non-securely if that is how they first encountered it, or leave it in secure mode if that is how they first encountered it, and at the same time display the newly selected distributed application part.

Automatic User-Experience Enhancement Via Javascript XMLHTTP Techniques

The present invention performs a transformation as described above on various select HTML markup. That transformation allows the distributed application to appear in the publisher's web page. There are however, two modes in which the transformed markup affects end-user navigation of hypertext links and submitted forms. The first mode through which navigation of hypertext links and forms is possible is via non-Javascript, simple HTML. The invention accomplishes this by maintaining all current query parameters which that are part of the currently shown page in the user's web client. This mode works splendidly if the current page was the result of an HTTP GET. However, should the current page be the result of an HTTP POST (e.g., after the submission of a shopping cart check-out page), then a refresh to the current page could have unexpected results. Nonetheless, this non-Javascript mode functions perfectly for the visiting search engine spider which does not issue HTTP POSTs anyway, and since search engine spiders do not execute Javascript calls, the standard hypertext links are followed and all inner-application links are also spidered.

Since nearly all of the clients visiting the publisher site have Javascript enabled on their web clients, the enhanced second mode (Javascript XMLHTTP) will be automatically enacted for most clients. This mode uses Javascript XMLHTTP to retrieve the markup for a page referenced by a given Hyperlink and display that markup within a specified area of the given page without having to refresh (reload) the entire page. This results in a faster response time and thus better user-experience. HTML forms are enhanced in the same way. It is important to note that this Javascript XMLHTTP enhancement is automatically applied to a distributed application and requires only standard HTML page design on the part of the application developer. The application developer does not have to concern himself with the more advanced and involved development effort usually needed to create a Javascript-XMLHTTP-enhanced page/site.

Security-compatible Application Interface Enhancement

Third-party Javascript is a recognized danger to publisher sites. Once a publisher allows Javascript to run which is sourced from an entity other than the publisher, that entity has virtually unlimited capability for data theft and manipulation (e.g. stealing cookies, stealing passwords, stealing user accounts, etc.). In a multi-tiered environment as that which the invention puts forth, there are potentially an unlimited number of external entities (distributed applications) desiring to run Javascript. Although the present invention allows distributed applications to run their own Javascript, the present invention also respects a publisher's desire to have more control over this potential danger. For this reason, the application allows publishers to specify on an application-by-application basis, whether or not to allow that distributed application to run custom Javascript. Should the publisher disallow a distributed application to run its own Javascript, the ADMS server will strictly filter and block any attempts by the distributed application to pass Javascript through it to the publisher. However, the distributed application still has available to it an ever expanding list of pre-configured application enhancement scripts which are supplied by the ADMS server and verified to be safe and secure scripts. These application interface enhancement scripts provide all distributed applications access to such enhancements, one of which is the ability to display Application Parts within virtual floating windows. And these application interface enhancements are ready-to-use, verified safe for the publisher, and stable for the distributed application, thereby eliminating much manual coding effort on the part of the application developers, many of whom would have been duplicating each other's efforts if they had to create these enhancements on their own. (put more specifics n this)

Application Metrics System

Referring again to FIG. 9 and the preferred embodiment therein, depicts the application metrics system 200 and the flow of information from the distributed application 145 to the pricing component 260 after an end user 120, referred to in FIG. 1, has made a request to access the distributed application 145. As depicted in FIG. 9, the application metrics system 200 provides the application developer with the ability to configure and implement a monetizing scheme for at least one distributed application 145. The application monetizing scheme can be used for at least one distributed application 145 at any given time. For purposes of illustration and clarity, the current discussion will focus on effecting a single distributed application 145.

Referring again to FIG. 9, the distributed application 145 is analyzed by the application metrics system 200 to determine application metrics 210 to be recorded as application metrics data 220. The application metrics data 220 includes both system defined metrics 213 and developer defined metrics 217. Representative examples of system-defined metrics (named value pairs) include "date=2008.04.18", "time=17: 01 EST", "publisherId=204", "applicationId=115". System defined metrics 213 to be recorded include but are not limited to web-client information, date/time, publishing server information, application server information, application information, and method called. The system defined metrics 213 also records advertising-related metrics which may include but are not limited to items such as ad impressions, ad click-throughs and attention(time end users interfaces with a distributed application). System defined metrics 213 are recorded automatically for the distributed application 145 to the application metrics data store 220.

Referring again to FIG. 1, as a distributed application 145 is accessed by an end user 120 data to be recorded as application system metrics is sent along with the end user request to access the distributed application. Referring again to FIG. 9, as a representative example, where the distributed application is a web based application; the host application provides application metrics data to the application metrics system in http headers that the end user's web client sends to the host application 113. The application adapter 116 intercepts the http headers and sends them to the application metrics system 200 to be recorded as system metrics 213 by the application metrics component 210 into the application metrics data store 220. Additional system metrics not included in the http header may also be gathered by the application adapter 116. These additional system metrics may include, but are not limited to, ad impressions, ad click-throughs and attention (time at least one end user interfaces with a distributed application), end user's time zone, end user's IP address, and end user's system information. This additional information is also recorded by the application metrics component 210 into the application metrics data store 220 as system defined metrics. System defined metrics are recorded for all distributed applications.

Developer defined metrics 217 are also recorded by the application metrics component 210 into the application metrics data store 220. Developer defined metrics to be recorded are implemented by the application developer of the distributed application 145 using a developer defined metrics application programming interface (API).

Figure 26:
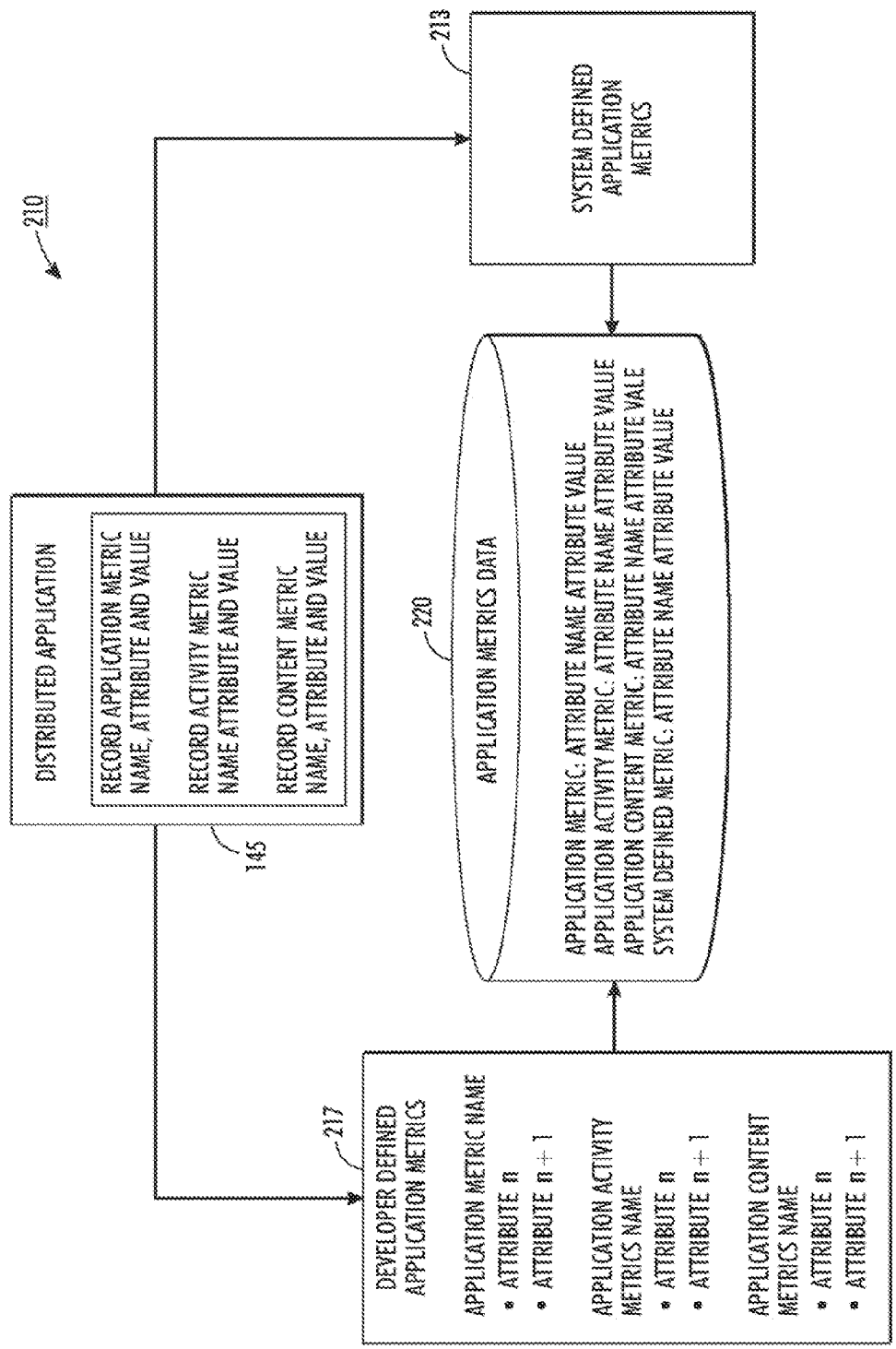
FIG. 26 is a block diagram representing one preferred embodiment of an application metrics component.

FIG. 26 represents the application metrics component 210 for the distributed application 145 in one preferred embodiment of the present invention. The application metrics component 210 allow the application developer to define distributed application 145 metrics other than the system defined metrics (developer defined metrics). Developer defined metrics 217 are defined to record a particular metric containing multiple name value pair attributes. Each developer defined metric may optionally be classified, in the preferred embodiment depicted two metrics classifications are allowed, an activity metric and as a content metric, where an activity metric is data associated with end users activities and a content metric is data associated with content creation. Those skilled in the art are aware an unlimited number of matrix classifications may be created. The choice of two metrics classifications is for illustrative purposes only and should not be construed as a constraint on the present invention. In the preferred embodiment depicted in FIG. 26, system defined metrics 213 are automatically recorded. As those skilled in the art are aware, there can be an unlimited number of developer defined metrics 217 associated with the distributed application 145. The choice of three developer-defined metrics 217 is for illustrative purposes only and should not be construed as a constraint on the present invention.

Referring again to FIG. 26 and the preferred embodiment depicted therein, the three developer-defined metrics 217 are an application metric with attributes n to n+1, an activity metric with attributes n to n+1, and a content metric with attributes n to n+1. System-defined metrics 213 may include but are not limited to web-client information, date/time, publishing server information, application server information, application information, and method called. The system-defined metrics 213 may also include advertising-related metrics such as but not limited to ad impressions, ad click-throughs and attention. As those skilled in the art are aware, attention is defined as the time an end user spends interfacing with a distributed application.

In one example, the distributed application 145 is a photo editing application which will touch-up a user-supplied photographic image. In this preferred embodiment, the developer-defined metric associated with this distributed application will be a "photoTouchedUp" metric. The "photoTouchedUp" metric has three attributes: resize, grayscale, and stretch. Each attribute has an associated value. Grayscale can have values ranging from 0 to 100, resize can have values ranging from −100 to 100, and stretch can have values ranging from 0 to 20. The application metrics component 210 will record this metric and its attributes to the application metrics data 220 each time the end user processed a photograph through the application. The end user 120 for example may be presented with three options when editing a photo grey scale, resize, and stretch. The interface presented to the end user may vary depending upon choices on how to set up the distributed application made by the publisher. One way the interface may be presented to the end user, is the end user may be provided a slider button with which the end user may manipulate his photo. For each "photoTouchup" operation (grey scale, resize and stretch), the end user slides a button on the screen with the mouse to the appropriate level. When the end user is satisfied with the level the end user clicks on a submit button that performs the operation. The application metrics component 210 will record the "photoTouchedUp" metric with the associated metric attributes and values in this case grayscale=50, resize=−10 and stretch=19 to the application metrics data 220.

In order to cause the recording of the above metrics by the application metrics component 210 the application developer would implement the developer defined metrics application programming interface (API) by placing the following markup in the markup generated by the distributed application.

Some representative examples of acceptable markup syntax are
!@ddm.photoTouchedUp.grayscale=50 @!
!@ddm.photoTouchedUp.resize=10 @! and
!@ddm.photo TouchedUp.stretch=19 @!
The markup api is as follows
!@ddm. Metricsname=metricsvalue@!

As the distributed application markup passes through the application metrics system it is inspected by the application metrics component. When the application metrics component encounters the above developer defined metrics markup "photoTouchup" it records the metric data.

The application developer may also create an activity metric and content metric to be recorded. As an example in the same scenario as above, the application developer wants to record each occurrence of an end user submitting a photo. In this scenario submitted photos are shared among other end users. As more photos are submitted the application appreciates in value. To entice end users to submit photos, the application developer in this example will reward end users with monetary awards thus allowing end users to share in revenues generated by the distributed application. In order to do this the application developer needs to keep track of how many photos a user submits. The developer can define a content metric by using the developer defined metrics application programming interface (API) and include the markup in the markup generated by the distributed application each time an end user submits a photo as detailed below.

An example of acceptable markup syntax is
!@ddm.photosubmit.count=1.userid-1234:content@!
The markup api is as follows
!@ddm. Metricsname=metricsvalue:metrics.user identifier.classification@!

The above metric's name is "photoSubmit", its attributes are "userid" and "count". In this particular example, "count" has an initial value of 1. The value may be based on the size of the image, or its quality and the application developer may thus set the count value accordingly. Userid has a value that is associated with a unique identifier of the end user. The "photoSubmit" metric is classified as a developer defined content metric.

As the distributed application markup passes through the application metrics system it is inspected by the application metrics component. When the application metrics component encounters the above developer defined metric markup "photosubmit" it records the metric data.

The application developer of the example application can also encourage end users to classify the submitted photos into categories. All end users will benefit as the submitted photos get classified. The application developer can reward end users who frequently classify submitted photos to encourage the classification of photos. In order to entice end users to classify photos the application developer desires to reward the end users with monetary awards by allowing end users to share in revenues generated by the application or other forms of incentives. In order to do this the application developer needs to keep track of how many photos a user classifies. By using the developer defined metrics application programming interface (API) the develop may define a activity metric and include the markup in the markup generated by the distributed application each time a end user classifies a photo as detailed below.

An example of acceptable markup syntax is
!@ddm.photoClassify.count=100.userid-1234:activity@!
The markup api is as follows
!@ddm. Metricsname=metricsvalue:metrics.user identifier.classification@!

The above metric's name is "photoClassify", its attributes are "userid" and "count". In this particular example, "count" has a value of 1. Userid has a value that is associated with a unique identifier of the user. The "photoClassify" metric is classified as a developer defined activity metric.

As the distributed application markup passes through the application monetizing system it is inspected by the application metrics component. When the application metrics component encounters the above developer defined metric markup "photoClassify" the application metrics component records the Metric data.

By using the developer defined metrics application programming interface the application developer is saved the effort of programming the functionality of tracking end user activity, tracking end user usage, and tracking application usage. This data now is readily available to be used by the pricing component and revenue allocation component.

Referring again to FIG. 9, after the application metrics data 220 is recorded it is available for use in a pricing component 260. The details of the pricing component are depicted in FIG. 28.

Figure 27:
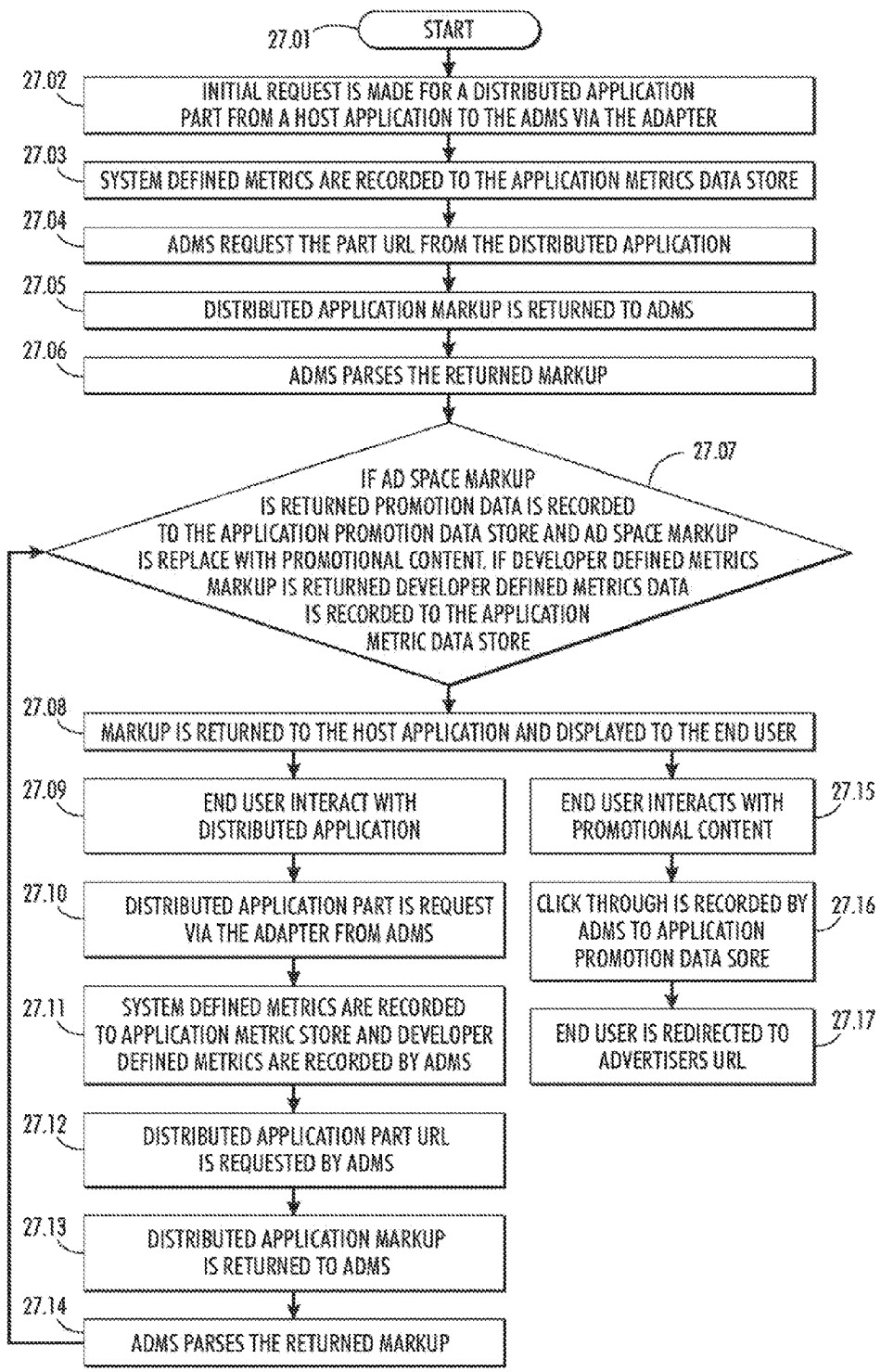
FIG. 27 depicts a flowchart for a method to record metrics and promotional data and to display promotional content in a distributed application.

FIG. 27 is a flow chart of a method to use the application metrics system in one preferred embodiment of the present invention. This flow chart depicts the flow of the request for a distributed application starting with an end user's initial request for a host application in step 27.01. The flow chart depicts the path of the request to the distributed application and the metrics that are recorded as a result of the requests via steps 27.02, 27.03, and 27.04. The flow chart then depicts the flow the markup takes from the distributed application back to the end user whom initiated the request and the metrics recorded and the steps taken by ADMS to insert promotional content into the markup of the distributed application via steps 27.05, 27.06, 27.07, and 27.08. The flow chart then depicts how this flow is continually repeated as at least one end user makes request for a distributed application via steps 27.09, 27.10, 27.11, 27.12, 27.13, and 27.14. The flow chart depicts the flow and the resulting recording of metrics when at least one end user interacts with promotional content in a distributed application via steps 27.15, 27.16, and 27.17.

Figure 28:
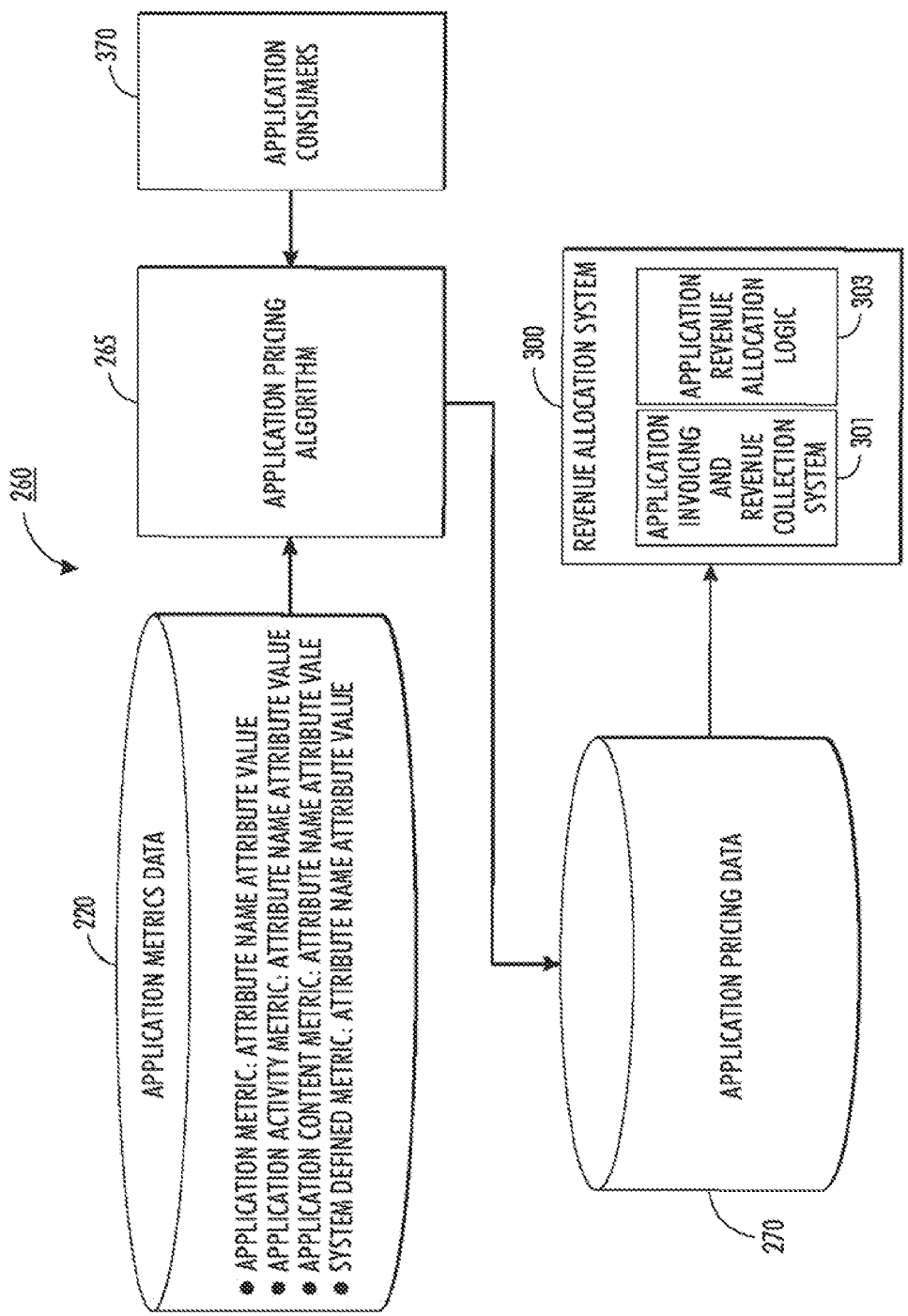
FIG. 28 is a block diagram representing one preferred embodiment of a pricing component.

Referring to FIG. 28, the pricing component 260 uses an application pricing algorithm 265 provided by the application developer which allows application developers to create fine-tuned pricing for the distributed application 145. The application developer creates at least one pricing algorithm. In one preferred embodiment of the current invention, the application developer creates the pricing algorithm logic in the java programming language. In the current embodiment this pricing algorithm logic is stored in the application monetizing system. The application pricing algorithm logic is executed periodically, typically on a daily basis, the results of which are used to calculate the monies due to be distributed to the application stakeholders. In another embodiment of the current invention, the pricing algorithm logic can be contained and run from a remote location, (e.g. the application host). That remote location can run logic written in any programming language, and can communicate with the ADMS system over the network via common data access protocols.

The application pricing algorithm has access to the application metrics 220 data via common data access protocols, thus allowing the algorithm to operate on the application metrics data. More than one pricing algorithm may be created for each distributed application. The output of the pricing algorithm is a usage fee name and price. This output (fee name and price) of the pricing algorithm is recorded into the application pricing data 270. This price may or may not be associated with an application consumer 370. Often the application developer does not know what entity will be charged for the use of the distributed application. That association is made by the revenue allocation system 300.

In one preferred embodiment, the pricing configurations are based on usage-based data, time-based data, and developer defined metrics data. This allows application developers to easily offer different application feature sets at different pricing levels and to create various usage-based pricing configurations for their applications.

Referring again to FIG. 9, the application monetizing system 200 includes a promotion component 230 which utilizes a promotion manager 234 to allow for promotional content to be easily placed into the distributed application 145.

Figure 29:
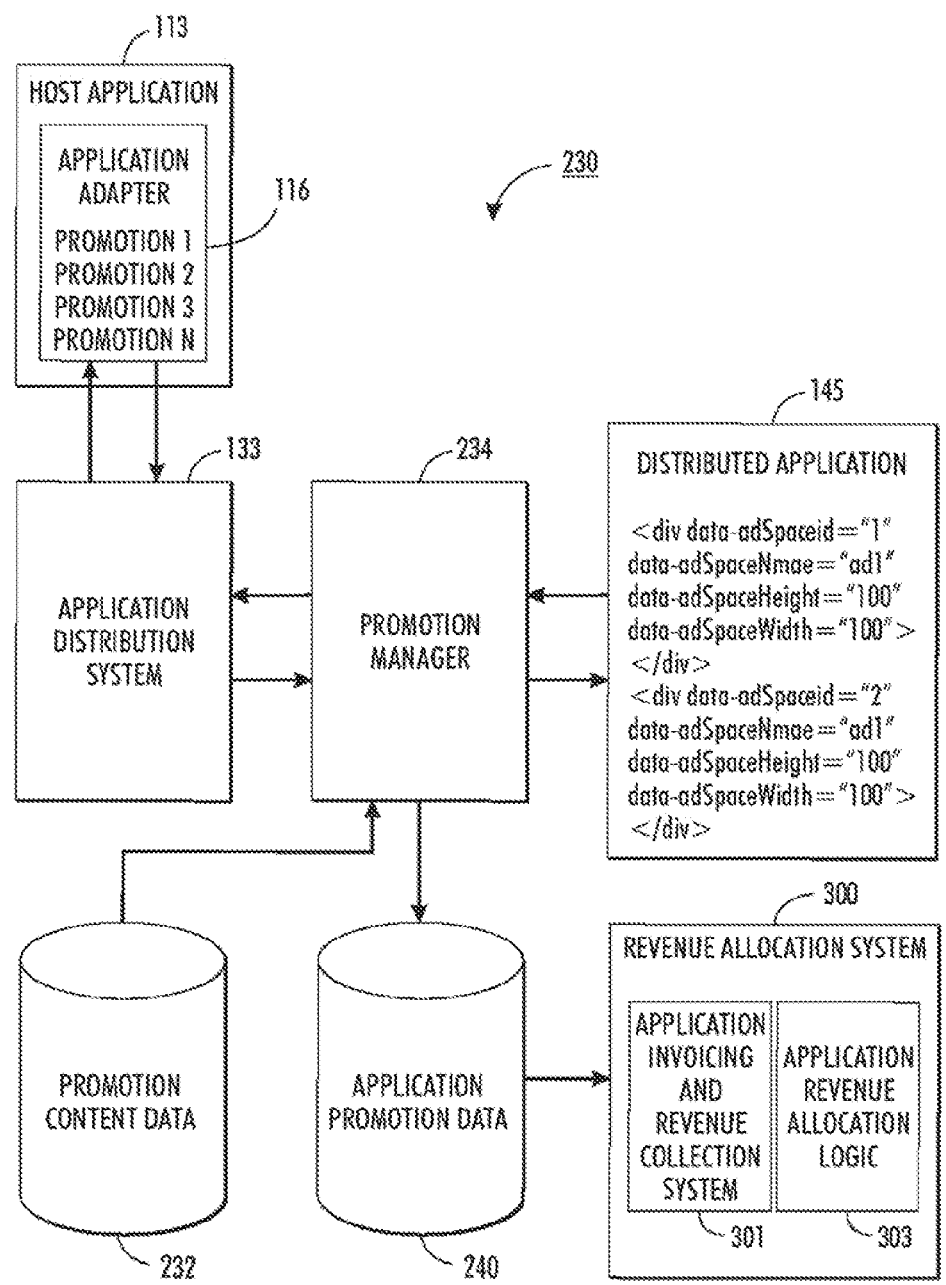
FIG. 29 is a block diagram representing one preferred embodiment of a promotion component.

FIG. 29 depicts one preferred embodiment of the promotion component 230. The application adapter 116 communicates with the promotion manager 234 via the application distribution system 133. The present invention implements a concept called "Ad Spaces". Ad Spaces represent visible sections or spaces of a distributed application where promotional content is displayed. There may be zero or more Ad Spaces in any single distributed application 145. An example of a situation in which a single distributed application has zero Ad Spaces is one in which the monetizing is usage based and no promotion based monetizing is implemented. Referring again to FIG. 29, the promotion manager 234 utilizes a promotion content data 232 to replace Ad Spaces in the distributed application 145 with promotional content. As those familiar with the art are aware, the promotion content data may replace Ad Spaces in the distributed application using any conventionally available method. Advertisers pay a fee to have their promotional content displayed in these Ad Spaces. The publisher of the host application 113 can decide how many of these Ad Spaces to utilize, limited by a minimum number which is set by the application developer.

The promotion manager 234 controls the placement of promotional content in application Ad Spaces. The promotion manager 234 allows for the management of advertisers and their promotional campaigns. Each campaign may have a multitude of ads. Ads define the actual promotional content that is displayed in the distributed applications Ad Space. The promotion manager 234 is used to assign ads to Ad Spaces As those familiar with the art are aware, the promotion manager may assign ads to Ad Spaces in the distributed application using any conventionally available method.

When a distributed application 145 is consumed via an ad based monetizing scheme, promotional content is displayed based on the assignments made in the promotion manager 234. The underlying system is capable of ensuring that applications participating in an ad based monetizing scheme are delivered with the specified minimum number of Ad Spaces. The promotional content delivered by the promotional manager contains link tracking code in all external URLs (URLs referencing the advertiser web site) that make up the promotional content. When an end user clicks on these URLs a request is first made to the ADMS which record the click through data in the Application Promotion Data 240, then the end user is redirected to the advertisers URL.

Assignment of promotional content to Ad Spaces can be done fully manually or with varying degrees of automated assistance. In the latter case, the promotion manager 234 will assign an ad to an Ad Space using a variety of algorithms. In one example, the assignment of an ad is based on the similarity between the topic of the ad and the topic of the application content. In another example, the assignment of an ad is based on the content on the published page. There are many other possible matching algorithms which may be implemented using any of the available metrics collected by the system including, but not limited to calendar/time-based metrics, behavior-based metrics, and usage-based metrics. In all ad to Ad Space assignments, the promotion manager ensures that the ad will dimensionally fit into the Ad Space by comparing the specified dimensions of the Ad Space to that of the ad. If the ad does not dimensionally fit into the Ad Space, the promotion manager will provide an error message.

Referring again to FIG. 29 in one preferred embodiment depicted therein, the application developer 145 has developed an application as the distributed application and is using a advertising-based revenue model. The Developer has defined 2 Ad Spaces in the application. In this preferred embodiment, the application developer can define that the publisher must show a particular minimum number of Ad Spaces. In this example, the developer specifies that at least one of these Ad Spaces in the distributed application must be displayed so that Developer can generate revenue from the advertising 145. To comply with this application developer defined minimum Ad Space requirement, the application host would have to display at least 1 of the Ad Spaces.

Ad Spaces are delineated by the application developer by including an insertion point with specific attributes within the returned HTML markup. For the example where the distributed application utilizes HTML, the insertion point is the DIV element with specific attributes returned within the returned HTML markup. In one preferred embodiment where the distributed application utilizes HTML, the attributes include but are not limited to:

```
data-adSpaceID
data-adSpaceName
data-adSpaceWidth
data-adSpaceHeight
```

When the ADMS server receives HTML markup from the application, it will parse that markup and find all adSpace DIVs within. Promotional content derived from the promotion manager is then inserted as HTML markup within the adSpace Divs and displayed to the end user interacting with the application. This process occurs as the distributed application is requested and passes through the promotion manager 234, just prior to the end user interfacing with the application.

In the current embodiment of the invention the application developer does not control what promotional content is displayed or the timing duration or sequence of the displaying of the content. The application developer only needs to create at least one Ad Space as described above and ad-based monetizing of the application will follow naturally. The application developer, of course, may receive a portion of the revenues derived from the ad-based monetizing configuration.

As will be apparent to those skilled in the art, additional methods for integrating promotional content into a distributed application are possible, E.g., an Ad Space may be programmed to encompass the entire application. In this case the user is initially presented with an ad overlaying the application or even covering it entirely.

The Ad Spaces may also be used to deliver code which, instead of displaying promotional content, causes promotional content to appear in a different place on the users screen than the area where the application is displayed (e.g. pop-up window).

Referring again to FIG. 9, the application pricing data 270 and application promotion data 240 are used by the revenue allocation system 300. This is shown in greater detail in FIG. 30.

Figure 30:
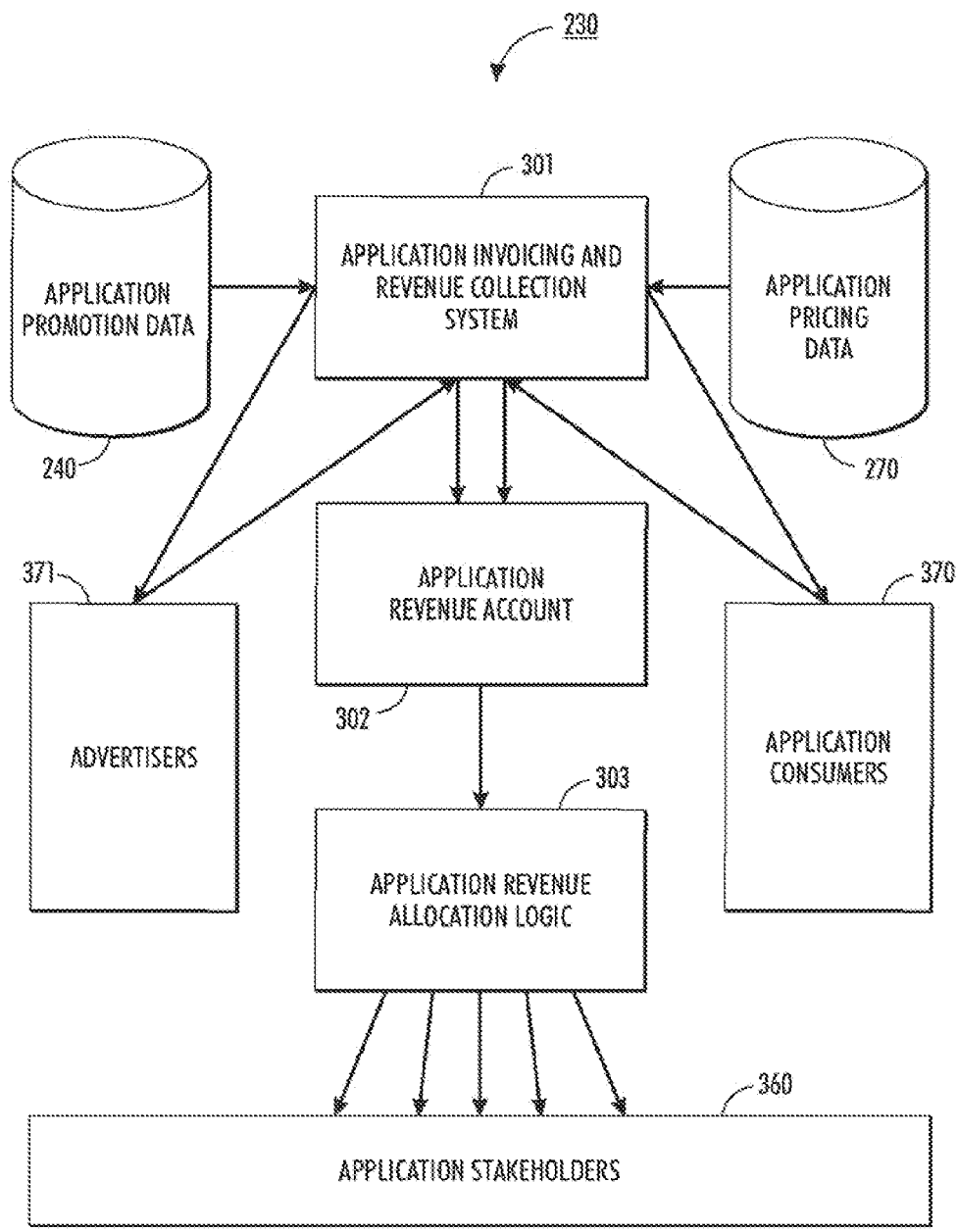
FIG. 30 is a block diagram representing one preferred embodiment of a revenue allocation.

Referring to FIG. 30, the application promotion data 240 and application pricing data 270 are the base inputs used to determine the appropriate revenues to be shared with and distributed to the application stakeholders 360. Application stakeholders 360 are entities who share in the distribution of revenues derived from at least one application monetizing scheme. The distributed application 145 will have at least one application stakeholder 360. There is no limit to the number of application stakeholders 360 that may be associated with a distributed application 145. Application stakeholders 360 may include but are not limited to the application developer, the application host, the application distribution and monetizing provider, the publisher, the publisher host, the content provider, broker, and application consumers.

Application stakeholders 360 may take on more than one role and there may be more than one of a particular category of application stakeholder 360.

Revenue Allocation Subsystem

Referring again to FIG. 30, one preferred embodiment of the revenue allocation system 300 is depicted. The revenue allocation system 300 allocates the monetized application revenue to the various application stakeholders 360 and allows for the configuration of the application revenue. Application metrics 210 collected from the application monetizing system 200 are used as input to the revenue allocation system 300.

Revenues can be collected at any number of places in the system by any number of application stakeholders 360 from any number of participants. It is potentially a very complex matrix which the revenue allocation system 300 helps turn into a standardized, and either semi or fully automated process. Not all participants need to use the revenue allocation system 300 as individual stakeholders are free to arrange their own deals amongst themselves or outside parties, but an individual stakeholder must register as an application stakeholder 360 in a distributed application 145 before the revenue allocation system 300 can automate the distribution of revenues to the individual stakeholder.

Referring again to FIG. 9, as a distributed application 145 is consumed, application metrics 210 including system defined metrics 213 and developer defined metrics 217 are recorded into application metrics data 220. Periodically or upon request the pricing component 260 calculates, for each distributed application 145, an application usage fee based on the application developer created application pricing algorithms 265. Again referring to FIG. 28 the pricing component 260 associates application usage fees with the appropriate distributed application's 145 application consumer 370 and records this information in the application pricing data 270.

Referring again to FIG. 30 application consumers 370 and advertisers 371 are electronically billed or fees may be deducted from their prepayments by the application invoicing and revenue collection system 301 based on data recorded in the application pricing data 270 and the application promotion data 240. In one preferred embodiment of the present invention, the revenues collected are deposited into the application distribution monetizing provider's revenue account 302 and associated with the appropriate application.

At a regular interval following the revenue collection, the revenues are distributed by the application revenue allocation logic 303 to the application stakeholders 360. The revenue allocation to stakeholders is based on parameters set via the revenue allocation system 300 maintained by the application revenue allocation logic 303.

Content Valuation

Often distributed applications are developed which require entities to submit content. An example is an image sharing application where users may submit and share images. Another example is a classified listing application where users list various things they desire to sell. Still more examples include distributed applications which require end users to vote, give advice or leave comments. In many cases the end user of the distributed applications are providing this content, however, content may also be provided by other application stakeholders 360 who are not end users of the application. For example in a video sharing service a video production company may provide movies to the video sharing application but they are not per se end users of the application. The content valuation quantifying subsystem is a subsystem within the revenue allocation subsystem. The content valuation quantifying subsystem provides an easily configured and controlled mechanism for content providers to be rewarded for the content that they submit to the application.

Content valuation allows for developer-defined metrics with metrics classifications of content, to be created which record data based on the content contributed to a distributed application by content providers. Algorithms may then be applied to the recorded data which value the provided content. In one preferred embodiment the algorithms are provided by the application developer. This value may then be used by the revenue allocation subsystem described below in determining what portion of the monetized revenue the content providers are entitled to.

Activity Valuation

Often it is desirable to reward end users of a distributed application not based on any content they contribute but simply based on their activity. End users who are active in performing certain tasks add value to the distributed application. An example is an end user adding value to the distributed application by performing the simple act of browsing for products. The products which the end user views, the time spent viewing those products and so on, all represent underlying end user activity as opposed to explicitly entered content and market research data collected regarding which products were viewed and the duration the end user spent viewing those products are of value in forecasting product demand and pricing. The activity valuation quantifying subsystem is a subsystem within the revenue allocation subsystem which provides an easily used mechanism for end users to be rewarded for the activity data generated while the end user uses a distributed application. The reward an end user receives could take any of myriad form. One example reward is a new-user discount on merchandise purchased via the distributed application which provided to an end user who spends over a specified amount of time researching a certain number of products before making an initial purchase.

Activity valuation allows for developer-defined metrics with metrics classifications of activity, to be created which record data based on application consumer's activities within an application. In instances where application consumers are to be rewarded for their activities, algorithms will be applied to the recorded data which value the application consumer activities. The value determined by the algorithms will then be used by the revenue allocation subsystem in determining what portion of the monetized revenue that the relevant stakeholders are entitled to.

Monetizing Scenarios

Figure 31:
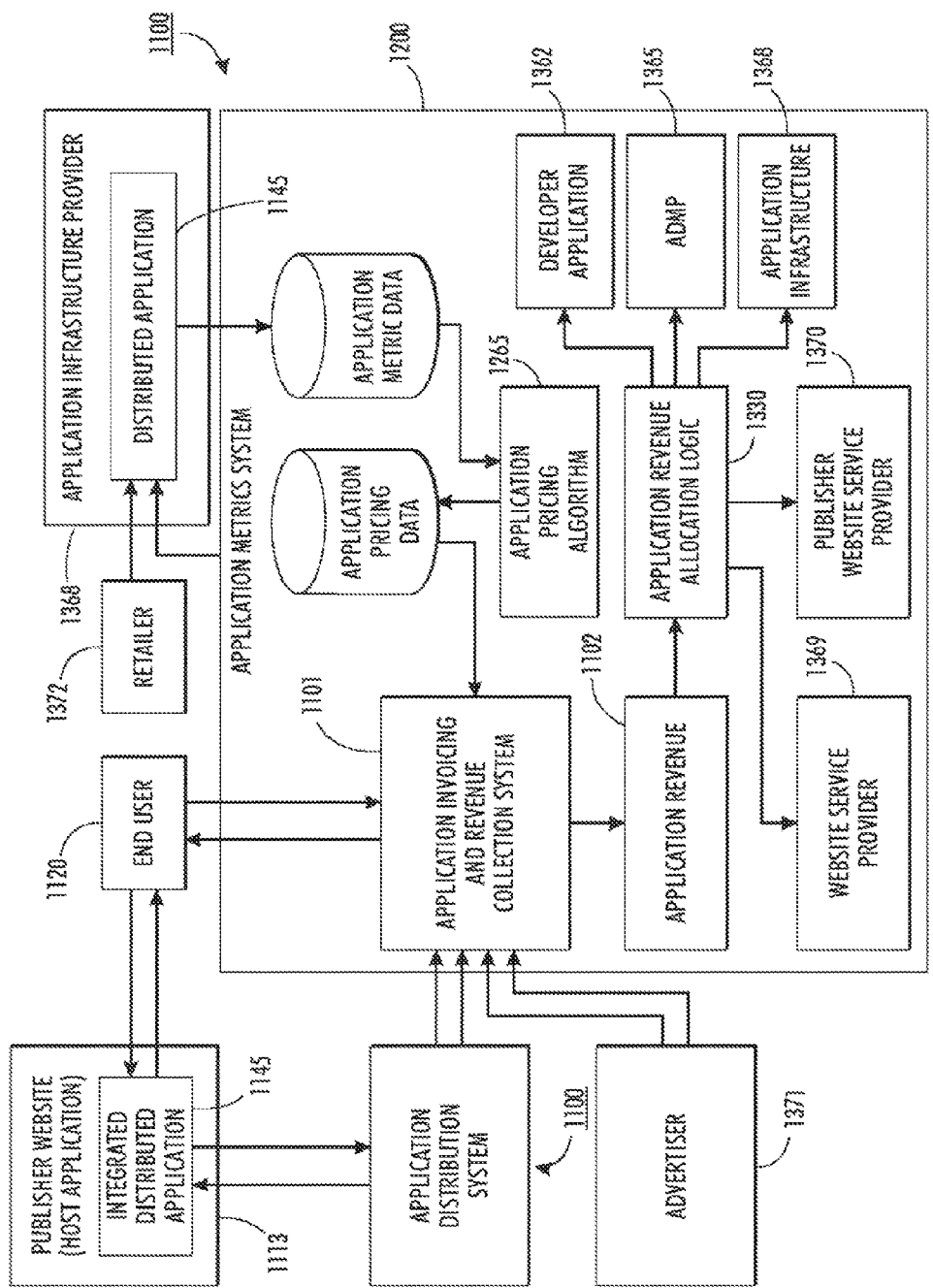
FIG. 31 is a block diagram representing one preferred embodiment of monetizing scenarios.
Figure 32:
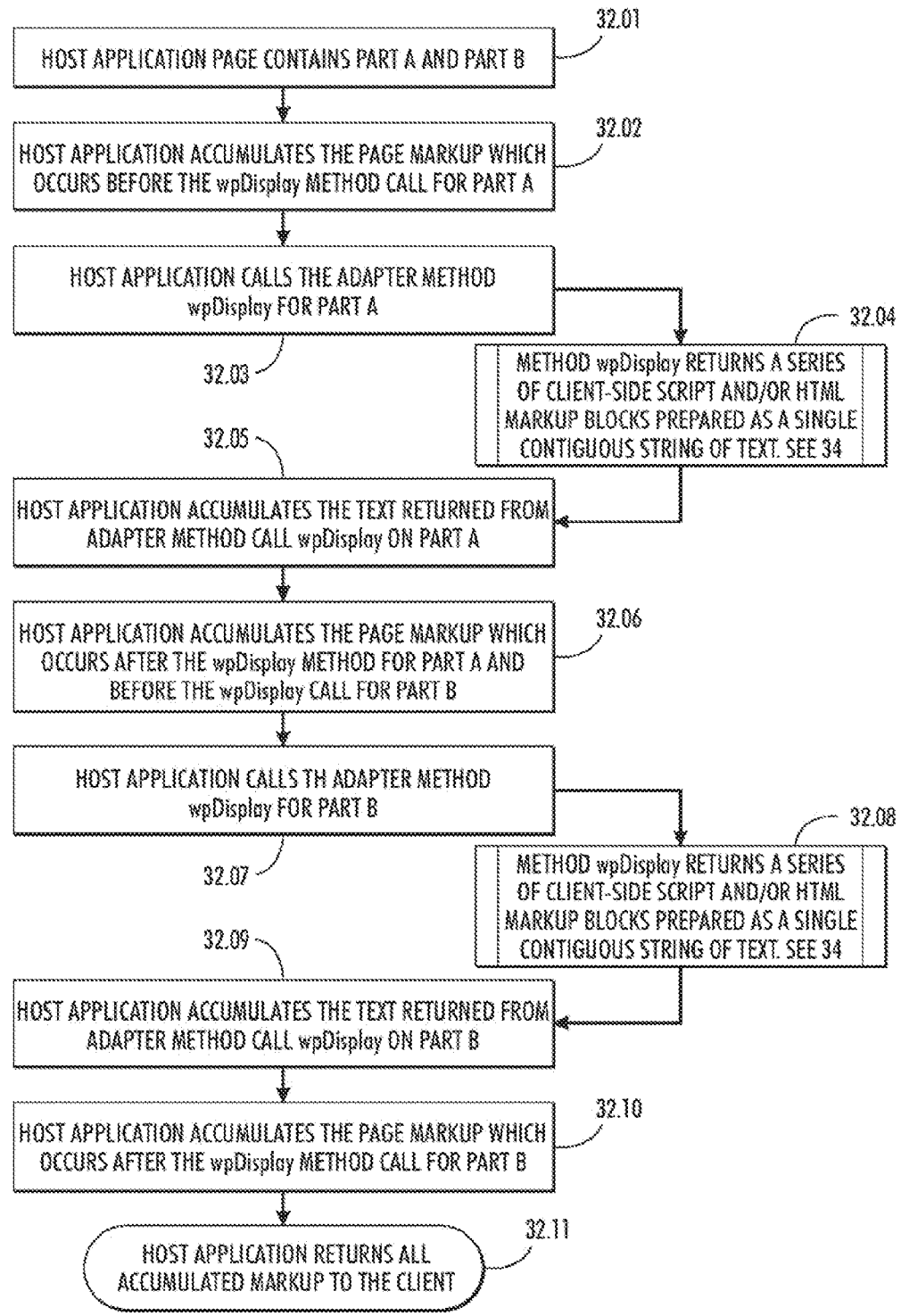
FIGS. 32, 33, 34, and 35 depict a flowchart of the markup segmentation process.
Figure 33:
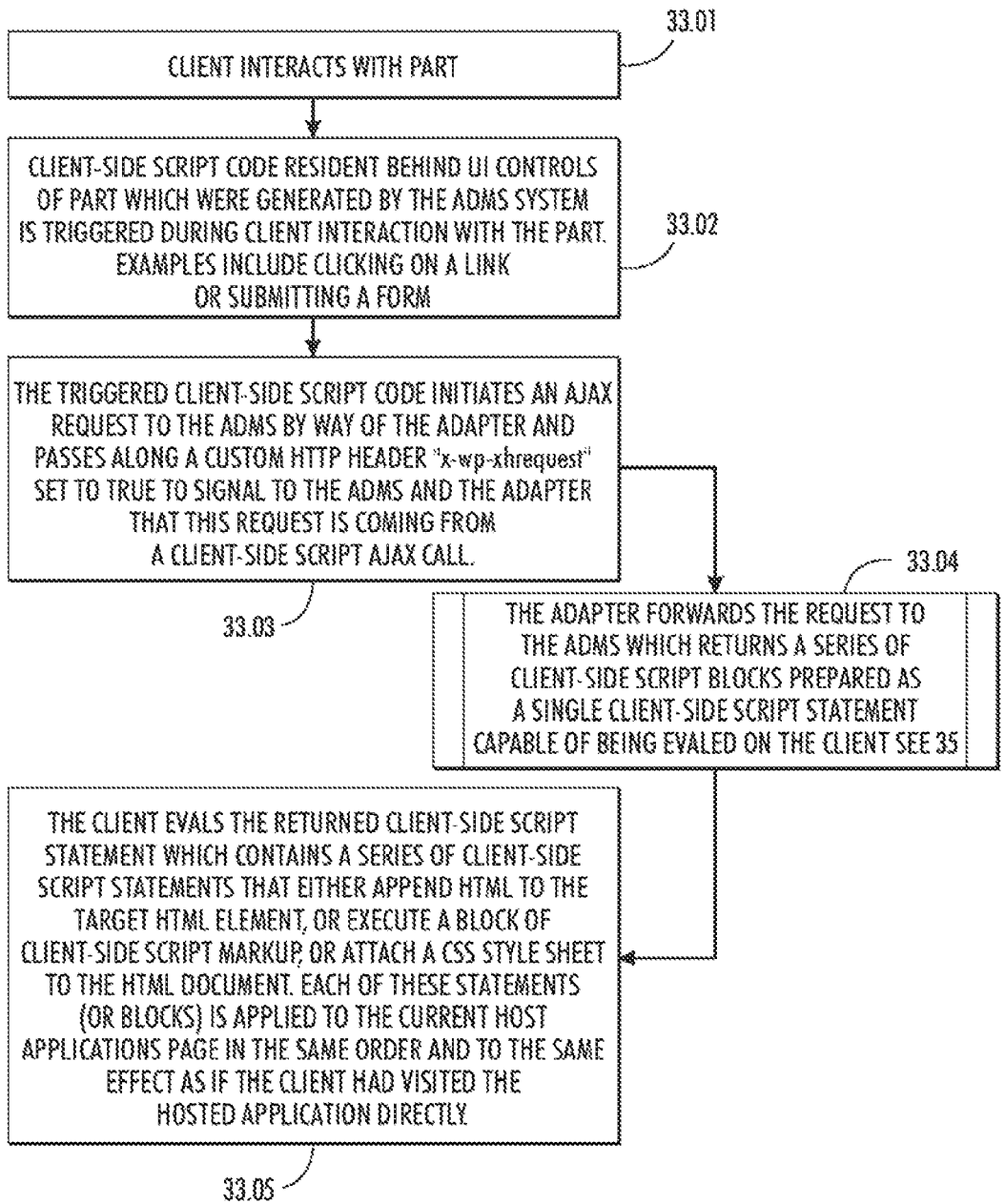
Figure 34:
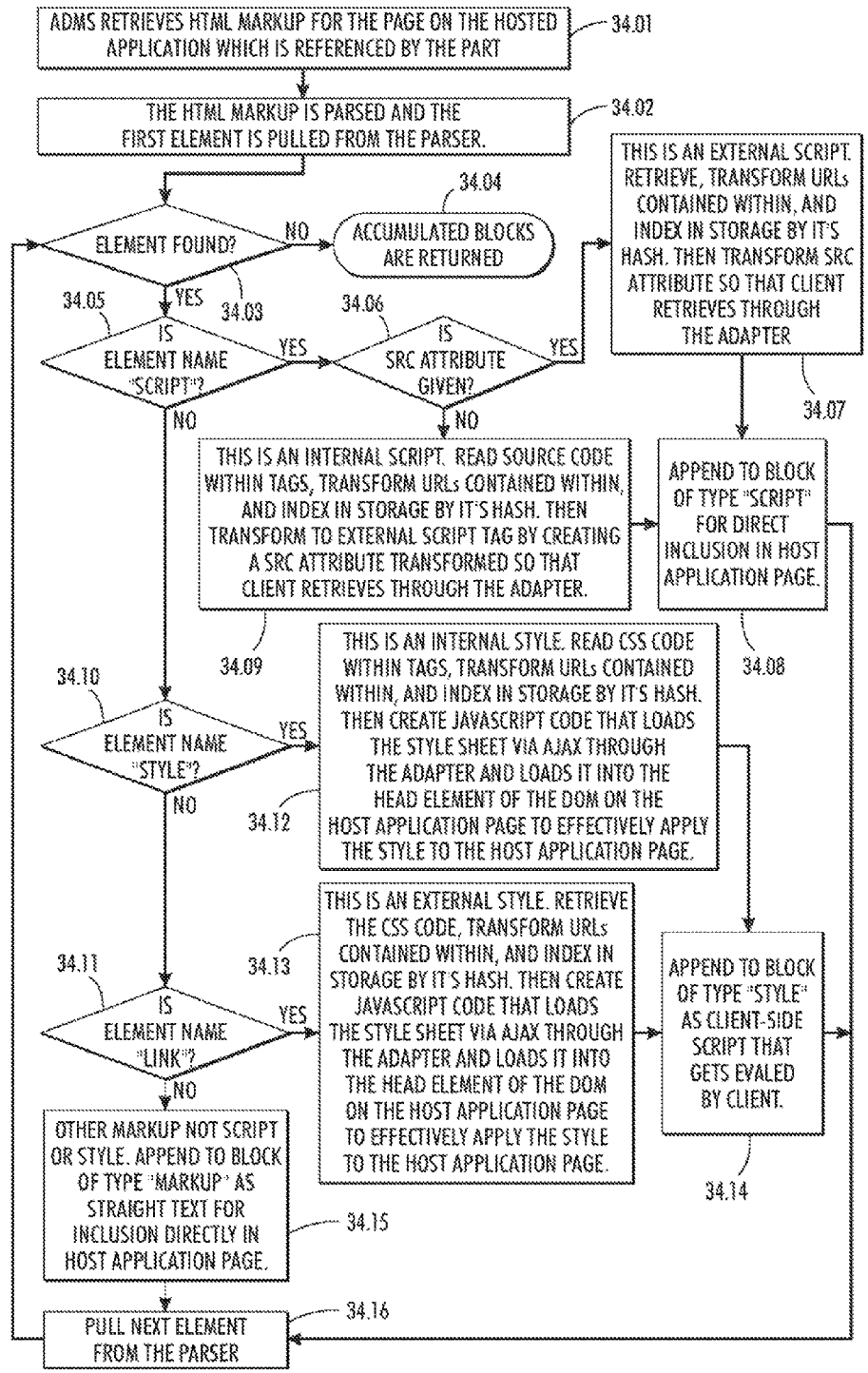

Referring to FIG. 31, the present invention allows for the monetizing of distributed applications 145 and for various application stakeholders 360 to benefit from the monetizing of the distributed software applications. What follows is a description of several representative monetizing and revenue sharing schemes made possible with the present invention. This list is not meant to be an exhaustive list of the revenue sharing and monetizing schemes made possible with the present invention. As will be readily apparent to those skilled in the art, the present invention may enable other monetizing and revenue sharing schemes.

Application stakeholders that may share in the monetized revenues of distributed applications may include, but are not limited to, the application distribution and monetizing provider, the publisher, the publisher host, the infrastructure provider, application developers, application brokers, retailers, and content providers.

Application consumers may include, but are not limited to the following entities: publisher host web site visitors, publisher host web sites, publisher host web service providers, application developers, and application sponsors.

The preferred embodiment depicted in FIG. 31 represents a diagram detailing several monetizing schemes made available by the present invention described below.

Referring to FIG. 31 monetizing scenario 1 is representative of one preferred embodiment of an application distribution and metrics system 1100 and the interrelationships between a host application 1113 and a distributed application 1145. In the embodiment described herein, the host application is a publisher web site 1113. The publisher of the host application pays a fee to deploy at least one distributed application 1145 on the publisher web site. The distributed application is consumed by an application end user 1120. The application end user is a visitor to the publisher web site (the host application 1113). The derived revenues are shared among the application stakeholders. The application stakeholders include an application developer 1362, an ADMP 1365, and an infrastructure provider 1368.

In monetizing scenario 1 the distributed application is offered on a usage basis. The distributed application is distributed on the publisher web site and accessed by end users of the publisher web site. The publisher web site owner pays usage fees for the distributed application based on application pricing schemes developed by the application pricing algorithm 1265. The derived revenues are shared among the application developers, infrastructure provider, and ADMP according to the application revenue allocation logic 1330.

Again referring to FIG. 31 monetizing scenario 2 is another preferred embodiment of an application distribution and metrics system 1100 and the interrelationships between a host application and a distributed application. This scenario is similar to that depicted in scenario 1 with the addition of a publisher web site service provider 1370 as an application stakeholder. In the embodiment depicted the host application is a publisher web site. The publisher of the host application pays a fee to deploy at least one distributed application 1145 on the publisher web site and the publisher web site is hosted by a publisher website service provider 1370. The distributed application is consumed by an application end user 1120. The application end user is a visitor to the publisher web site (the host application 1113). The derived revenues are shared among the application stakeholders. The application stakeholders include the application developer 1362, the ADMP 1365, the publisher web site 1370 and the infrastructure provider 1368.

In the preferred embodiment the distributed application is offered on a usage basis. The distributed application is distributed on the publisher web site and accessed by end users of the publisher web site. The publisher web site owner pays usage fees for the distributed application based on application pricing schemes developed by the application pricing algorithm 1265. The derived revenues are shared among the application developers, infrastructure provider, publisher web site providers, and ADMP according to the application revenue allocation logic 1330.

Again referring to FIG. 31 monetizing scenario 3 is a representative diagram of another preferred embodiment of an ADMS 1100 and the interrelationships between a host application 1113 and a distributed application 1145. In the embodiment depicted herein, publisher web site visitors pay a fee to use deployed application on publisher web site and publisher web site pays a fee to deploy developed application. In the embodiment depicted herein, the host application is a publisher's web site 1113. The publisher of the host application pays a fee to deploy at least one distributed application 1145 on the publisher web site. The distributed application is consumed by an application end user 1120. The application end user is a visitor to the publisher web site (the host application). The derived revenues are shared among the application stakeholders. The application stakeholders include an application developer 1362, an ADMP 1365, a publisher web-site owner 1370, and an infrastructure provider 1368.

In the preferred embodiment depicted, the distributed application is offered on a usage basis. The distributed application is distributed on the publisher web site and accessed by end users of the publisher web sites. The publisher web site owners pay usage fees for the applications based on the application pricing schemes developed by the application pricing algorithm 1265. The derived revenues are shared among the application developers, Infrastructure providers, ADMP, and publisher web site owner, according to the application revenue allocation parameters. The publisher web sites charge users accessing the developed application a separate usage fee based on an end user pricing schemes. Revenues derived from the end user application pricing schemes are shared among the publisher web site owners and the infrastructure providers according to the application revenue allocation logic 1330.

In this scenario the publisher web site owner is both a stakeholder and a consumer of the application.

Again referring to FIG. 31 monetizing scenario 4 is a representative diagram of another preferred embodiment of an ADMS 1100 and the interrelationships between a host application 1113 and a distributed application 1145. Scenario 4 is similar to that depicted in scenario 3 with the addition of a publisher web site service provider as an application stakeholder. In the embodiment depicted scenario 4, the host application is a publisher's web site 1113. The publisher of the host application pays a fee to deploy at least one distributed application 1145 on the publisher web site and the publisher web site is hosted by a publisher website service provider. The distributed application is consumed by an application end user 1120. The application end user is a visitor to the publisher web site (the host application). The derived revenues are shared among the application stakeholders. The application stakeholders include an application developer 1362, an ADMP 1365, a publisher web site owner 1370, and an infrastructure provider 1368.

In the preferred embodiment depicted, the distributed application is offered on a usage basis. The distributed application is distributed on the publisher web site and accessed by end users of the publisher web sites. The publisher web site owners pay usage fees for the applications based on the application pricing schemes developed by the application pricing algorithm. The derived revenues are shared among the application developers, Infrastructure providers, ADMP, publisher website providers, and publisher web site owner, according to the application revenue allocation parameters. The publisher web sites charge users accessing the developed application a separate usage fee based on an end user pricing schemes. Revenues derived from the end user application pricing schemes are shared among the publisher website providers, publisher web site owner and the infrastructure providers according to the application revenue allocation logic 1330.

In this scenario the publisher web site owner is both a stakeholder and a consumer of the application.

Again referring to FIG. 31 monetizing scenario 5 is a representative of another preferred embodiment of an ADMS 1100 and the interrelationships between a host application 1113 and a distributed application 1145. In the embodiment depicted herein, the host application is a publisher web site 1113. The distributed application is offered on an ad-supported basis. The distributed application is distributed on the publisher web site and accessed by end users of the publisher web site. An advertiser 1371 pays a sponsorship fee each time an advertisement is viewed by an end user and the advertiser may pay additional fees each time an ad is clicked on. The derived revenues are shared among the application stakeholders according to the application revenue allocation parameters. The application stakeholders include an application developer, an ADMP, an infrastructure provider, and the publisher web site owner. The application sponsor is an advertiser.

Again referring to FIG. 31 monetizing scenario 6 is a representative of another preferred embodiment of an ADMS 1100 and the interrelationships between a host application 1113 and a distributed application 1145. This scenario is similar to that described in scenario 5 with the addition of a publisher web site service provider as an application stakeholder. In the embodiment described the host application is a publisher web site q113. The distributed application is offered on an ad-supported basis. The distributed application is distributed on the publisher web site and accessed by end users of the publisher web site. An advertiser pays a sponsorship fee each time an advertisement is viewed by an end user and the advertiser may pay additional fees each time an ad is clicked on. The derived revenues are shared among the application stakeholders according to the application revenue allocation parameters. The application stakeholders include an application developer, an ADMP, an infrastructure provider, a publisher web site service provider, and the publisher web site owner. The application sponsor is an advertiser.

Again referring to FIG. 31 monetizing scenario 7 is a representative of another preferred embodiment of an ADMS and the interrelationships between a host application 1113 and a distributed application 1145. In the embodiment depicted herein, the host application is a publisher web site 1113. The distributed application is a shopping cart 1145 which allows the retailer 1372 the ability to sell a product to the publisher website visitor. The distributed application is distributed on the publisher web site and accessed by end users of the publisher web site. The publisher web site visitor pays for the product with his credit card. Metrics related to the sale of the product are tracked and are used to arrive at a monetary amount due from the retailer. Funds are transferred from the retailer to the ADMP and are then dispersed among the application stakeholders. The derived revenues are shared among the application stakeholders according to the application revenue allocation parameters. The application stakeholders include an application developer, an ADMP, an infrastructure provider, a retailer, and the publisher web site owner. The application sponsor is a publisher web site visitor.

Again referring to FIG. 31 monetizing scenario 8 is a representative of another preferred embodiment of an ADMS and the interrelationships between a host application 1113 and a distributed application 1145. The scenario described is similar to that depicted in scenario 7 with the addition of a publisher web site service provider as an application stakeholder. In the embodiment described the host application is a publisher web site 1113. The distributed application is a shopping cart which allows the retailer the ability to sell a product to the publisher website visitor. The distributed application is distributed on the publisher web site and accessed by end users of the publisher web site. The publisher web site visitor pays for the product with his credit card. Metrics related to the sale of the product are tracked and are used to arrive at a monetary amount due from the retailer. Funds are transferred from the retailer to the ADMP and are then dispersed among the application stakeholders. The derived revenues are shared among the application stakeholders according to the application revenue allocation parameters. The application stakeholders include an application developer, an ADMP, an infrastructure provider, a retailer, a publisher web site provider, and the publisher web site owner. The application sponsor is a publisher web site visitor.

As will be readily apparent, there are several additional scenarios which may be developed.

In any one of the above scenarios broker entities may be potential stakeholders. Broker entities facilitate trade through promoting the distributed applications.

In any of the above scenarios, a developer A may incorporate a distributed application that was developed by a second developer, developer B. Developer A could be charged a usage fee based on the pricing scheme of developer B's distributed application. developer A thus is a consumer of developer B's distributed application In the above scenario developer B may also opt to participate as a stakeholder in developer A's application and instead of receiving a usage fee for the usage of the distributed application, developer B may opt to receive a portion of the derived revenues from developers A's distributed application In another scenario, publisher web site owner A may deploy a distributed application. The distributed application is used by a multitude of users resulting in end user application data, that is, data entered into the application by publisher web site users interfacing with the application. Publisher web site owner B desires to deploy the same application with the web site A's user data. An example would be a discussion board that has many user discussions. Publisher web site owner B pays an application syndication fee and any other associated application usage fees. The application syndication fee is shared among the infrastructure providers and remote website A. Usage fees are shared among the typical application stakeholders. Also Instead of a syndication fee ad-supported fees may be shared among publisher web site owner A, publisher web site owner B and the typically Application stakeholders. When website B deploys the syndicated discussion board all user data from website A is included thus website B has what appears to be an active discussion board running on their site. Data submitted by web site A and web site B users in the form of postings to the discussion board appear in both web site A and web site B's discussion board. Both web sites now benefit from each web site users' submissions Many applications require end users to enter data as does the discussion board application in the previous example. Other types of application would be photo sharing applications, video sharing, or even job postings and classified listings. All these applications require users to enter or upload data or content. In some instances the data provided is nothing more than text other times it is full production video. To encourage users to input data and contribute content to the distributed application, applications may be configured that have the content creators as stakeholders via the Content Valuation Quantifying API. Thus users that contribute data or other entities (non application users) that contribute content to the application may share in the distribution of the monetized revenue with the other stakeholders.

Many applications require users to perform tasks such as voting, commenting, answering questions etc. Some applications may be very specific in what the users are required to do. For example users may be asked to categorize content, or even identify images in content and so on. These users activities are very important to the application and thus add value, therefore in order to encourage the desired user behavior applications may be configured that have end users as stakeholders via the Application User Valuation Quantifying API. Thus users that perform, the desired activities may share in the distribution of the monetized revenue with other stakeholders.

Markup Segmentation

Referring to FIGS. 32 through 35, the method which the ADMS uses to enable a web client to interpret, identify, and properly run blocks of code such as Javascript or css style is presented.

The ADMS breaks apart the text of a part from the host application, into blocks in steps 32.02 and 33.02 respectively. The ordering of the blocks is maintained to match the original ordering in which they were found. Each block being one of several types, including but not limited to "HTML markup", "Javascript", or "CSS style".

The ADMS determines for each block, whether the block is of a type such as HTML Markup block or if it is of a type such as a Javascript or CSS style block. If the ADMS determines the block to be of a type such as an HTML Markup block, the ADMS sends the block to the web client as-is in step 32.15. If the host application page is being initially loaded. On subsequent calls via Ajax, the HTML markup blocks are appended to the target element in step 33.15.

If the ADMS determines the block to be of a type such as a Javascript style block, the source code for the Javascript is retrieved and if external, as represented in steps 32.07 and 33.07 respectively, the block is retrieved, the URLs contained within are transformed, and the block is indexed in storage by the hash of its source. The src attribute is then transformed if external so that the client (end user) can retrieve the content of the block from the ADMS through the adapter. This essentially "externalizes" the block content, the content of the sent block now becoming simply a URL to the real content of the block. This externalizing (as opposed to sending the Javascript or CSS inline) allows the web client to make use of its natural caching ability for URL content. It also allows a repeated reference to the same Javascript or CSS style to be sent to the web client only once, and thus save bandwidth and speed page loads.

Figure 35:
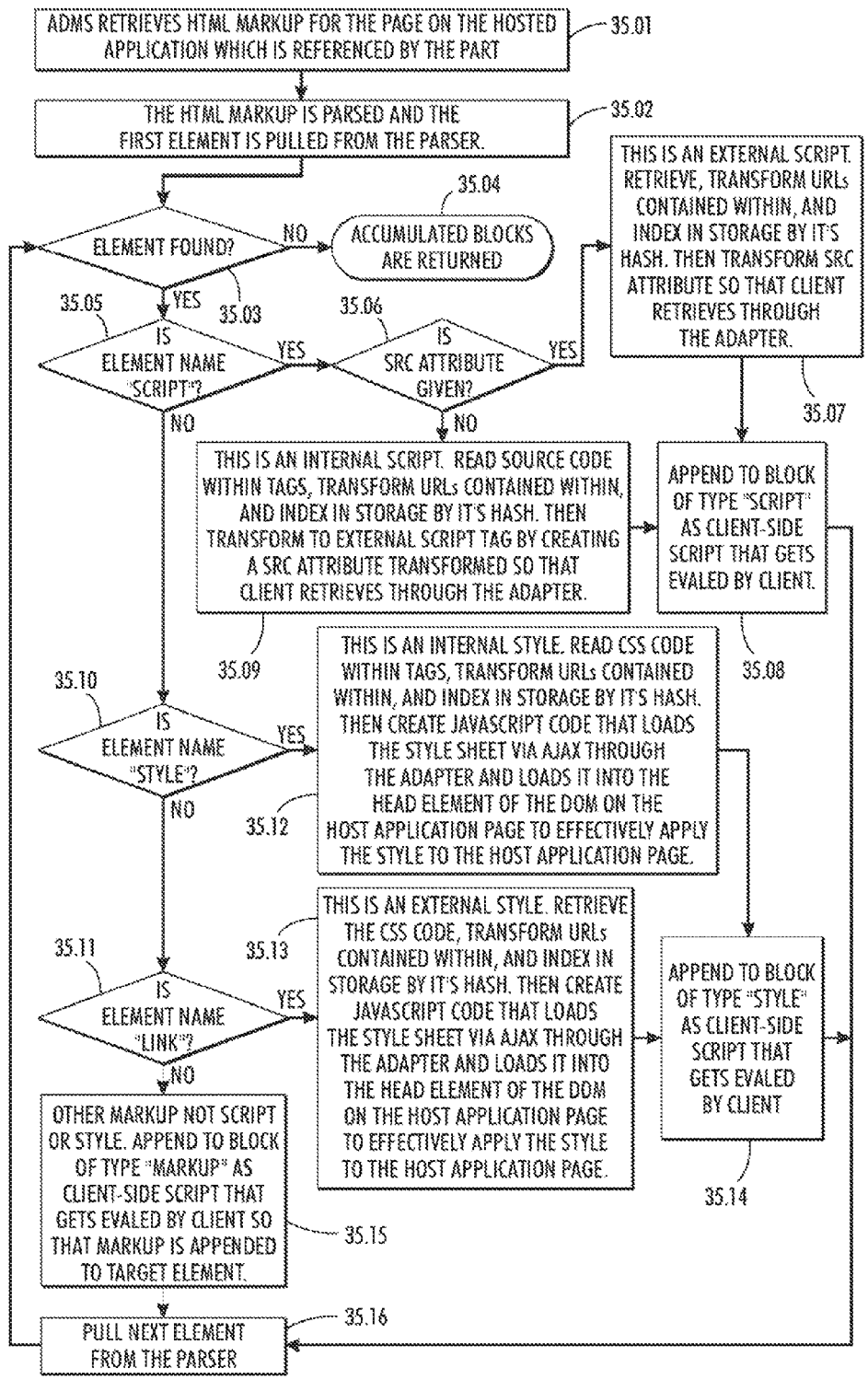

Referring to FIG. 35, the blocks are delivered to the client (end user) web client via XMLHTTP and depending on the type, are handled appropriately by the ADMS Javascript handling code in the order in which they were received.

Referring again to FIG. 34, if the block is of type "HTML markup", then the HTML markup is appended to the target element in step 35.15. This is done by gathering the current content of that element via the innerHTML property, appending the new markup to that content, and then resetting the innerHTML markup property with the new, appended contents.

If the block is of type Javascript, then the Javascript code is first checked to see if it was already loaded or "cached" for the current publisher's page via the ADMS Javascript library cache array which is stored locally for that publisher page. If not already cached, then it is first cached within that Publisher page. The cached code is then interpreted and run using the "eval" function in step 35.08.

If the block is of type CSS Style, then for that publisher page, the style is "loaded" into the page by first creating a "link" node in the DOM, setting "href" attribute to the URL value found within the CSS block. Then using the Javascript "appendChild" method to attach that node to the page's "head" element. This causes the web client to load and apply the CSS which was contained in the block in step 35.14.

Although several embodiments of the present invention, methods to use said, and its advantages have been described in detail, it should be understood that various changes, substitutions and alterations can be made herein without departing from the spirit and scope of the invention as defined by the appended claims. The various embodiments used to describe the principles of the present invention are by way of illustration only and should not be construed in any way to limit the scope of the invention. Those skilled in the art will understand that the principles of the present invention may be implemented in any suitably arranged device.

We claim:

1. A computer-implemented system for distributing and monetizing at least one distributed application and integrating each distributed application into at least one host application, the system comprising:

computer-executable algorithms capable of performing steps comprising:

distributing and integrating at least one distributed application into at least one host application, gathering and recording metrics of each distributed application, monetizing each distributed application;

an application distribution system for executing said computer executable algorithm; and a data store for storing at least said computer executable algorithm; wherein each host application originates from a source, each host application capable of displaying at least one part of said distributed applications to a multiplicity of end users, said end users having the capability to interact with said parts on each host application, wherein each said part has a unique id, wherein said part id is unique across each host application and each distributed application, with each distributed application originating from a source other than the originating source of said host applications, wherein upon examination of said host application by said end users the originating source of said application parts will have the appearance of originating from the source of said host applications.

2. The system of claim 1 wherein each host application is comprised of at least one web page.

3. The system of claim 1, wherein said distributed applications metrics are system-defined, said system-defined metrics are capable of being defined by said computer executable algorithm.

4. The system of claim 1, wherein said distributed applications metrics are developer-defined by the distributed applications developers, wherein said developer-defined metrics are capable of being recorded as multiple name-value pairs. and said multiple name-value pairs may be classified.

5. The system of claim 1, wherein said application monetizing is advertising based, the system further comprising:
Ad Spaces representing visible sections or spaces of said host applications where promotional content is displayed;
wherein Ad Spaces are capable of being delineated by the application developer by including an insertion point within said host application parts; and
a promotion manager capable of controlling the placement of promotional content in said host application Ad Spaces.

6. The system of claim 1, wherein said application monetizing is usage based and said usage based fees are derived from system defined metrics and developer defined metrics.

7. The system of claim 1, wherein said distributed applications are capable of having at least one application stakeholder wherein said application stakeholders are entities who share in the distribution of revenues derived from at least one application monetizing scheme.

8. The system of claim 7, wherein said distributed application monetizing further comprises a revenue allocation system, said revenue allocation system allocating the monetized application revenue to the said application stakeholder entities;
wherein the revenue allocation system determines the revenue to be distributed to said application stakeholders and application metrics are input to said application revenue allocation system.

9. The system of claim 8, further comprising a content valuation sub-system, wherein said application metrics include metrics classified as content, wherein said content valuation system is capable of accepting as input said application metrics with classifications of content, said content metrics comprising recorded data based on the content contributed to a distributed application by stakeholders with roles of content provider; wherein system defined content algorithms and developer defined content algorithms are capable of being applied to said content metrics and producing an output capable of being used by said revenue allocation system in determining what portion of the monetized revenue is allocated to the content provider stakeholders.

10. The system of claim 8, further comprising an activity valuation system wherein said activity valuation system is capable of accepting as input application metrics with classifications of activity, said activity metrics comprising recorded data based on end user interactions with a distributed application; wherein system defined algorithms and developer defined algorithms are capable of being applied to said activity metrics producing an output usable by said revenue allocation system in determining what portion of the monetized revenue is allocated to the application stakeholders.

11. The system of claim 1 indexable to search engines via search engine spiders, wherein said system is capable of providing a persistent series of uniform resource locators (URLs) with which distributed applications and their parts are indexable within their host application pages enabling said search engine spiders to traverse a distributed application at a host application; wherein part URLs will be indexable by search engines despite the distributed applications not residing on the host applications; wherein the system is capable of making use of a transformation technique to provide said persistent series of URLs; each distributed application part per host application possesses two persistent part URLs: an in context part URL and an out of context part URL wherein the in context part URL is capable to display the part as it appears in the host applications with all surrounding content when requested, including the host application content and other part content and the out of context part URL is capable of displaying only the part content; wherein both URLs contain the host application URL.

12. The system of claim 1, further comprising a scoped data exchange system wherein said system provides a named-value store under which application variables can be stored; said application variables may be stored with named-scopes which provide compartmentalization and security between variables enabling at least two parties to exchange data with each other through said application variables; wherein said parties consisting of said system, said host applications, said distributed applications, and outside parties, wherein said parties exchange data via a method comprising the steps:
intercepting by said system of said multiple parties set and get calls for setting and getting said named-values by said multiple parties;
processing by said system of said multiple parties set and get calls for setting and getting said named-values by said multiple parties; wherein
system-enforced visibility of said named-values based on said named-scopes providing multiple parties multiple levels of protected access to said named-values.

13. The system of claim 12 wherein said named-values are accessible by all said parties through a global scope.

14. The system of claim 12 wherein said named-values are limited to a scope which is auto-resolved by the system.

15. The system of claim 12 wherein said named-values within any said named-scope can be secured with an access token.

16. A method for distributing one or more applications, comprising the steps of:
defining said applications to provide one or more part definitions; and installing adapter code on a host application server; wherein each of said applications is defined with one or more attributes and wherein each of said part definitions is defined with one or more attributes.

17. The method as recited in claim 16, further comprising the step of creating one or more subscriptions for each of said applications.

18. The method as recited in claim 17, further comprising the steps of creating one or more parts for each of said part definitions; generating markup for each of said parts; associating one created part with said subscription for each of said applications; said markup generated will reference an application distribution system, said application, said application subscription, said application part definition, and said application part.

19. The method as recited in claim 18, further comprising the step of inserting said markup for at least one of said multiplicity of parts into a web page.

\* \* \* \* \*